US012225406B2

(12) United States Patent
Jin et al.

(10) Patent No.: US 12,225,406 B2
(45) Date of Patent: *Feb. 11, 2025

(54) METHOD AND APPARATUS FOR CONFIGURING PDCP DEVICE AND SDAP DEVICE IN NEXT-GENERATION MOBILE COMMUNICATION SYSTEM

(71) Applicant: Samsung Electronics Co., Ltd., Suwon-si (KR)

(72) Inventors: Seungri Jin, Suwon-si (KR); Donggun Kim, Seoul (KR); Soenghun Kim, Suwon-si (KR); Alexander Sayenko, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/526,645

(22) Filed: Dec. 1, 2023

(65) Prior Publication Data
US 2024/0107365 A1 Mar. 28, 2024

Related U.S. Application Data

(63) Continuation of application No. 17/892,568, filed on Aug. 22, 2022, now Pat. No. 11,838,790, which is a
(Continued)

(30) Foreign Application Priority Data

Jun. 5, 2017 (KR) .................... 10-2017-0069584
Aug. 10, 2017 (KR) .................... 10-2017-0101940

(51) Int. Cl.
*H04W 28/02* (2009.01)
*H04W 76/11* (2018.01)

(52) U.S. Cl.
CPC ........ *H04W 28/0268* (2013.01); *H04W 76/11* (2018.02)

(58) Field of Classification Search
None
See application file for complete search history.

(56) References Cited

U.S. PATENT DOCUMENTS

2010/0330995 A1* 12/2010 Aoyama ........... H04W 74/0833
455/436
2011/0188408 A1 8/2011 Yi et al.
(Continued)

FOREIGN PATENT DOCUMENTS

| CN | 102612095 A | 7/2012 |
| CN | 104349389 A | 2/2015 |

(Continued)

OTHER PUBLICATIONS

LG Electronics Inc., 'SDAP configuration', 3GPP TSG-RAN2 WG2 Meeting #98, R2-1704474; May 4, 2017; Hangzhou, China.
(Continued)

*Primary Examiner* — Andre Tacdiran
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present invention suggests a method and an operation for configuring a PDCP layer and a service data
(Continued)

association protocol (SDAP) layer, thereby facilitating an efficient flow-based QoS process.

20 Claims, 43 Drawing Sheets

Related U.S. Application Data continuation of application No. 16/615,301, filed as application No. PCT/KR2018/006427 on Jun. 5, 2018, now Pat. No. 11,425,595.

(56) References Cited

U.S. PATENT DOCUMENTS

| | | | |
|---|---|---|---|
| 2014/0198734 A1* | 7/2014 | Yamada | H04W 8/14 370/329 |
| 2015/0071059 A1 | 3/2015 | Fu et al. | |
| 2016/0014647 A1 | 1/2016 | Yi et al. | |
| 2016/0044639 A1 | 2/2016 | Yi et al. | |
| 2016/0174281 A1 | 6/2016 | Wen et al. | |
| 2016/0183151 A1* | 6/2016 | Wu | H04W 24/02 370/332 |
| 2017/0094701 A1 | 3/2017 | Hong et al. | |
| 2017/0332419 A1 | 11/2017 | Kim et al. | |
| 2017/0347296 A1* | 11/2017 | Wu | H04W 76/27 |
| 2018/0278357 A1* | 9/2018 | Kim | H04J 11/0076 |
| 2018/0317120 A1 | 11/2018 | Wang et al. | |
| 2019/0028920 A1 | 1/2019 | Pan | |
| 2019/0029057 A1 | 1/2019 | Pan et al. | |
| 2019/0150023 A1 | 5/2019 | Cho et al. | |
| 2019/0349810 A1 | 11/2019 | Cho et al. | |
| 2019/0387440 A1* | 12/2019 | Yiu | H04W 36/362 |
| 2020/0008118 A1 | 1/2020 | Han et al. | |
| 2020/0067843 A1 | 2/2020 | Li et al. | |
| 2020/0128431 A1 | 4/2020 | Jo et al. | |
| 2020/0187044 A1 | 6/2020 | Jiang | |
| 2020/0367108 A1 | 11/2020 | Hori et al. | |
| 2020/0396789 A1 | 12/2020 | Hori et al. | |
| 2021/0112442 A1 | 4/2021 | Jiang | |
| 2021/0204160 A1 | 7/2021 | Jo et al. | |

FOREIGN PATENT DOCUMENTS

| | | |
|---|---|---|
| CN | 201710313900.5 A1 | 5/2017 |
| CN | 107439037 A | 12/2017 |
| CN | 108809596 A | 11/2018 |
| GB | 201621072 | 1/2017 |
| GB | 2559840 A | 8/2018 |
| KR | 10-2017-0128042 A1 | 11/2017 |
| WO | 2015/064931 A1 | 5/2015 |

OTHER PUBLICATIONS

CATT, 'SDAP PDU format', 3GPP TSG-RAN WG2 Meeting #98, R2-1704265; May 6, 2017; Hangzhou, China.
Nokia et al., 'SDAP header', 3GPP TSG-RAN WG2 Meeting #97bis, R2-1702644; Mar. 24, 2017; Spokane, USA.
Extended European Search Report dated Mar. 12, 2020, issued in a counterpart European Application No. 18814013.1-1215 / 3614722.
Huawei et al: "Reflective Mapping in AS", 3GPP Draft; R2-1704988, Reflective Mapping in AS, 3rd Generation Partnership Project (3GPP), vol. RAN WG2, No. XP051275495, May 14, 2017, Hangzhou, China. Retrieved from the Internet: URL:http://www.3gpp.org/ftp/Meetings_3GPP SYNC/RAN2/Docs/.
CATT: "QoS re-mapping of QoS flow and DRB", 3GPP Draft; R2-1704266, 3rd Generation Partnership Project (3GPP), vol. RAN WG2, No. May 15, 2017-May 19, 2017 XP051274844, May 14, 2017, Hangzhou, China. Retrieved from the Internet: URL:http://www.3gpp.org/ftp/Meetings 3GPP SYNC/RAN2/Docs/.
Huawei et al: "Initiation of SDAP Entity", 3GPP Draft; R2-1702593, 3rd Generation Partnership Project (3GPP), vol. RAN WG2, No. XP051244595; Apr. 3, 2017, Spokane, Washington, USA. Retrieved from the Internet: URL:http://www.3gpp.org/ftp/Meetings 3GPP SYNC/RAN2/Docs/.
European Office Action dated Nov. 13, 2020, issued in a counterpart European Application No. 18 814 013.1-1215.
Convida Wireless: "Discussion on SDAP Mode of Operation and SDAP Packet Header", 3GPP Draft; R2-1705665 (SDAP Mode of Operation and SDAP Packet Header), 3rd Generation Partnership Project (3GPP), vol. RAN WG2, No. XP051275979; May 14, 2017, Hangzhou, China.
European Office Action dated May 17, 2021, issued in a counterpart European Application No. 18814013.1-1215.
LG Electronics Inc: "Configurability for UL QoS flow 10 marking", 3GPP Draft; R2-1704469 Configurability for UL Qos Flow ID Marking, 3rd Generation Partnership Project (3GPP), Mobile Competence Centre; 650, Route Des Lucioles; F-06921 Sophia-Antipolis Cedex; Fran, vol. RAN WG2, No. Hangzhou, China; May 14, 2017, XP051275035, Retrieved from the Internet: URL:http://www.3gpp.org/ftp/Meetings_3GPP.
European Office Action dated Dec. 6, 2021, issued in a counterpart European Application No. 18814013.1-1215.
Ericsson; Reflective QoS and Flow-ID; 3GPP Draft; Reflective Qos and Flow-ID, 3rd Generation Partnership Project (3GPP) TSG-RAN WG2 #98; Tdoc R2-1704379; May 14, 2017, Hangzhou, China.
LG Electronics Inc, "Configurability for UL QoS flow ID marking" 3GPP Draft, R2-1704469, 3GPP TSG-RAN2 Meeting #98, May 14, 2017.
Chinese Office Action dated Feb. 15, 2023, issued in Chinese Patent Application No. 201880037111.6.
Extended European Search Report dated Apr. 17, 2023, issued in European Patent Application No. 23157844.4.
Chinese Notice of Allowance dated Jul. 18, 2023, issued in Chinese Patent Application No. 201880037111.6.
Pan. U.S. Appl. No. 62/536,163, filed Jul. 24, 2017 (Year: 2017).

* cited by examiner

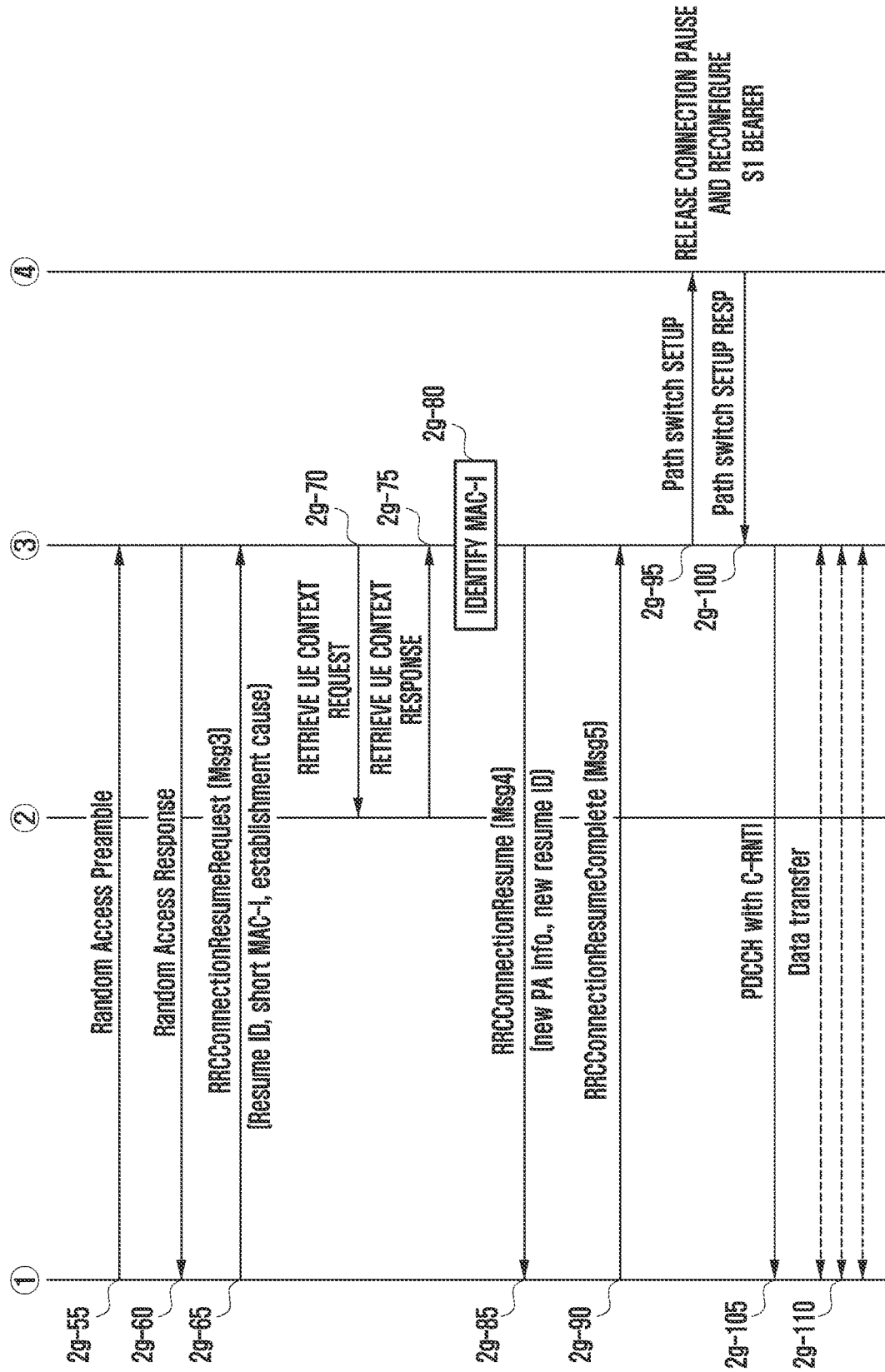

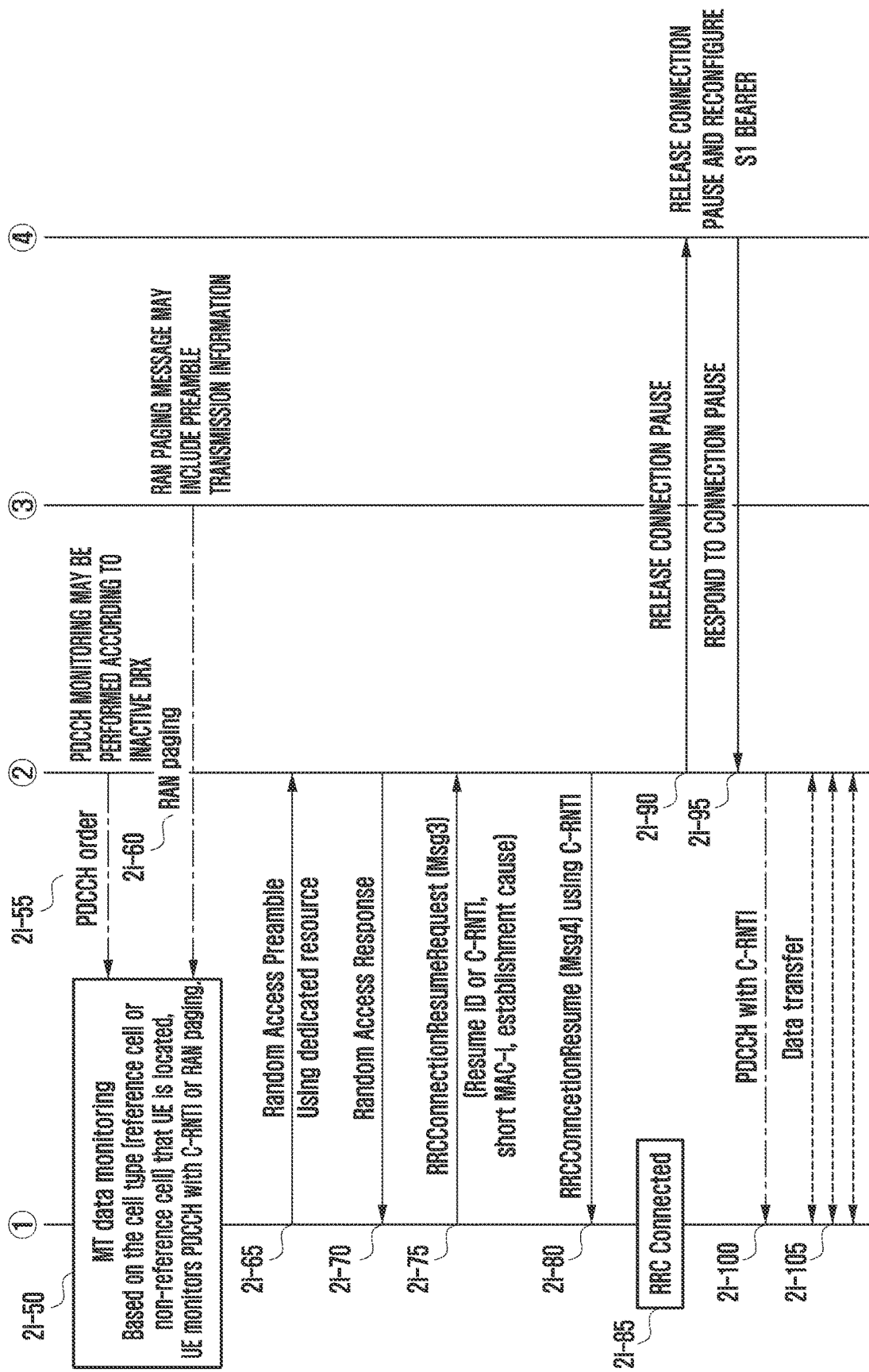

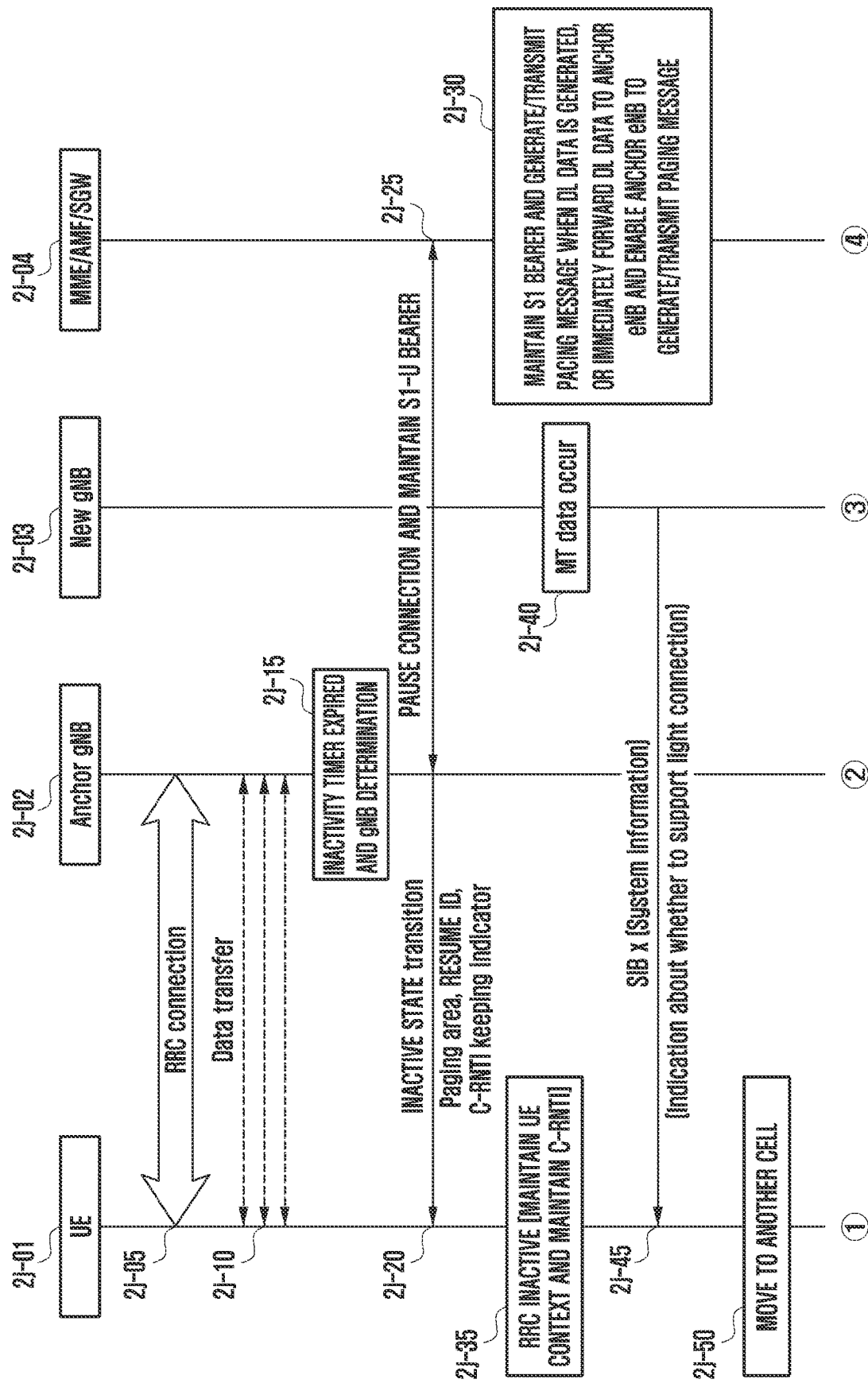

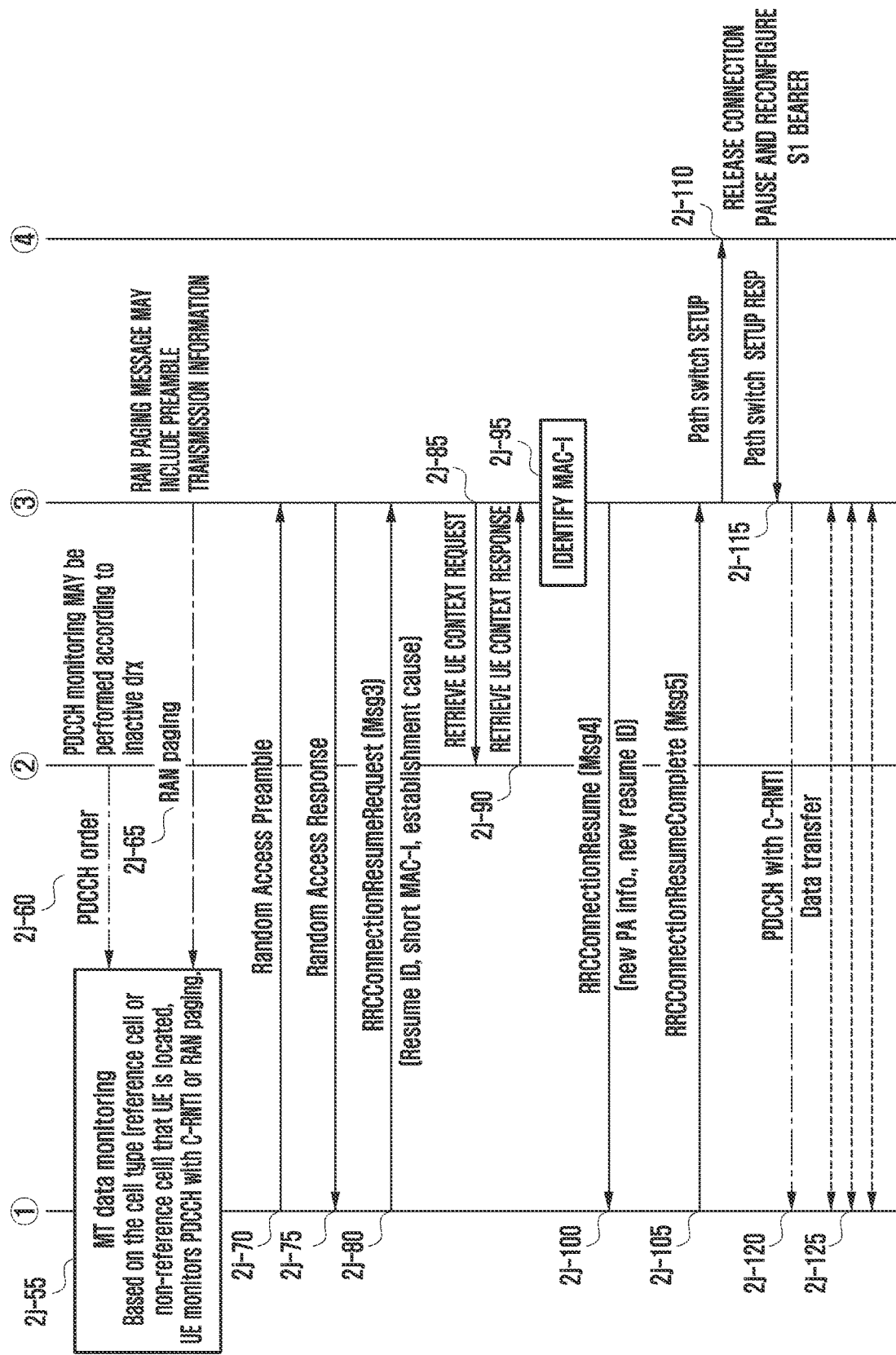

METHOD AND APPARATUS FOR CONFIGURING PDCP DEVICE AND SDAP DEVICE IN NEXT-GENERATION MOBILE COMMUNICATION SYSTEM

CROSS-REFERENCE TO RELATED APPLICATION(S)

This application is a continuation application of prior application Ser. No. 17/892,568 filed on Aug. 22, 2022, which has issued as U.S. Pat. No. 11,838,790 on Dec. 5, 2023; which is a continuation application of prior application Ser. No. 16/615,301 filed on Nov. 20, 2019, which has issued as U.S. Pat. No. 11,425,595 on Aug. 23, 2022; which is a U.S. National Stage application under 35 U.S.C. § 371 of an International Application No. PCT/KR2018/006427 filed on Jun. 5, 2018; and which is based on and claims priority under 35 U.S.C. 119(a) of a Korean patent application number 10-2017-0069584 filed on Jun. 5, 2017 in the Korean Intellectual Property Office, and of a Korean patent application number 10-2017-0101940 filed on Aug. 10, 2017 in the Korean Intellectual Property Office, the disclosure of each of which is incorporated by reference herein in its entirety.

TECHNICAL FIELD

The disclosure relates to a method and apparatus for configuring a PDCP entity and an SDAP entity in a next generation mobile communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

There is a need for a method of configuring a PDCP layer and an SDAP layer in an NR wireless communication system.

DISCLOSURE OF INVENTION

Technical Problem

As in an LTE system, when a method of configuring QoS based on a bearer is applied, a group of multiple flows in a network are treated as the same QoS. Thus, finer QoS adjustment is impossible at a core network and an access network level. Accordingly, an aspect of the disclosure is to introduce a method of configuring a flow-based QoS other than a bearer-based QoS, and to introduce a new SDAP layer on a PDCP layer to process the flow-based QoS, and is to propose a method of configuring a PDCP layer and an SDAP layer and an operation thereof for supporting this.

As to a procedure in which a terminal in an inactivate state transmits and receives data in the next generation mobile communication system, the terminal performs a resume procedure, and a base station receives necessary base station information included in a corresponding resume ID, establishes a connection with the terminal, and then transmits and receives data. As to the above operation, the same procedure is performed when the terminal is present as is in a serving cell where the terminal is transitioned to an inactive state or the terminal in an active state is present in another cell through cell movement. Accordingly, another aspect of the disclosure is to reduce a procedure for data transmission and reception when a terminal is present as is in a serving cell where the terminal is transitioned to an inactive state for mobile terminated (MT) traffic.

When an NR core network can be connected to an LTE radio access network and an NR radio access network in a next generation mobile communication system, a terminal should be able to simultaneously connect to the NR core network and the LTE core network. That is, a terminal may use an evolved packet core (EPC) and a 5G core network (CN) non access stratum (NAS). A terminal capable of connecting to at least a 5G CN may always select a 5G CN NAS when the terminal is connected to a network. However, the 5G CN may not support a specific function (e.g., MBMS) supported by the EPC of an LTE. In addition, even if the same terminal is registered in the EPC and the 5G CN, respectively, different services can be supported. Therefore, yet another aspect of the disclosure is to meet the need for a terminal to be reconfigured to the EPC, as necessary, even though the terminal is registered in the 5G CN.

Solution to Problem

In accordance with an aspect of the disclosure, a control method of a base station includes: identifying SDAP configuration information; generating a message including the identified SDAP configuration information; and transmitting the message including the SDAP configuration information to a UE, wherein the SDAP configuration information includes packet data unit (PDU) session identifier information mapped to an arbitrary SDAP entity.

In accordance with another aspect of the disclosure, an eNB in a wireless communication system includes: a transceiver configured to transmit and receive a signal; and a controller configured to control the transceiver to identify SDAP configuration information, to generate a message including the identified SDAP configuration information, and to transmit the message including the SDAP configuration information to a UE, wherein the SDAP configuration information includes PDU session identifier information mapped to an arbitrary SDAP entity.

In accordance with another aspect of the disclosure, a control method of a UE in a wireless communication system includes: receiving a message including SDAP configuration information from an eNB; and connecting an arbitrary SDAP entity with at least one PDCP entity based on the received message, wherein the SDAP configuration information includes PDU session identifier information mapped to the arbitrary SDAP entity.

In accordance with another aspect of the disclosure, a UE in a wireless communication system includes: a transceiver configured to transmit and receive a signal; and a controller configured to control the transceiver to receive a message including SDAP configuration information from an eNB and to control an arbitrary SDAP entity to be connected to at least one PDCP entity based on the received message, wherein the SDAP configuration information includes PDU session identifier information mapped to the arbitrary SDAP entity.

Advantageous Effects of Invention

According to an embodiment, a flow-based QoS configuration method other than a bearer-based QoS configuration method is introduced, and a new SDAP layer on a PDCP layer to process the flow-based QoS is introduced. Accordingly, a method of configuring a PDCP layer and an SDAP layer and an operation thereof for supporting this is proposed to efficiently process flow-based QoS.

According to another embodiment, when a UE is present as is in a serving cell where the UE is transitioned to an inactive state in a next generation mobile communication system, by using a data transmission/reception procedure in a connected state while maintaining C-RNTI, it is possible to simplify the data transmission/reception procedure in the same cell in which the UE is transitioned to the inactive state with respect to MT traffic.

According to another embodiment, a process in which a UE registered in a 5G CN is reconfigured into an EPC in a next generation mobile communication system, as necessary, is proposed, whereby a core network reselection process can be specified and functions which are not supported by the 5G CN can be supported by a connection to the EPC.

BRIEF DESCRIPTION OF DRAWINGS

FIG. 1I is a diagram illustrating a UE operation of the disclosure.

FIGS. 2IA and 2IB are diagrams illustrating a data transmission/reception procedure when a UE is present as is in a serving cell where the UE is transitioned to an RRC inactive mode as an embodiment 1 of a case in which mobile terminated (MT) data to be transmitted to a UE in an RRC inactive mode is generated in the disclosure.

FIGS. 2JA and 2JB are diagrams illustrating a data transmission/reception procedure when a UE moves from a serving cell where the UE is transitioned to an RRC inactive mode to another cell as an embodiment 2 of a case in which MT data to be transmitted to a UE in an RRC inactive mode is generated in the disclosure.

MODE FOR THE INVENTION

Hereinafter, the operating principle of the disclosure will be described in detail with reference to the accompanying drawings. In describing the disclosure below, a detailed description of related known configurations or functions incorporated herein will be omitted when it is determined that the detailed description thereof may unnecessarily obscure the subject matter of the disclosure. The terms which will be described below are terms defined in consideration of the functions in the disclosure, and may be different according to users, intentions of the users, or customs. Therefore, the definitions of the terms should be made based on the contents throughout the specification.

In describing the disclosure below, a detailed description of related known configurations or functions incorporated herein will be omitted when it is determined that the detailed description thereof may unnecessarily obscure the subject matter of the disclosure. Hereinafter, embodiments of the disclosure will be described with reference to the accompanying drawings.

Terms for identifying connection nodes, terms referring to network entities, terms referring to messages, terms referring to interfaces between network entities, terms referring to a variety of types of identification information, and the like, which are used in the following description, are illustrated for convenience of description. Therefore, the disclosure may not be limited by the terminologies provided below, and other terms that indicate subjects having equivalent technical meanings may be used.

For convenience of description below, the disclosure uses terms and names defined in 3rd generation partnership project long term evolution (3GPP LTE) and LTE-advanced (LTE-A) standards. However, the disclosure is not limited to the above terms and names, and may be equally applied to a system conforming to another standard.

First Embodiment

Figure 1A:
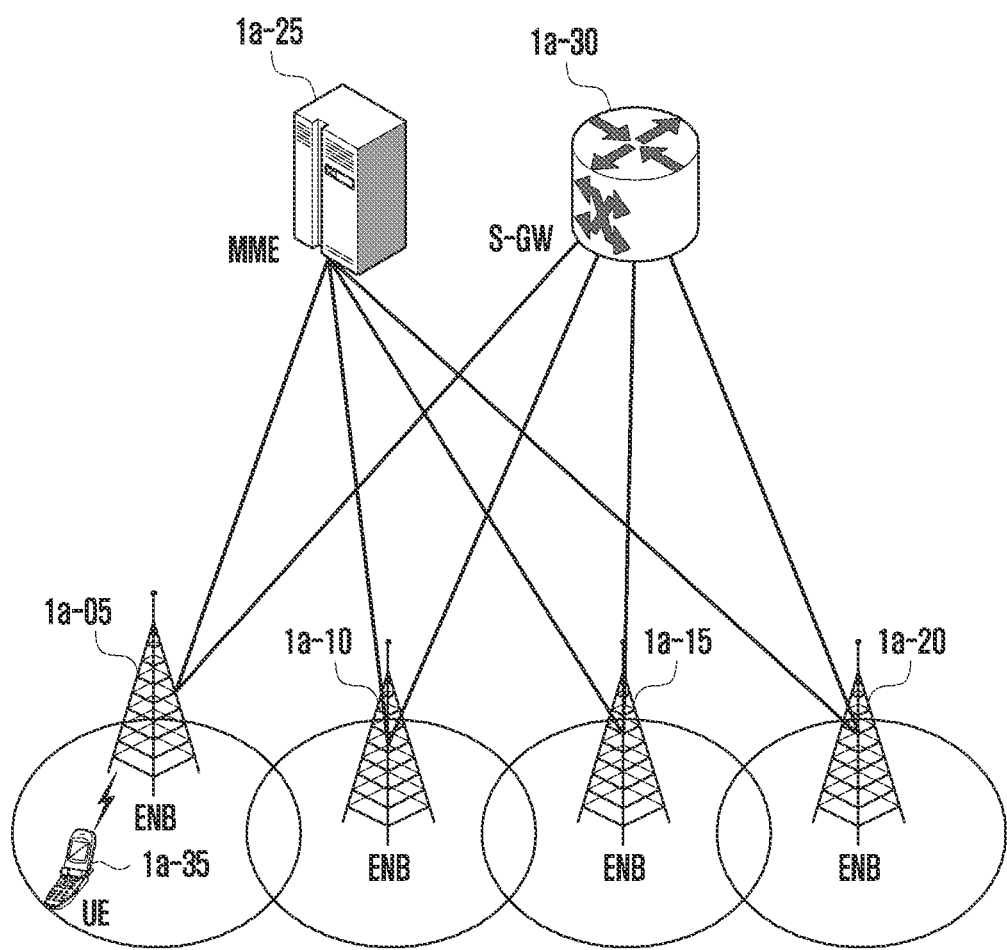
FIG. 1A is a diagram illustrating the structure of an LTE system.

FIG. 1A is a diagram illustrating the structure of an LTE system.

Referring to FIG. 1A, a radio access network of an LTE system includes next generation evolved nodes B (hereinafter, referred to as "eNBs", node Bs, or base stations) 1a-05, 1a-10, 1a-15, and 1a-20, a mobility management entity (MME) 1a-25, and a serving-gateway (S-GW) 1a-30. A user equipment (hereinafter, referred to as "UE") 1a-35 is connected to an external network through the eNBs 1a-05 to 1a-20 and the S-GW 1a-30.

In FIG. 1A, the eNBs 1a-05 to 1a-20 correspond to existing node Bs of a UMTS system. The eNB is connected to the UE 1a-35 by a radio channel and performs a more complicated role than an existing Node B. In the LTE system, all user traffic, including real-time services such as a voice over IP (VoIP) via an Internet protocol, is serviced through a shared channel, so that there is a need for a device that collects and schedules state information such as buffer state, available transmission power state, and channel state of UEs, and this device is handled by the eNBs 1a-05 to 1a-20. One eNB typically controls multiple cells. For example, in order to realize a transmission rate of 100 Mbps, an LTE system uses orthogonal frequency division multiplexing (hereinafter, referred to as "OFDM") in a bandwidth of 20 MHz as a radio access technology. In addition, an adaptive modulation & coding (hereinafter, referred to as "AMC") scheme that determines a modulation scheme and a channel coding rate according to the channel state of a UE is applied to the system. The S-GW 1a-30 is a device for providing a data bearer, and generates or removes the data bearer under the control of the MME 1a-25. The MME is a device that is in charge of various control functions as well as a mobility management function for a UE, and is connected to a plurality of eNBs.

Figure 1B:
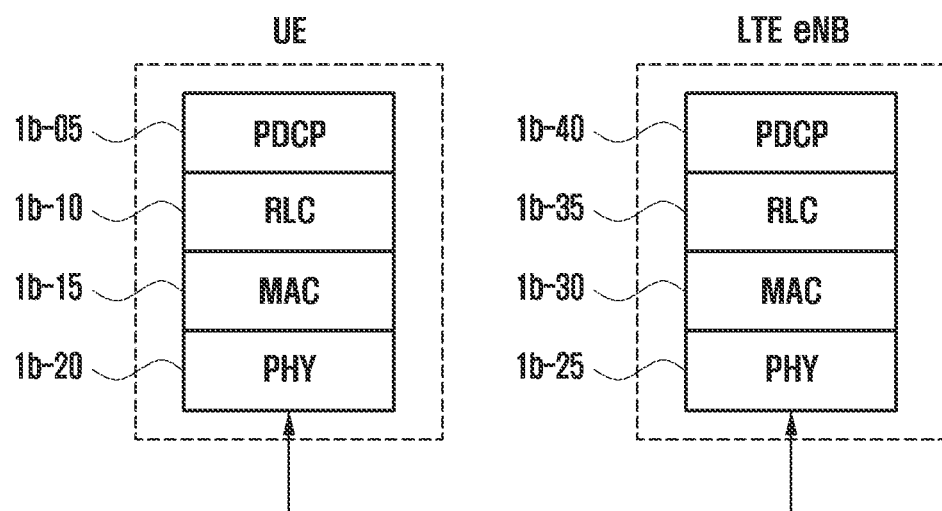
FIG. 1B is a diagram illustrating a radio protocol structure in an LTE system.

FIG. 1B is a diagram illustrating a radio protocol structure in an LTE system.

Referring to FIG. 1B, a radio protocol of an LTE system is composed of packet data convergence protocols (PDCPs) 1b-05 and 1b-40, radio link control (RLC) 1b-10 and 1b-35, and medium access control (MAC) 1b-15 and 1b-30 in a UE and an eNB, respectively. The PDCPs 1b-05 and 1b-40 is in charge of operations such as IP header compression/restoration, and the like. The main functions of the PDCP are summarized as follows.

Header compression and decompression: ROCH only
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink Radio link control (hereinafter, referred to as "RLC") $1b$-10 and $1b$-35 may reconfigure PDCP packet data unit (PDUs) to appropriate sizes to perform an ARQ operation. The main functions of the RLC are summarized as follows.

Transfer of upper layer PDUs
Error Correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MACs $1b$-15 and $1b$-30 are connected to several RLC layer entities configured in one UE, and perform an operation of multiplexing RLC PDUs into MAC PDUs and demultiplexing the RLC PDUs from the MAC PDUs. The main functions of the MAC are summarized as follows.

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling
MBMS service identification
Transport format selection
Padding Physical layers $1b$-20 and $1b$-25 perform an operation of channel-coding and modulating upper layer data to make the resultant data into an OFDM symbol and transmit the OFDM symbol to a wireless channel, or an operation of demodulating and channel-decoding the OFDM symbol received through the wireless channel to transmit the resultant data to the upper layer.

Figure 1C:
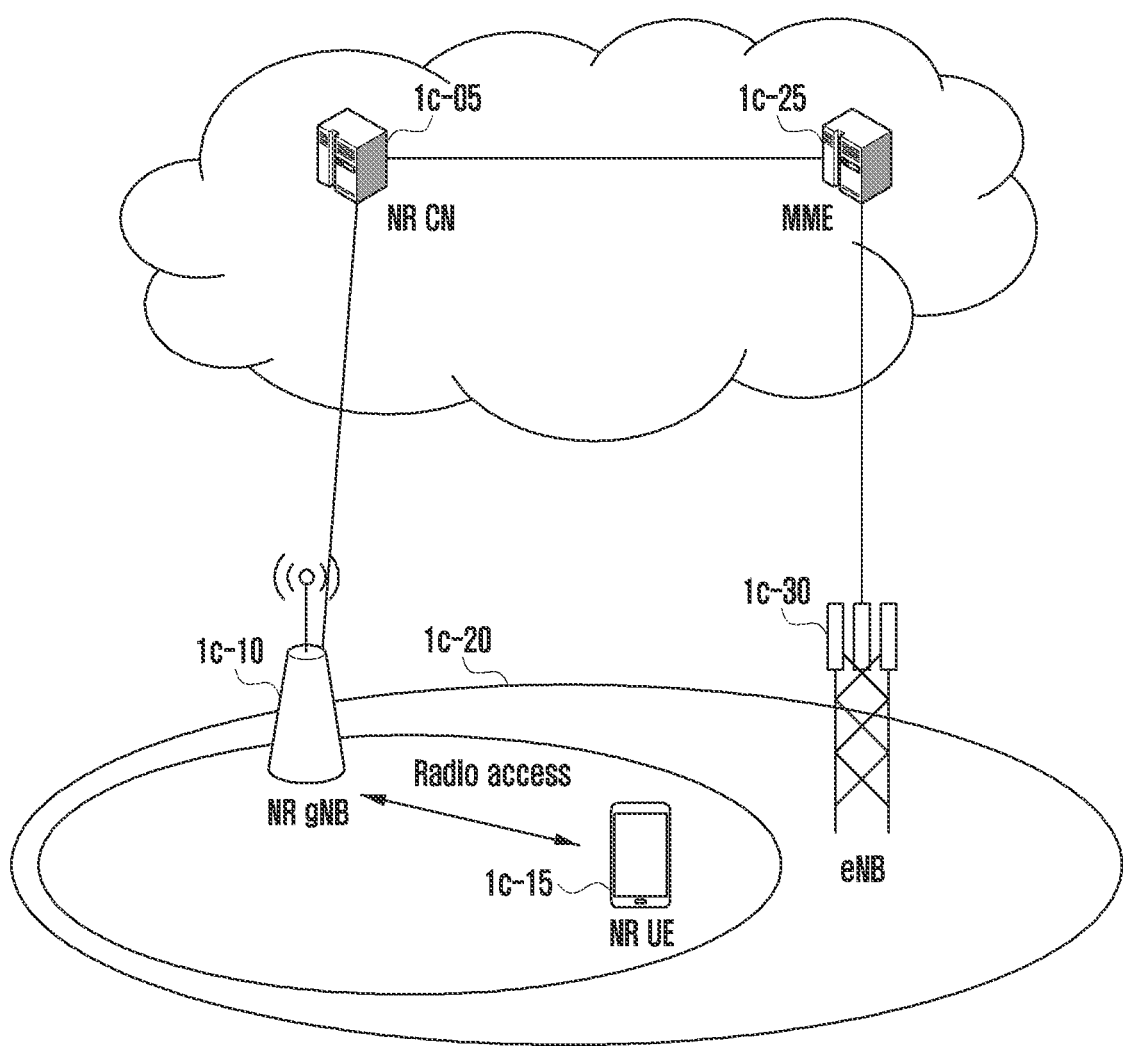
FIG. 1C is a diagram illustrating the structure of a next generation mobile communication system proposed by the disclosure.

FIG. 1C is a diagram illustrating the structure of a next generation mobile communication system proposed by the disclosure.

Referring to FIG. 1C, a radio access network of a next generation mobile communication system (hereinafter, referred to as "NR" or "$1f$") includes a next generation eNB (new radio Node B, hereinafter, referred to as "NR gNB" or "NR eNB") $1c$-10 and a new radio core network (NR CN) $1c$-05. A UE (new radio user equipment, hereinafter, referred to as "NR UE" or "UE") $1c$-15 is connected to an external network through the NR gNB $1c$-10 and the NR CN $1c$-05.

In FIG. 1C, the NR gNB $1c$-10 corresponds to an evolved node B (eNB) of an existing LTE system. The NR gNB is connected to the NR UE $1c$-15 through a wireless channel and may provide more superior service than an existing Node B. In the next generation mobile communication system, since all user traffic is serviced through a shared channel, a device that collects and schedules state information such as buffer states, available transmission power states, and channel states of UEs is required, and this device is handled by the NR NB $1c$-10. One NR gNB typically controls multiple cells. In order to implement ultra-fast data transmission compared to a current LTE, a beamforming technology that can have an existing maximum bandwidth or more and uses orthogonal frequency division multiplexing (hereinafter, referred to as "OFDM") as a radio access technology may be further combined with the system. In addition, an adaptive modulation & coding (hereinafter, referred to as "AMC") scheme that determines a modulation scheme and a channel coding rate according to the channel state of a UE is applied to the system. The NR CN $1c$-05 performs mobility support, bearer configuration, QoS configuration, and the like. The NR CN is a device that is in charge of various control functions as well as a mobility management function for a UE and is connected to a plurality of eNBs. In addition, the next generation mobile communication system can be linked to an existing LTE system, and the NR CN is connected to the MME $1c$-25 through a network interface. The MME is connected to an eNB $1c$-30 which is an existing eNB.

Figure 1D:
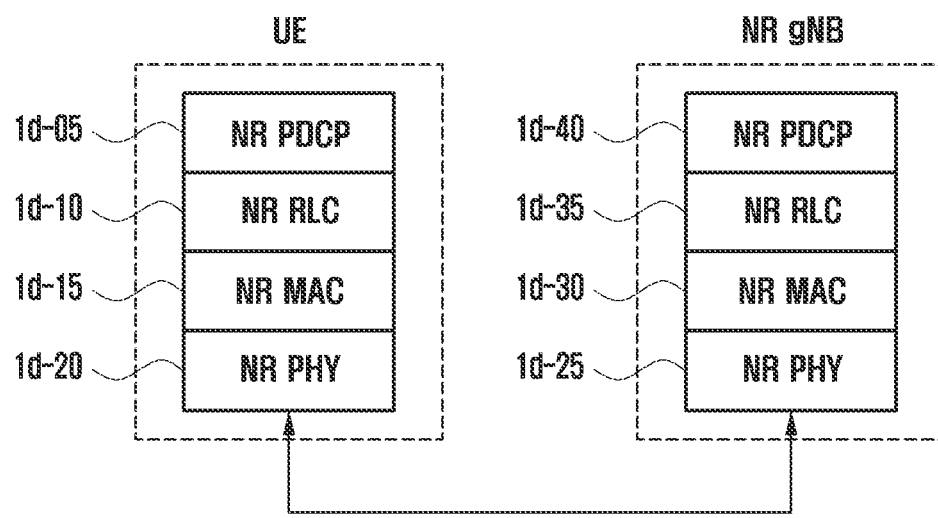
FIG. 1D is a diagram illustrating a radio protocol structure of a next generation mobile communication system proposed by the disclosure.

FIG. 1D is a diagram illustrating a radio protocol structure of a next generation mobile communication system proposed by the disclosure.

Referring to FIG. 1D, a radio protocol of a next generation mobile communication system includes NR PDCPs $1d$-05 and $1d$-40, NR RLCs $1d$-10 and $1d$-35, and NR MACs $1d$-15 and $1d$-30 at a UE and an NR eNB, respectively. The main functions of the NR PDCP $1d$-05 and $1d$-40 may include some of the following functions.

Header compression and decompression: ROHC only)
Transfer of user data
In-sequence delivery of upper layer PDUs
PDCP PDU reordering for reception
Duplicate detection of lower layer SDUs
Retransmission of PDCP SDUs
Ciphering and deciphering
Timer-based SDU discard in uplink The reordering of the NR PDCP refers to a function of reordering PDCP PDUs received from a lower layer based on a PDCP sequence number (SN), and may include a function of delivering data to an upper layer in a reordered sequence, a function of reordering the sequence to record lost PDCP PDUs, a function of reporting the state of the lost PDCP PDUs to a transmission side, and a function of requesting a retransmission of the lost PDCP PDUs.

The main functions of the NR RLCs $1d$-10 and $1d$-35 may include some of the following functions.

Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard RLC re-establishment The in-sequence delivery of the NR RLC refers to a function of sequentially delivering RLC SUDs received from a lower layer to an upper layer. The in-sequence delivery of the NR RLC may include a function of reassembling and delivering, when an original RLC SDU is segmented into several RLC SDUs and received, the received RLC SDUs, a function of reassembling the received RLC PUDs based on an RLC sequence number (SN) or a PDCP SN, a function of reordering the sequence to record lost RLC PDUs, a function of reporting the state of the lost RLC PDUs to a transmission side, a function of requesting a retransmission of the lost RLC PDUs, a function of sequentially delivering, when there is a lost RLC SDU, only the RLC SDUs before the lost RLC SDU to an upper layer, a function of sequentially delivering all the RLC SDUs received before a predetermined timer starts to an upper layer if the timer has expired even though there is a lost RLC SDU, and a function of sequentially delivering all the RLC SDUs received so far to an upper layer if a predetermined timer has expired even though there is a lost RLC SDU. The NR RLC layer may not include the concatenation function and may perform the concatenation function in the NR MAC layer or replace the concatenation function with a multiplexing function of the NR MAC layer.

The Out-of-sequence delivery of the NR RLC refers to a function of directly delivering the RLC SDUs received from the lower layer to the upper layer regardless of the sequence, and may include a function of reassembling and delivering, when an original RLC SDU is segmented into several RLC SDUs and received, the segmented RLC SDUs, and a function of storing the RLC SN or PDCP SN of the received RLC PDUs and reordering the sequence to record the lost RLC PDUs.

The NR MACs 1d-15 and 1d-30 may be connected to several NR RLC layer entities configured in one UE, and the main functions of the NR MAC may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding NR PHY layers 1d-20 and 1d-25 may perform an operation of channel-coding and modulating upper layer data to make the resultant data into an OFDM symbol and transmit the OFDM symbol to a wireless channel, or an operation of demodulating and channel-decoding an OFDM symbol received through a wireless channel to transmit the resultant data to an upper layer.

Figure 1E:
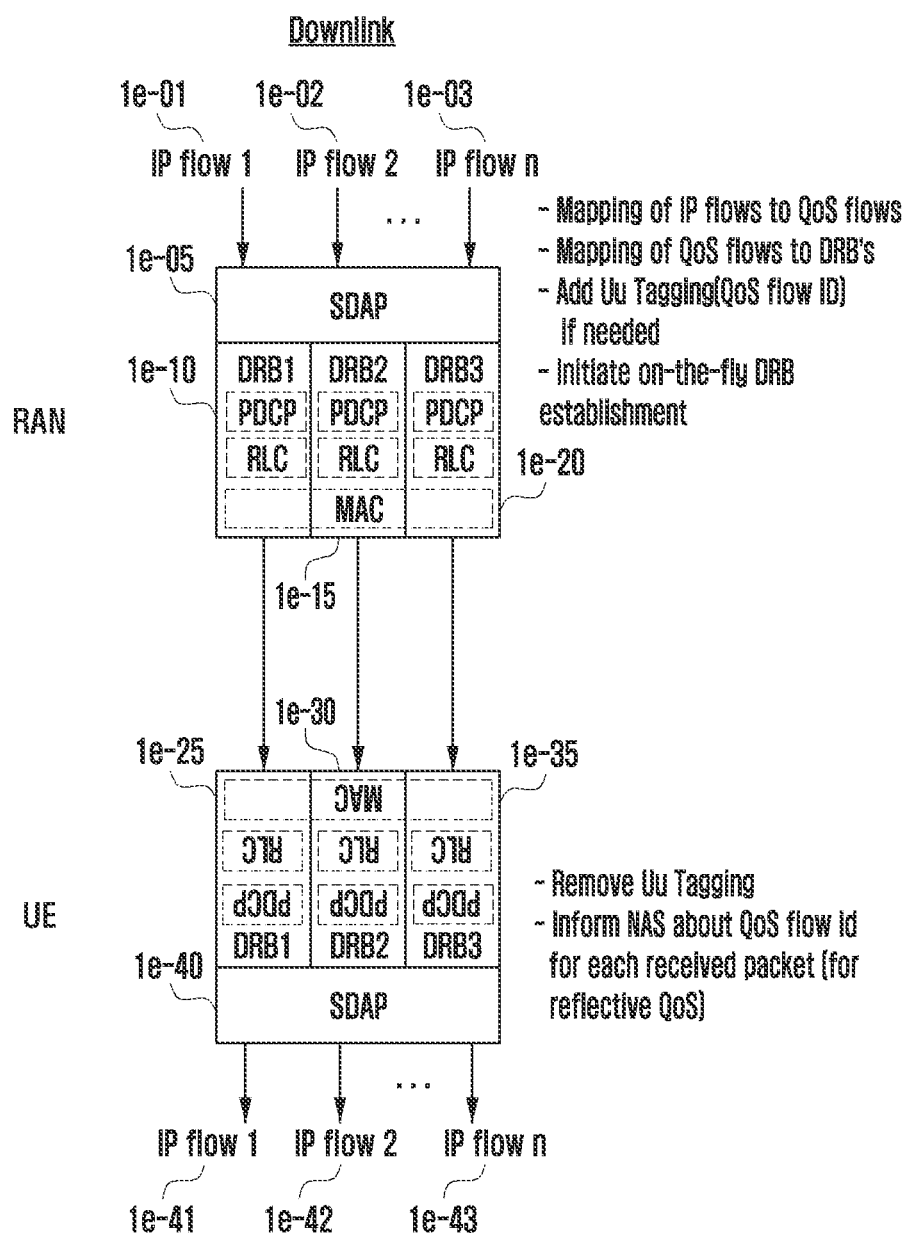
FIGS. 1EA to 1EC are diagrams illustrating new layers and functions for handling QoS in a next generation system.
Figure 1E:
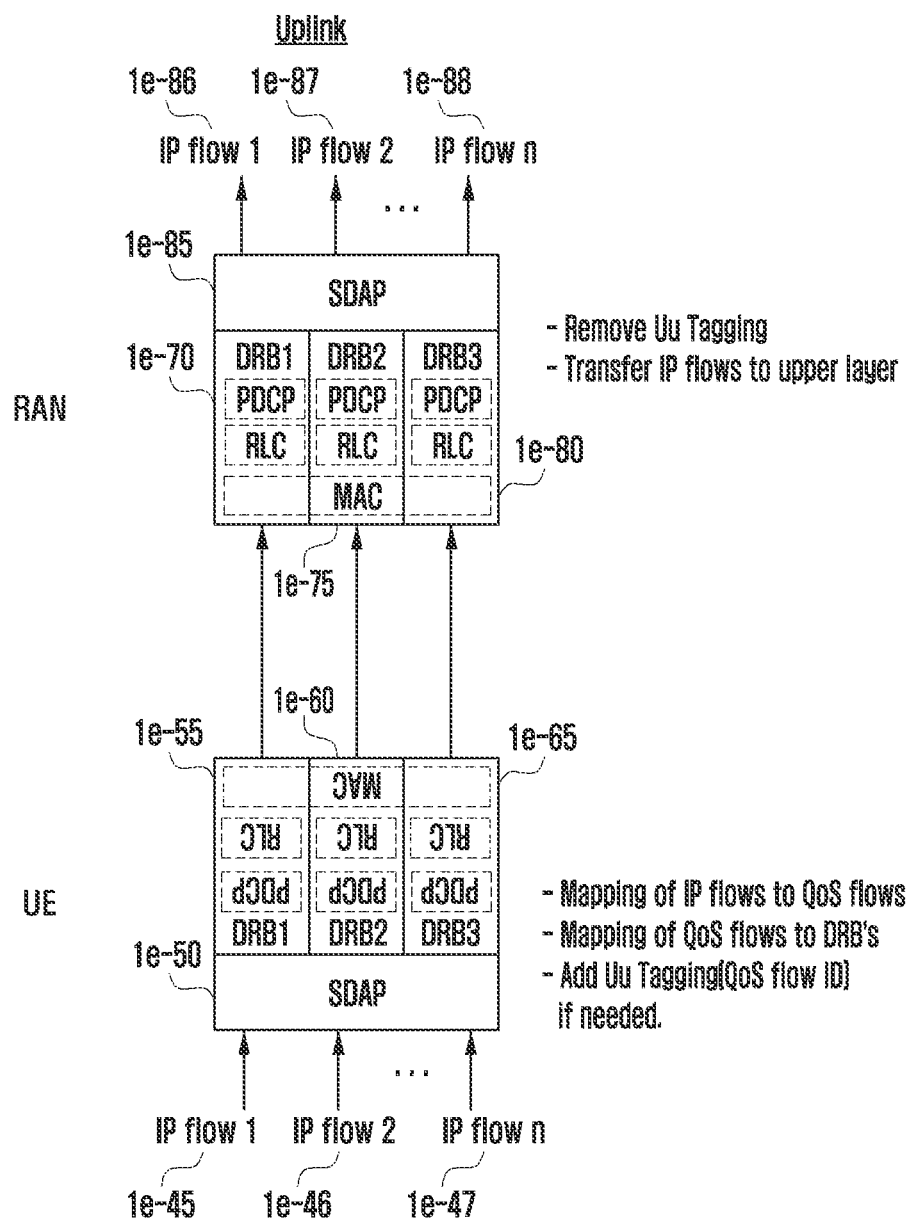
Figure 1E:
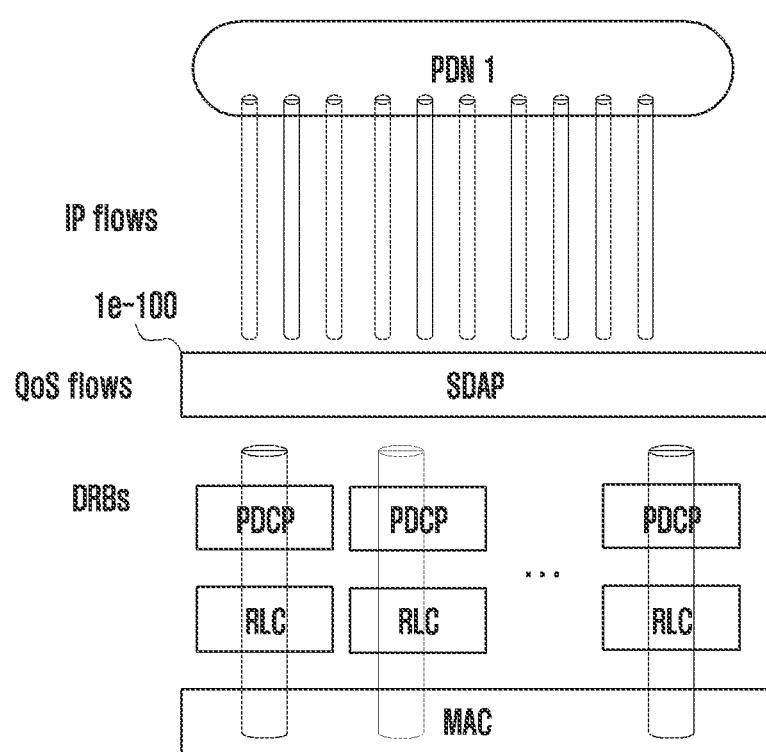

FIGS. 1EA to 1EC are diagrams illustrating new layers and functions for handling QoS in a next generation system.

In a next generation system, a service requiring different quality of service (QoS), for example, a user traffic transmission path is required to be configured according to QoS requirements or a service-specific IP flow is required to be controlled. In a next generation mobile communication system, a plurality of IP flows may be mapped to a plurality of data radio bearers (DRBs). Mapping of a plurality of IP flows with respect to a plurality of DRBs may be configured simultaneously. For example, a plurality of IP flows 1e-01, 1e-02, and 1e-03 may be mapped to the same DRB or different DRBs 1e-10, 1e-15, and 1e-20 for downlink Therefore, in order to distinguish the mapping, it is necessary to perform packet marking on a QoS flow ID in a downlink packet. Since the above function is not present in an existing LTE PDCP layer, new layers (the layer name may be named SDAP or other names) 1e-05, 1e-40, 1e-50, and 1e-85 in charge of this function may be introduced.

Marking the QoS flow ID explicitly in the downlink packet as described above is a simple method in which an access stratum (AS) of a UE provides the above information to the NAS of the UE. A method of mapping IP flows to DRBs in downlink may be performed in the following two steps 1e-100.

1. NAS level mapping: IP flow→QoS flow (QoS flow ID marking)
2. AS level mapping: QoS flow→DRB In downlink reception (UE), it is possible to determine whether there is QoS flow mapping information and reflective QoS operation for each of received DRBs 1e-25, 1e-30, and 1e-35, and to transmit the corresponding information to the NAS. Using the reflective QoS means that a UE identifies the QoS flow IDs of the IP flows received in the downlink, stores the identified QoS flow IDs of the received IP flows, and then, when uplink data for the corresponding IP flow is generated, equally marks the QoS flow IDs identified in the downlink to transmit the marked QoS flow IDs to an eNB through uplink Accordingly, the two steps of mapping may be used for uplink as well. First, a UE may map IP flows to QoS flows through NAS signaling, and may map QoS flows to predetermined DRBs 1e-55, 1e-60, and 1e-65 in the AS. The UE may mark the QoS flow ID in an uplink packet, or may transmit the packet as is without marking the QoS flow ID according to bearer or logical configuration. The above function is performed in a new layer (service data association protocol (SDAP)) of the UE. If the QoS flow ID is marked on the uplink packet, the eNB may mark and transmit the QoS flow ID on a packet for transmitting the above information to an NG-U without an uplink traffic flow template (TFT).

Specifically, in the disclosure, an operation of processing an IP packet by a new layer (SDAP layer) introduced to process QoS for each IP flow in a transmitter/receiver is as follows.

The new layer may be named SDAP or other names. The function of the new layer may include the following functions.

1. Function of routing or mapping QoS flows to DRB
2. Function of marking QoS flow identifier (ID) on downlink packets
3. Function of marking QoS flow ID on uplink packets For example, in a case in which a new SDAP layer needs to attach an SDAP header when receiving an IP packet, the new SDAP layer may insert a QoS flow ID or other necessary information into the SDAP header by applying mapping information of IP flow and QoS flow configured in advance in a network. The SDAP layer may attach the SDAP header to the IP packet and deliver the SDAP header to a bearer or PDCP layer suitable for QoS.

Figure 1F:
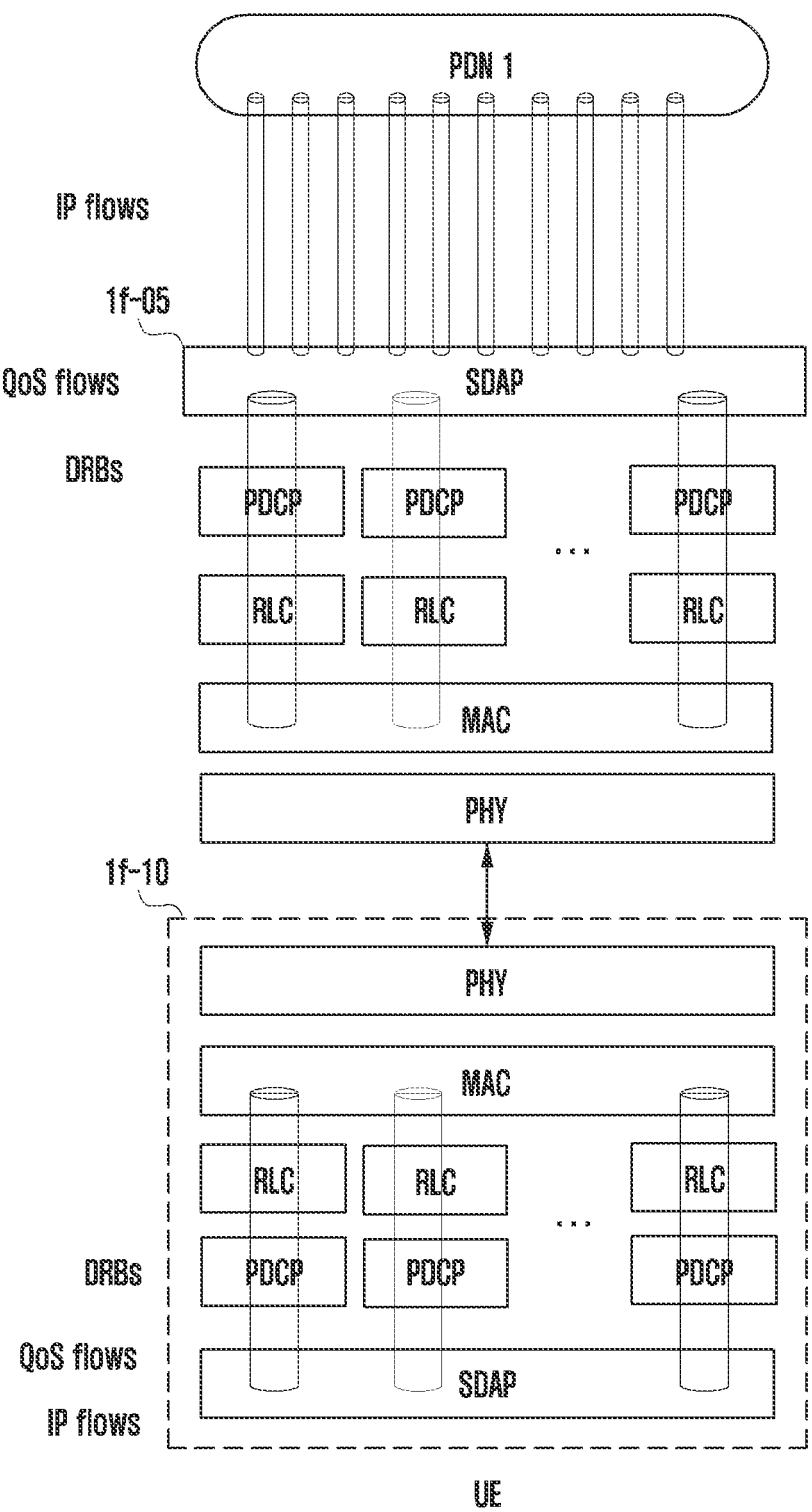
FIGS. 1FA and 1FB are diagrams illustrating a relationship between entities of an SDAP layer and entities of a PDCP layer in the disclosure.
Figure 1F:
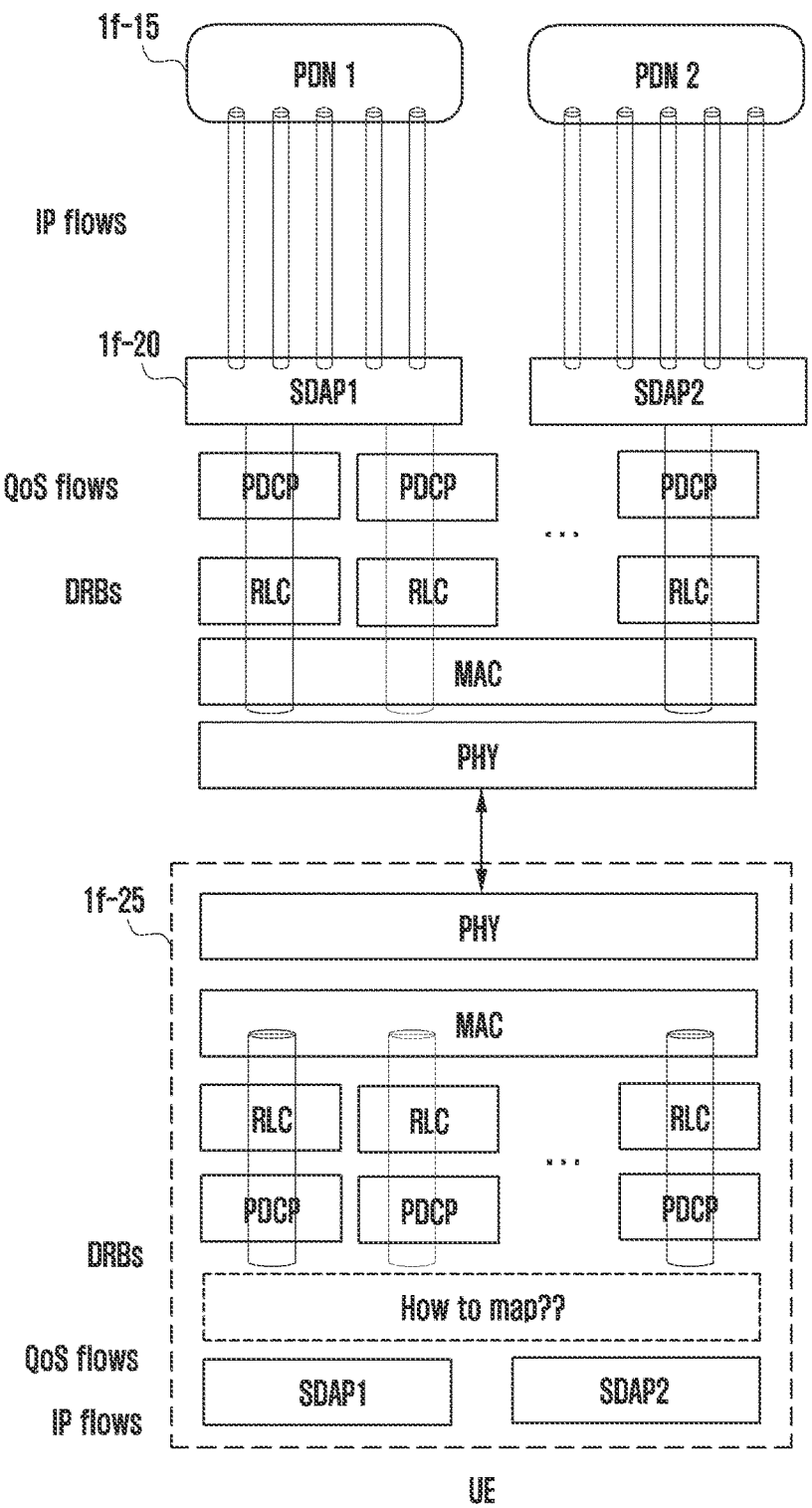

FIGS. 1FA and 1FB are diagrams illustrating a relationship between entities of an SDAP layer and entities of a PDCP layer.

In a next generation mobile communication system, an IP address of a UE may be assigned in units of PDN connection. For example, as illustrated in FIG. 1FB, assuming that a UE receives an IP packet Internet service from PDN connection 1 and a VoLTE service from PDN connection 2, a UE 1*f*-25 receives two IP addresses (IP address 1 is an address for transmitting and receiving data to and from PDN connection 1 (1*f*-25), and IP address 2 is an address for transmitting and receiving data to and from PDN connection 2 (1*f*-25)). The UE 1*f*-25 may distinguish IP flows by an IP address of a service corresponding to the IP address of the UE. Initially, the UE 1*f*-25 and an eNB may receive mapping information of IP flow and QoS flow from a network. Next, the UE 1*f*-25 and the eNB may perform a two-step mapping operation (IP flow→QoS flow→DRB) in the SDAP layer entity by using the mapping information. In addition, one SDAP layer entity 1*f*-20 may be configured as the PDN connection unit 1*f*-15. One SDAP entity is required to perform two-step mapping (IP flow→QoS flow→DRB) of IP flows from one PDN connection. In addition, multiple PDCP entities or DRB bearers may be mapped to one SDAP entity. Therefore, IP flows received by one SDAP entity are mapped to QoS flows, and then QoS is mapped to a suitable PDCP entity or bearer. Here, several different QoS flows may be mapped to one PDCP entity or bearer. Note that IP flows from different PDN connections, that is, QoS flows cannot be mapped to the same bearer. As a result, the QoS flows processed by an SDAP entity 1 may not be mapped to the PDCP entity or bearer connected to an SDAP entity 2, but may be mapped only to the PDCP entity or bearer connected to the SDAP entity 1. For example, QoS flows generated in each SDAP entity may be mapped only to the PDCP entity or bearer connected to the corresponding SDAP entity.

The disclosure proposes a method of setting up mapping between SDAP entities and PDCP entities in a next generation mobile communication system.

Figure 1G:
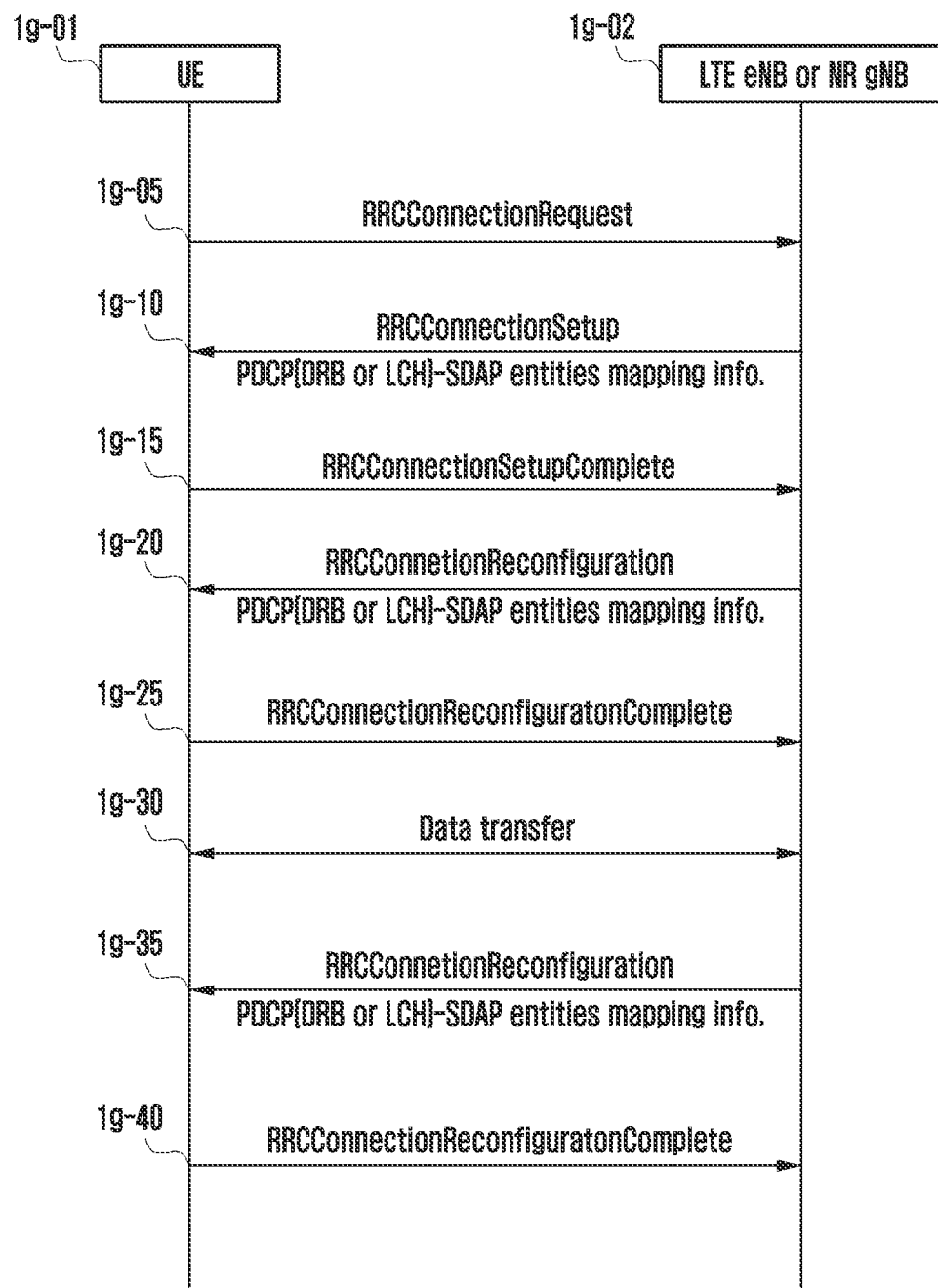
FIG. 1G is a diagram illustrating a procedure in which an eNB configures each layer entity (hereinafter, referred to as "entity") and bearer by RRC signaling (message) in a next generation mobile communication system of the disclosure.

FIG. 1G is a diagram illustrating a procedure in which an eNB configures each layer entity (hereinafter, referred to as "entity") and bearer by RRC signaling (message) in a next generation mobile communication system of the disclosure.

FIG. 1G is a diagram illustrating a procedure in which a UE establishes a connection with a network in order to transmit and receive data and configures entities of each layer (hereinafter, referred to as "entity"), for example, a procedure of setting up SDAP entities and PDCP entities which are new layer entities.

A UE 1*g*-01 (idle mode UE) that is not currently connected may perform an RRC connection establishment process with an LTE eNB or NR gNB 1*g*-02 when data to be transmitted is generated. The UE 1*g*-01 may establish backward transmission synchronization with the eNB through a random access procedure and may transmit an RRCConnectionRequest message to the eNB 1*g*-02 at 1*g*-05. The message may include an identifier of the UE 1*g*-01 and a reason for establishing a connection. At 1*g*-10, the eNB 1*g*-02 may transmit an RRCConnectionSetup message so that the UE 1*g*-01 establishes an RRC connection. The message may include RRC connection establishment information, configuration information of each layer, and the like. For example, the message may include configuration information for a PHY or NR PHY entity, a MAC or NR MAC entity, an RLC or NR RLC entity, and a PDCP or NR PDCP entity, and may include information indicating configuration for specific functions among functions (layer-specific functions described in FIG. 1B or 1D) supported by the layer entities. In addition, the message may include mapping information between logical channels (LCHs) and logical channel groups (LCGs), mapping information about TTI with LCHs or LCGs, information (indication) indicating whether LCHs or LCGs correspond to URLLC services, and the like. In addition, the message may include mapping information between the PDCP entity and the SDAP entity in PDCP configuration information (PDCP-config) or logical channel configuration information (Logicalchannelconfig) (for example, may indicate mapping information using an SDAP identifier, a DRB identifier, a PDCP identifier, an LCH identifier, etc.), a presence/absence indicator of the SDAP header (determining whether to use the SDAP header in the SDAP layer entity), and a QoS flow ID list (indicating a list of QoS flows transmittable/receivable in a corresponding PDCP entity, logical channel, or bearer). In addition, the message may include configuration information for mapping a PDU session identifier corresponding to an SDAP identifier in order to configure information on a PDU session to which the SDAP entity is to be applied. The message may include configuration information indicating whether a bearer having which DRB identifier for each PDU session or for each SDAP entity is a default bearer (one default bearer is configured for each PDU session or SDAP entity, and an indicator indicating which DRB is a default bearer among a plurality of DRBs may be included in bearer configuration information, logical channel configuration information, or SDAP configuration information). Upon receipt of the message, the UE may connect each PDCP entity and each SDAP entity (logically connecting, for example, which PDCP entities QoS flows from any SDAP entity can be mapped or transmitted to is configured). The mapping information between the PDCP entity and the SDAP entity of the message may be optional. For example, if the message does not contain the mapping information, each PDCP entity may be connected to a default SDAP entity (the default SDAP entity may also be indicated in the message). Likewise, the presence or absence of the SDAP header in the message may be optional. For example, if there is no indicator indicating the presence or absence of the SDAP header, the header may be regarded as always present or nonexistent.

The RRC connection is also called a signaling radio bearer (SRB), and may be used for transmitting and receiving an RRC message, which is a control message between the UE 1*g*-01 and the eNB 1*g*-02. At 1*g*-15, the UE 1*g*-01 which has set up the RRC connection may transmit an RRCConnetionSetupComplete message to the eNB 1*g*-02. At 1*g*-20, the eNB 1*g*-02 may transmit an RRCConnection-Reconfiguration message to the UE 1*g*-01 to configure a data radio bearer (DRB). The message may include RRC connection configuration information, configuration information of each layer, and the like. For example, the message may include configuration information for a PHY or NR PHY entity, a MAC or NR MAC entity, an RLC or NR RLC entity, and a PDCP or NR PDCP entity, and may include information indicating configuration for specific functions among functions (layer-specific functions described in FIG. 1B or 1D) supported by the layer entities. In addition, the message may include mapping information between LCHs and LCGs, mapping information about TTI with LCHs or LCGs, information (indication) indicating whether LCHs or LCGs correspond to URLLC services, and the like. In addition, the message may include mapping information between the PDCP entity and the SDAP entity in PDCP configuration information (PDCP-config) or logical channel configuration information (Logicalchannelconfig) (for example, may indicate mapping information using an SDAP identifier, a DRB identifier, a PDCP identifier, an LCH identifier, etc.), a presence/absence indicator of the SDAP header (determining whether to use the SDAP header in the SDAP layer entity), and a QoS flow ID list (indicating a list of QoS flows transmittable/receivable in a corresponding PDCP entity, logical channel, or bearer). In addition, the message may include configuration information for mapping a PDU session identifier corresponding to an SDAP identifier in order to configure information on a PDU session to which the SDAP entity is to be applied. The message may include configuration information indicating whether a bearer having which DRB identifier for each PDU session or for each SDAP entity is a default bearer (one default bearer is configured for each PDU session or SDAP entity, and an indicator indicating which DRB is a default bearer among a plurality of DRBs may be included in bearer configuration information, logical channel configuration information, or SDAP configuration information). Upon receipt of the message, the UE 1g-01 may connect each PDCP entity and each SDAP entity (logically connecting, for example, which PDCP entities QoS flows from any SDAP entity can be mapped or transmitted to is configured). The mapping information between the PDCP entity and the SDAP entity of the message may be optional. For example, if the message does not contain the mapping information, each PDCP entity may be connected to a default SDAP entity (the default SDAP entity may also be indicated in the message). Likewise, the presence or absence of the SDAP header in the message may be optional. For example, if there is no indicator indicating the presence or absence of the SDAP header, the header may be regarded as always present or nonexistent. The message includes configuration information of a DRB in which user data is to be processed, and the UE 1g-01 may apply the above information to configure the DRB, may configure functions of each layer, and may transmit an RRCConnectionReconfiguration Complete message to the eNB at 1g-25. When the above process is completed, the UE 1g-01 may transmit and receive data to and from the eNB 1g-02 at 1g-30. While transmitting and receiving data, the eNB 1g-02 may reconfigure the configuration information of each layer of the UE by transmitting the RRCConnectionReconfiguration message back to the UE 1g-01 at 1g-35. The message may include RRC connection establishment information, configuration information of each layer, and the like. For example, the message may include configuration information for a PHY or NR PHY entity, a MAC or NR MAC entity, an RLC or NR RLC entity, and a PDCP or NR PDCP entity, and may include information indicating configuration for specific functions among functions (layer-specific functions described in FIG. 1B or 1D) supported by the layer entities. In addition, the message may include mapping information between LCHs and LCGs, mapping information about TTI with LCHs or LCGs, information (indication) indicating whether LCHs or LCGs correspond to URLLC services, and the like. The message may include mapping information between the PDCP entity and the SDAP entity in PDCP configuration information (PDCP-config) or logical channel configuration information (Logicalchannelconfig) (for example, may indicate mapping information using an SDAP identifier, a DRB identifier, a PDCP identifier, an LCH identifier, etc.), a presence/absence indicator of the SDAP header (determining whether to use the SDAP header in the SDAP layer entity), and a QoS flow ID list (indicating a list of QoS flows transmittable/receivable in a corresponding PDCP entity, logical channel, or bearer). The message may include configuration information for mapping a PDU session identifier corresponding to an SDAP identifier in order to configure information on a PDU session to which the SDAP entity is to be applied. The message may include configuration information indicating whether a bearer having which DRB identifier for each PDU session or for each SDAP entity is a default bearer (one default bearer is configured for each PDU session or SDAP entity, and an indicator indicating which DRB is a default bearer among a plurality of DRB s may be included in bearer configuration information, logical channel configuration information, or SDAP configuration information). Upon receipt of the message, the UE may connect each PDCP entity and each SDAP entity (logically connecting, for example, which PDCP entities QoS flows from any SDAP entity can be mapped or transmitted to is configured). The mapping information between the PDCP entity and the SDAP entity of the message may be optional. For example, if the message does not contain the mapping information, each PDCP entity may be connected to a default SDAP entity (the default SDAP entity may also be indicated in the message). Likewise, the presence or absence of the SDAP header in the message may be optional. For example, if there is no indicator indicating the presence or absence of the SDAP header, the header may be regarded as always present or nonexistent. If the configuration of each layer entity is completed according to the message, the UE 1g-01 may transmit an RRCConnectionReconfiguration-Complete message to the eNB 1g-02 at 1g-40.

Figure 1H:
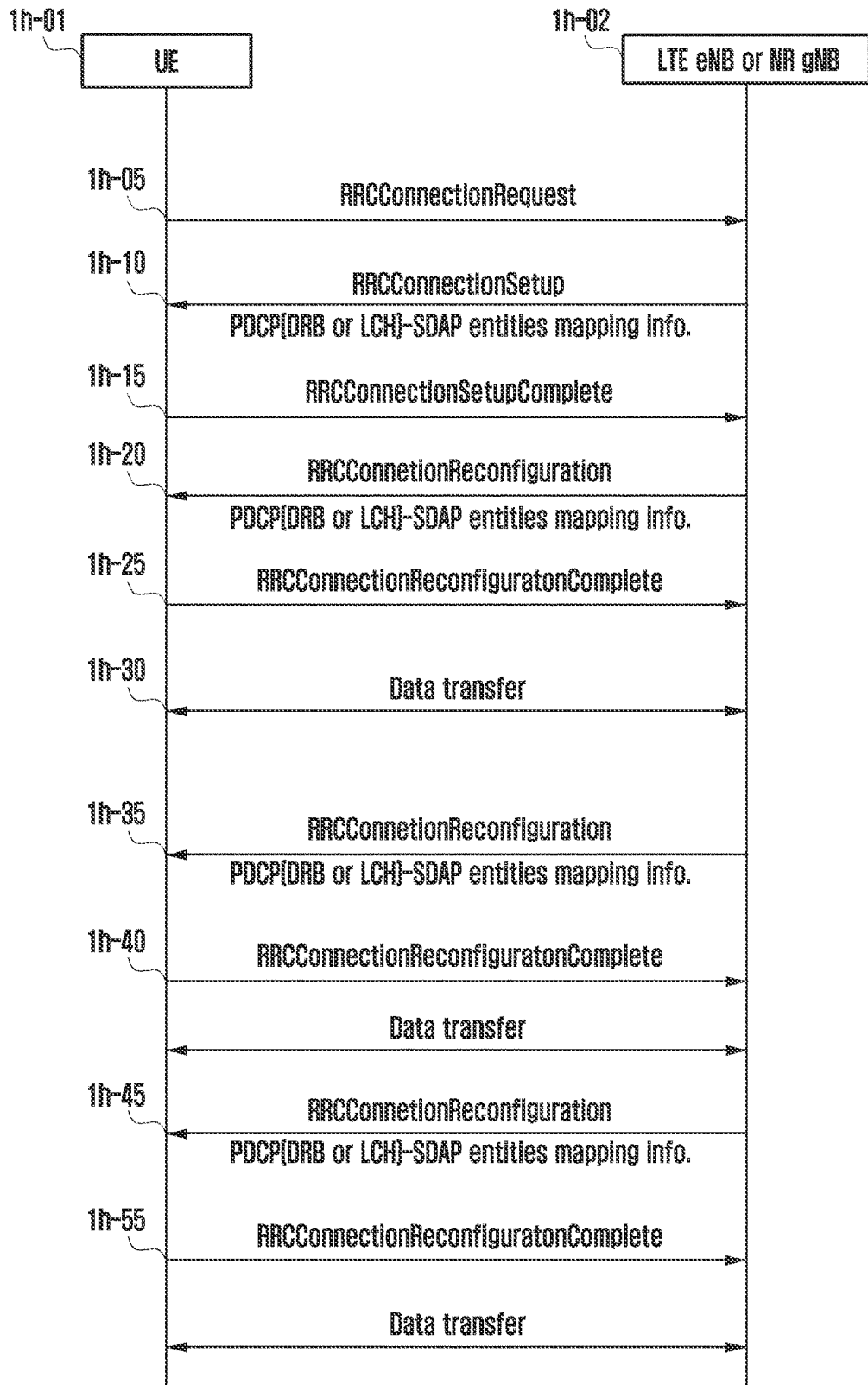
FIG. 1H is a diagram illustrating a specific procedure in which a UE configures SDAP entities and PDCP entities in a next generation mobile communication system.
Figure 11:
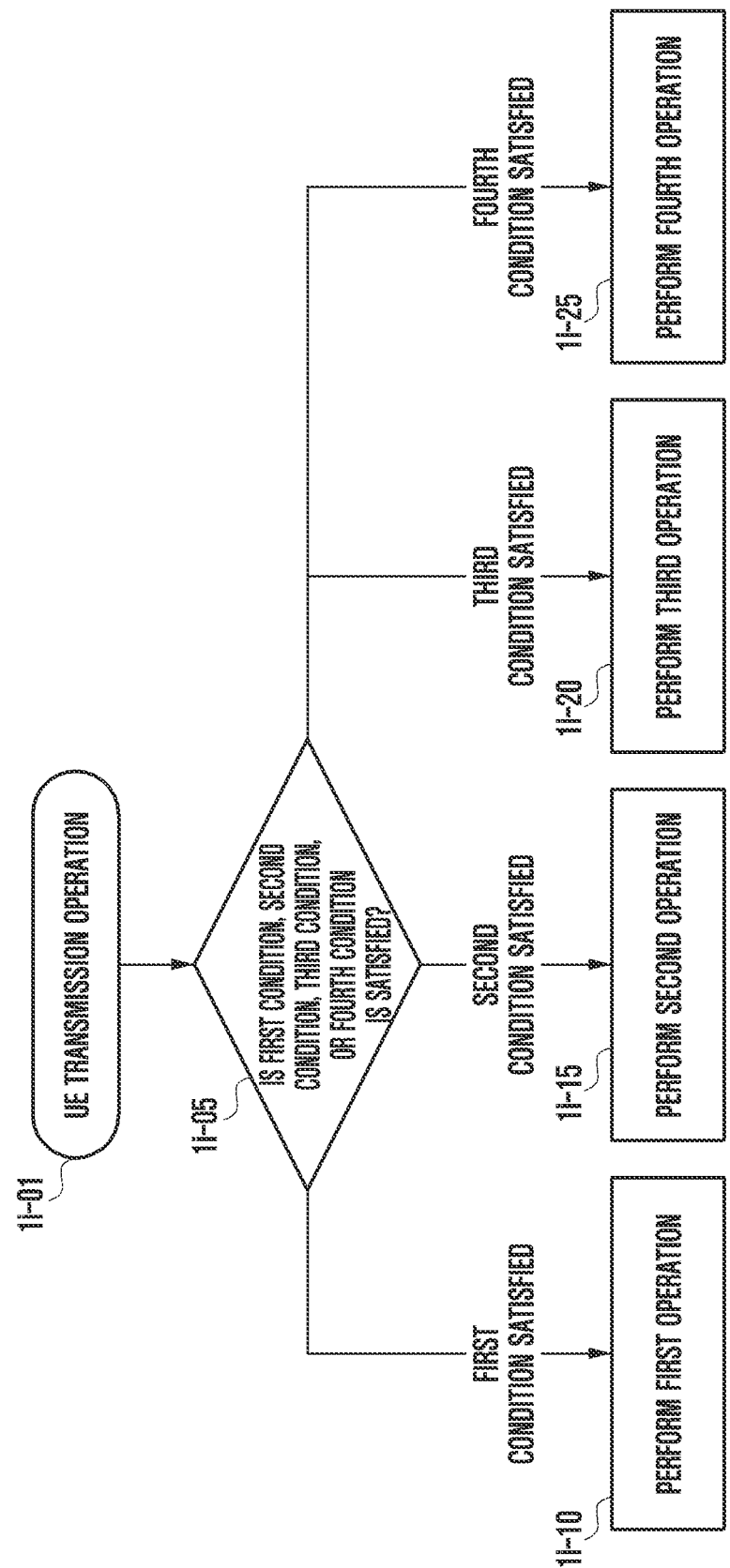

FIG. 1H is a diagram illustrating a specific procedure in which a UE configures SDAP entities and PDCP entities in a next generation mobile communication system.

A UE 1h-01 (idle mode UE) that is not currently connected may perform an RRC connection establishment process with an LTE eNB or NR gNB 1h-02 when data to be transmitted is generated. The UE 1h-01 may establish backward transmission synchronization with the eNB 1h-02 through a random access procedure and may transmit an RRCConnectionRequest message to the eNB 1h-02 at 1h-05. The message may include an identifier of the UE 1h-01 and a reason for establishing a connection. At 1h-10, the eNB 1h-02 may transmit an RRCConnectionSetup message so that the UE 1h-01 establishes an RRC connection. The message may include mapping information between the PDCP entity and the SDAP entity in PDCP configuration information (PDCP-config) or logical channel configuration information (Logicalchannelconfig) (for example, may indicate mapping information using an SDAP identifier, a DRB identifier, a PDCP identifier, an LCH identifier, etc.), a presence/absence indicator of the SDAP header (determining whether to use the SDAP header in the SDAP layer entity), and a QoS flow ID list (indicating a list of QoS flows transmittable/receivable in a corresponding PDCP entity, logical channel, or bearer). The message may include configuration information for mapping a PDU session identifier corresponding to an SDAP identifier in order to configure information on a PDU session to which the SDAP entity is to be applied. The message may include configuration information indicating whether a bearer having which DRB identifier for each PDU session or for each SDAP entity is a default bearer (one default bearer is configured for each PDU session or SDAP entity, and an indicator indicating which DRB is a default bearer among a plurality of DRBs may be included in bearer configuration information, logical channel configuration information, or SDAP configuration information). When the above procedure is completed, the UE 1h-01 may transmit an RRCConnetionSetupComplete message to the eNB 1h-02 at 1h-15. At 1h-20, the eNB may transmit an RRCConnectionReconfiguration message to the UE 1h-01 in order to configure a DRB. The message may include mapping information between the PDCP entity and the SDAP entity in PDCP configuration information (PDCP-config) or logical channel configuration information (Logicalchannelconfig) (for example, may indicate mapping information using an SDAP identifier, a DRB identifier, a PDCP identifier, an LCH identifier, etc.), a presence/absence indicator of the SDAP header (determining whether to use the SDAP header in the SDAP layer entity), and a QoS flow ID list (indicating a list of QoS flows transmittable/receivable in a corresponding PDCP entity, logical channel, or bearer). Upon receipt of the message, the UE 1h-01 may connect each PDCP entity and each SDAP entity (logically connecting, for example, which PDCP entities QoS flows from any SDAP entity can be mapped or transmitted to is configured). The mapping information between the PDCP entity and the SDAP entity of the message may be optional. For example, if the message does not contain the mapping information, each PDCP entity may be connected to a default SDAP entity (the default SDAP entity may also be indicated in the message). Likewise, the presence or absence of the SDAP header in the message may be optional. For example, if there is no indicator indicating the presence or absence of the SDAP header, the header may be regarded as always present or nonexistent. The message may include configuration information for mapping a PDU session identifier corresponding to an SDAP identifier in order to configure information on a PDU session to which the SDAP entity is to be applied. The message may include configuration information indicating whether a bearer having which DRB identifier for each PDU session or for each SDAP entity is a default bearer (one default bearer is configured for each PDU session or SDAP entity, and an indicator indicating which DRB is a default bearer among a plurality of DRBs may be included in bearer configuration information, logical channel configuration information, or SDAP configuration information). For example, the message may include configuration information of a DRB in which user data is to be processed, and the UE 1h-01 may apply the above information to configure the DRB, may configure functions of each layer, and may transmit an RRCConnectionReconfiguration Complete message to the eNB 1h-02 at 1h-25. The configuration information between the SDAP entity and the PDCP entity (or bearer DRB) may be reconfigured in RRC Connection Reconfiguration configuration information such as 1h-35 and 1h-40, or 1h-45 and 1h-55 even during data transmission and reception. For example, mapping information between the SDAP entity, bearers, and QoS flows may be updated by changing, adding, or deleting the PDU session.

Specifically, when the eNB configures a first DRB (DRB #0) or a logical channel or PDCP entity and configures a default SDAP entity (SDAP #0), the eNB may enable configuration information of PDCP-config (or Logicalchannelconfig)={DRB ID (or LCH ID)=0, SDAP header configuration instruction=present, QoS flow ID list #0} to be included in an RRCConnectionSetup message or an RRCConnectionReconfiguration message and may transmit the message to the UE (ID being identifier). The QoS flow ID list may indicate a list of QoS flow IDs mapped with the DRB ID (or PDCP entity).

Upon receipt of the message, the UE may generate a PDCP #0 entity (or DRB #0), may generate an SDAP #0 entity, and may connect a default SDAP #0 entity and the PDCP #0 entity because an SDAP ID for the PDCP #0 entity is not designated (or because there is no mapping configuration information on the PDCP entity (or logical channel) and the SDAP entity).

In the above, bearer configuration with the entity is completed, and the SDAP layer entity of the eNB may attach the SDAP header to a packet of an IP flow transmitted from an upper layer, and may then transmit the packet to the PDCP #0 entity (or bearer) to transmit the packet to the UE. The PDCP #0 entity of the UE having received this may remove the SDAP header from the received PDCP SDU and transmit the same to the upper layer.

The eNB may reconfigure the entities or bearers of the UE by transmitting an RRC Connection Reconfiguration message 1h-35 for some reason. The eNB may generate a DRB #1, may enable the following information to be included in the message when transmitting the message, and may transmit the message.

PDCP-config (or logicalchannelconfig)={DRB ID (or logical channel ID)=1, SDAP header configuration=not present, QoS flow ID list #1}

Next, since an SDAP ID for PDCP #1 (or DRB #1) is not designated in the received information, the UE may generate a PDCP #1 entity (or DRB #1) and may be connected to a default SDAP entity (SDAP #0, which was previously configured in the above).

Next, the eNB may receive the IP packet transmitted from the upper layer in the SDAP #0 entity, may attach the SDAP header to the IP packets (QoS flow) belonging to the QoS flow ID list #0 to transmit the same to the PDCP #0, and may then transmit the IP packets attached with the SDAP header to the UE. The UE may remove the SDAP header from the PDCP SDU received from the PDCP #0, and may then transmit the resultant data to the upper layer.

The eNB may receive the IP packet transmitted from the upper layer at the SDAP #0 entity, may transmit IP packets belonging to a QoS flow ID list #1 to the PDCP #1, and may transmit the transmitted IP packets to the UE. The UE may deliver the PDCP SDU received from the PDCP #1 to the upper layer.

The eNB may reconfigure entities or bearers of the UE by transmitting an RRC Connection Reconfiguration message 1h-45 for some reason. The eNB may generate a DRB #2, may enable the following information to be included in the message when transmitting the message, and may transmit the message.

PDCP-config (or logicalchannelconfig)={DRB ID (or logical channel ID)=2, SDAP ID=#1, SDAP header configuration=not present, QoS flow id list #2}

Next, a PDCP #2 entity is generated since the received information includes PDCP #2 (or DRB #2) configuration information, an SDAP #1 entity is generated since an SDAP ID for the PDCP #2 (or DRB #2) is designated as #1, and the UE may connect the PDCP #2 entity (or DRB #2) with the SDAP #1 entity.

Next, the eNB may receive the IP packet transmitted from the upper layer in the SDAP #0 entity, may attach the SDAP header to the IP packets (QoS flow) belonging to the QoS flow ID list #0 to deliver the resultant data to the PDCP #0, and may transmit the IP packets attached with the SDAP header to the UE. The UE may remove the SDAP header from the PDCP SDU received from the PDCP #0, and may then transmit the same to the upper layer.

The eNB may receive the IP packet transmitted from the upper layer in the SDAP #0 entity, may transmit the IP packets (QoS flow) belonging to the QoS flow ID list #1 to the PDCP #1, and may transmit the transmitted IP packets to the UE. The UE may deliver the PDCP SDU received from the PDCP #1 to the upper layer.

When the eNB receives the IP packet transmitted from the upper layer in the SDAP #1 entity, the eNB may transmit IP packets (QoS flow) belonging to a QoS flow ID list #2 to a PDCP #2 entity, and may transmit the IP packets to the UE. When the UE receives the PDCP SDU in the PDCP #2, the UE may immediately transmit the PDCP SDU to the upper layer since there is no header information in configuration information.

The above-described configuration information between the SDAP entity and the PDCP entity (or bearer (DRB)) may be included in an information element which is called RadioResourceConfigDedicated included in an RRC Connection Setup message 1h-10 or an RRC Connection Reconfiguration message 1h-20, 1h-35, or 1h-45, and may be indicated.

A first embodiment in which configuration information between the SDAP entity and the PDCP entity (or bearer (DRB)) is indicated in the RadioResourceConfigDedicated is as follows.

It is possible to indicate a plurality of SDAP entities by adding sdap-ToAddModList as shown below. Using SDAP-ToAddMod whenever each SDAP entity is added, a PDU session identifier (pdu-session-Identity, when mapping of the SDAP entity and the PDU session can be known even though not indicated, or when the mapping thereof is known as NAS, or in the case of mapping, the identifier may not be present), the identifier of the SDAP entity (sdap-Identity), a flow to be processed in the SDAP entity and DRB mapping information or a list (sdap-FlowToDRBList), information of the PDCP entity or bearers (DRBs) to be connected to the SDAP entity, information (DRB-ToAddModList) of logical channels, and the like may be included. In DRB-ToAddMod of DRB-ToAddModList that configures the bearer, an indicator defaultRB may be defined to indicate which bearer is a default bearer (that is, whether a bearer corresponding to which DRB identifier (drb-Identity) is a default bearer can be indicated). For example, whether a bearer having which bearer identifier among bearers connected to the SDAP entity is a default bearer can be indicated. One default bearer may be configured for each SDAP entity or identifier.

The above-described configuration information between the SDAP entity and the PDCP entity (or bearer (DRB)) may be included in an information element which is called RadioResourceConfigDedicated included in the RRC Connection Setup message 1h-10 or the RRC Connection Reconfiguration message 1h-20, 1h-35, and 1h-45, and may be indicated.

A second embodiment in which configuration information between the SDAP entity and the PDCP entity (or bearer (DRB)) is indicated in the RadioResourceConfigDedicated is as follows.

It is possible to indicate a plurality of SDAP entities by adding sdap-ToAddModList as shown below. Using SDAP-ToAddMod whenever each SDAP entity is added, a PDU session identifier (pdu-session-Identity, when mapping of the SDAP entity and the PDU session can be known even though not indicated, or when the mapping thereof is known as NAS, or in the case of mapping, the identifier may not be present), the identifier of the SDAP entity (sdap-Identity), a flow to be processed in the SDAP entity and DRB mapping information or a list (sdap-FlowToDRBList), and the like may be included. In DRB-ToAddMod of DRB-ToAddModList that configures the bearer, an SDAP entity identifier (sdap-Identity) may be included in order to indicate information of the PDCP entity or bearers (DRBs) to be connected to the SDAP entity and information of logical channels. An indicator defaultRB may be defined to indicate which bearer is a default bearer (for example, whether a bearer corresponding to which DRB identifier (drb-Identity) is a default bearer can be indicated). Whether a bearer having which bearer identifier among bearers connected to the SDAP entity is a default bearer can be indicated. One default bearer may be configured for each SDAP entity or identifier.

FIG. 1I is a diagram illustrating a UE operation of the disclosure.

A UE 1i-01 receives an RRC message (RRC Connection Setup or RRC Connection Reconfiguration message) from an eNB and
 identifies PDCP configuration information or logical channel information
 to perform a first operation at 1i-10 when a first condition is satisfied at 1i-05,
 to perform a second operation 1i-15 when a second condition is satisfied at 1i-05,
 to perform a third operation 1i-20 when a third condition is satisfied at 1i-05, and
 to perform a fourth operation 1i-25 when a fourth condition is satisfied at 1i-25.

The first condition may be a case in which PDCP entity configuration information having a predetermined identifier is included, an SDAP entity identifier corresponding thereto is indicated, and the absence of an SDAP header is indicated.

The second condition may be a case in which PDCP entity configuration information having a predetermined identifier is included, an SDAP entity identifier corresponding thereto is indicated, and the presence of an SDAP header is indicated.

The third condition may be a case in which PDCP entity configuration information having a predetermined identifier is included, an SDAP entity identifier corresponding thereto is not indicated, and the absence of an SDAP header is indicated.

The fourth condition may be a case in which PDCP entity configuration information having a predetermined identifier is included, an SDAP entity identifier corresponding thereto is not indicated, and the presence of an SDAP header is indicated.

The first operation may generate a PDCP entity having a predetermined identifier, may generate an SDAP entity corresponding thereto, may designate the generated SDAP as the configured identifier, may establish a connection between the PDCP entity and the SDAP entity, may process a packet assuming that there is no SDAP header for the received IP packet, and may process the packet without attaching the SDAP header to the transmitted IP packet.

The second operation may generate a PDCP entity having a predetermined identifier, may generate an SDAP entity corresponding thereto, may designate the generated SDAP as the configured identifier, may establish a connection between the PDCP entity and the SDAP entity, may interpret and remove an SDAP header assuming that there is the SDAP header for the received IP packet, may process a packet, and may attach the SDAP header to the transmitted IP packet to process the packet.

The third operation may generate a PDCP entity having a predetermined identifier, may establish a connection between the PDCP entity and a default SDAP entity, may process a packet assuming that there is no SDAP header for the received IP packet, and may process the packet without attaching the SDAP header to the transmitted IP packet.

The fourth operation may generate a PDCP entity having a predetermined identifier, may establish a connection between the PDCP entity and a default SDAP entity, may interpret and remove an SDAP header assuming that there is the SDAP header for the received IP packet and may process a packet, and may process the packet by attaching the SDAP header to the transmitted IP packet.

Figure 1J:
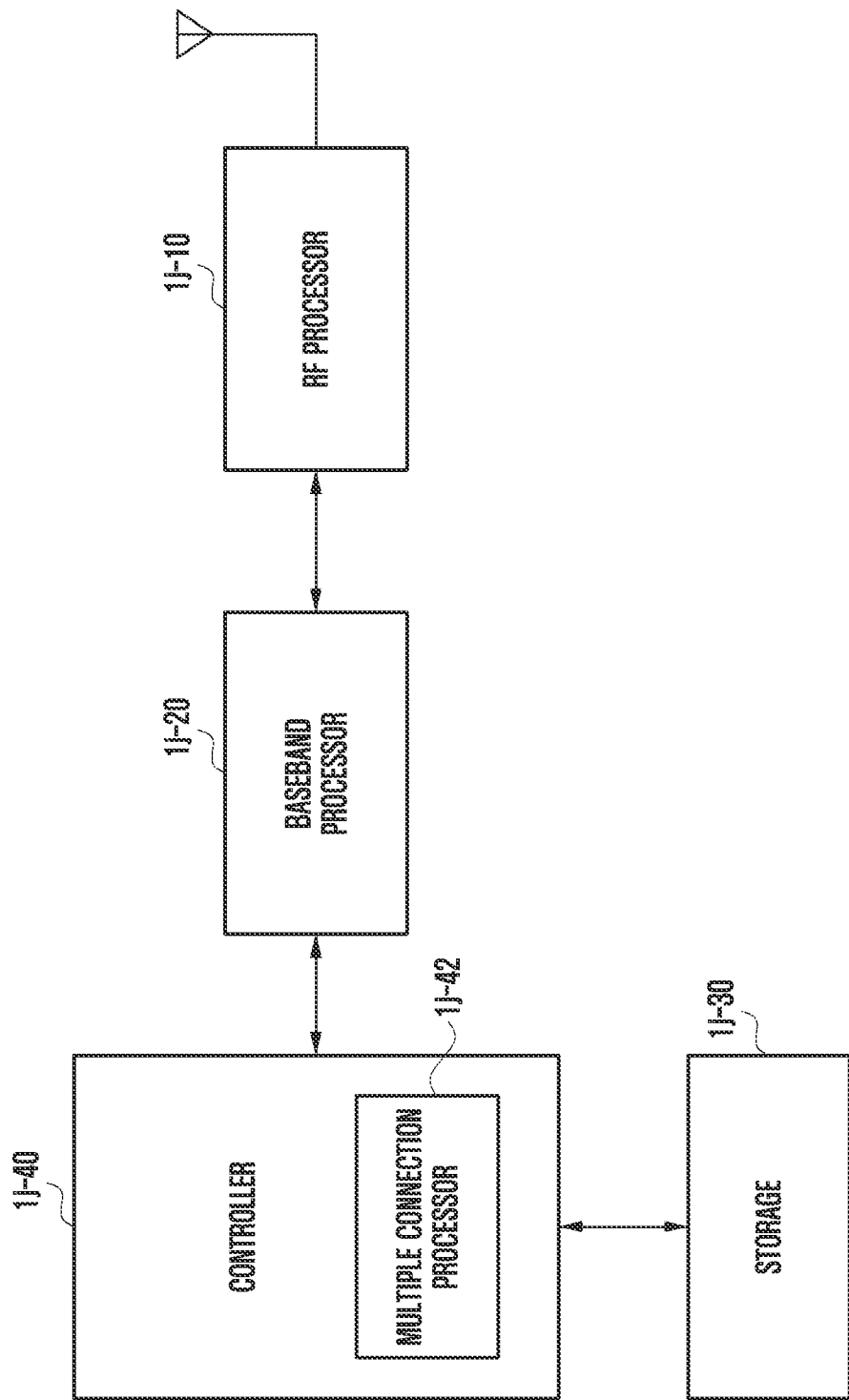
FIG. 1J is a diagram illustrating the structure of a UE to which an embodiment can be applied.

FIG. 1J illustrates the structure of a UE to which an embodiment can be applied.

Referring to FIG. 1J, the UE may include a radio frequency (RF) processor 1j-10, a baseband processor 1j-20, a storage 1j-30, and a controller 1j-40.

The RF processor 1j-10 may perform a function for transmitting and receiving a signal through a wireless channel such as band conversion, amplification, and the like of a signal. Specifically, the RF processor 1j-10 may up-convert a baseband signal provided from the baseband processor 1j-20 into an RF band signal and may transmit the RF band signal through an antenna, and may down-convert the RF band signal received through the antenna into a baseband signal. For example, the RF processor 1j-10 may include a transmission filter, a reception filter, an amplifier, a mixer, an oscillator, a digital to analog convertor (DAC), an analog to digital convertor (ADC), and the like. In FIG. 1J, only one antenna is shown, but the UE may include a plurality of antennas. In addition, the RF processor 1j-10 may include a plurality of RF chains. In addition, the RF processor 1j-10 may perform beamforming. For the beamforming, the RF processor 1j-10 may adjust the phase and magnitude of each of signals transmitted and received through a plurality of antennas or antenna elements. In addition, the RF processor may perform MIMO and may receive multiple layers when performing the MIMO operation. The RF processor 1j-10 may perform reception beam sweeping by appropriately configuring a plurality of antennas or antenna elements under the control of the controller, or may adjust the direction and beam width of reception beam so that the reception beam is coordinated with transmission beam.

The baseband processor 1j-20 may perform a conversion function between a baseband signal and a bit string according to a physical layer standard of the system. For example, during data transmission, the baseband processor 1j-20 generates complex symbols by encoding and modulating a transmission bit string. In addition, during data reception, the baseband processor 1j-20 may restore the received bit string by demodulating and decoding a baseband signal provided from the RF processor 1j-10. For example, according to an orthogonal frequency division multiplexing (OFDM) scheme, during data transmission, the baseband processor 1j-20 may generate complex symbols by encoding and modulating a transmission bit string, may map the complex symbols to subcarriers, and may then configure OFDM symbols through an inverse fast Fourier transform (IFFT) operation and cyclic prefix (CP) insertion. In addition, during data reception, the baseband processor 1j-20 may divide the baseband signal provided from the RF processor 1j-10 into units of OFDM symbols, may restore the signals mapped to the subcarriers through a fast Fourier transform (FFT) operation, and may then restore the received bit string through demodulation and decoding.

The baseband processor 1j-20 and the RF processor 1j-10 may transmit and receive signals as described above. Accordingly, the baseband processor 1j-20 and the RF processor 1j-10 may be referred to as a transmitter, a receiver, a transceiver, or a communicator unit. Further, at least one of the baseband processor 1j-20 and the RF processor 1j-10 may include a plurality of communication modules to support a plurality of different radio access technologies. In addition, at least one of the baseband processor 1j-20 and the RF processor 1j-10 may include different communication modules to process signals of different frequency bands. For example, the different radio access technologies may include an LTE network, an NR network, and the like. In addition, the different frequency bands may include a super high frequency (SHF) (e.g., 2.1 jHz or 1 jhz) band and a millimeter wave (e.g., 60 GHz) band.

The storage 1j-30 may store data such as a basic program, an application program, and configuration information for the operation of the UE. The storage 1j-30 may provide stored data in response to a request from the controller 1j-40.

The controller 1j-40 may control overall operations of the UE. For example, the controller 1j-40 may transmit and receive signals through the baseband processor 1j-20 and the RF processor 1j-10. In addition, the controller 1j-40 may record and read data in the storage 1j-40. To this end, the controller 1j-40 may include at least one processor. For example, the controller 1j-40 may include a communication processor (CP) for performing control for communication and an application processor (AP) for controlling an upper layer such as an application program.

According to an embodiment, the controller 1j-40 may control the transceiver to receive a message including SDAP configuration information from the eNB, and may control an arbitrary SDAP entity to be connected to at least one PDCP entity based on the received message.

The SDAP configuration information may include packet data unit (PDU) session identifier information mapped to the arbitrary SDAP entity.

In addition, the SDAP configuration information may include default data radio bearer (DRB) information for the arbitrary SDAP entity.

The SDAP configuration information may include an indicator indicating whether an SDAP header exists for the arbitrary SDAP entity.

In addition, the SDAP configuration information may include mapping information for at least one DRB of at least one QoS flow.

Figure 1K:
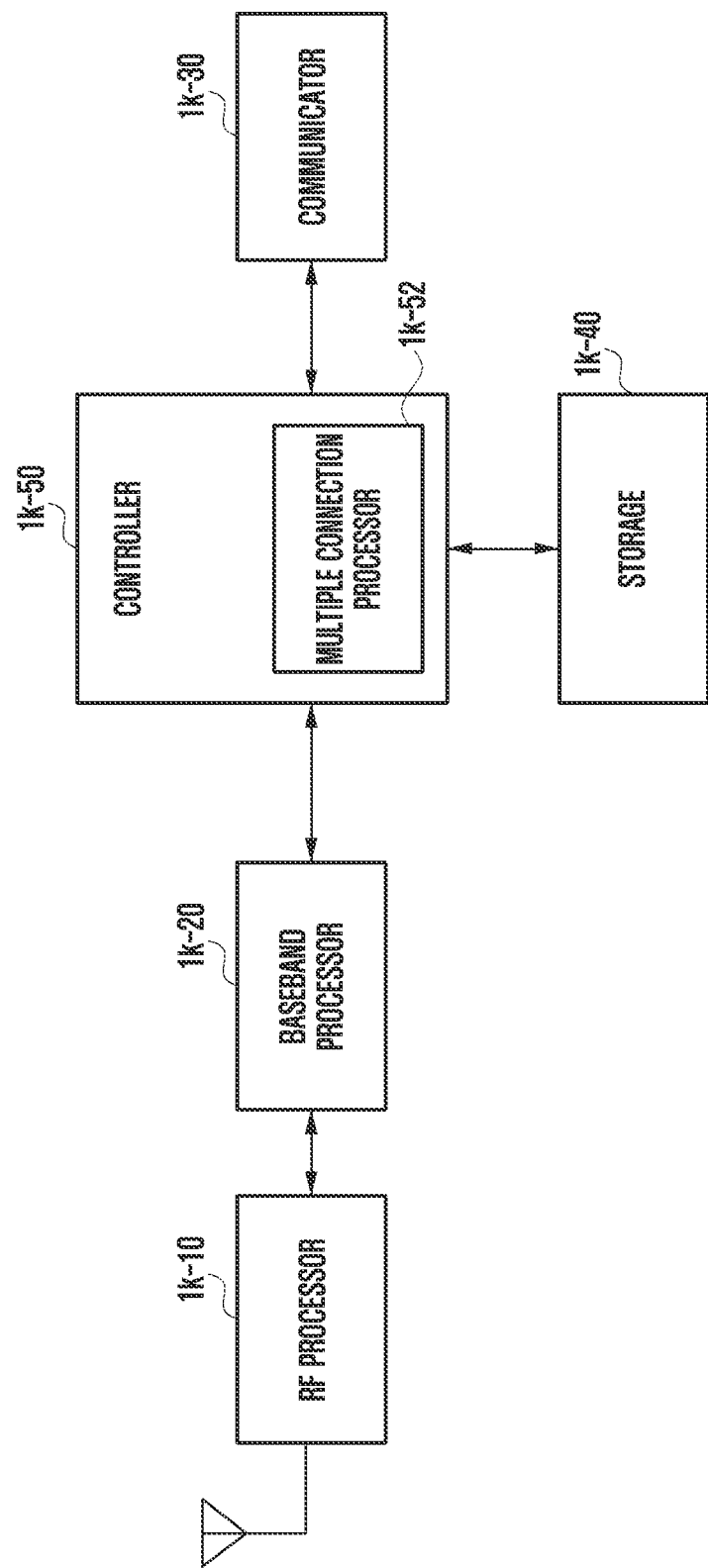
FIG. 1K is a block diagram illustrating a TRP in a wireless communication system to which an embodiment can be applied.

FIG. 1K is a block diagram illustrating a TRP in a wireless communication system to which an embodiment can be applied.

As shown in FIG. 1K, the eNB may be configured to include an RF processor 1k-10, a baseband processor 1k-20, a backhaul communicator 1k-30, a storage 1k-40, and a controller 1k-50.

The RF processor 1k-10 may perform a function for transmitting and receiving a signal through a wireless channel such as band conversion, amplification, and the like of a signal. Specifically, the RF processor 1k-10 may up-convert a baseband signal provided from the baseband processor 1k-20 into an RF band signal to transmit the RF band signal through an antenna, and may down-convert the RF band signal received through the antenna into a baseband signal. For example, the RF processor 1k-10 may include a transmission filter, a reception filter, an amplifier, a mixer, an oscillator, a DAC, an ADC, and the like. In FIG. 1K, only one antenna is shown, but the first access node may have a plurality of antennas. In addition, the RF processor 1k-10 may include a plurality of RF chains. In addition, the RF processor 1k-10 may perform beamforming. For the beamforming, the RF processor 1k-10 may adjust the phase and magnitude of each of signals transmitted and received through a plurality of antennas or antenna elements. The RF processor may perform a downlink MIMO operation by transmitting one or more layers.

The baseband processor 1k-20 may perform a conversion function between a baseband signal and a bit string according to a physical layer standard of a first radio access technology. For example, during data transmission, the baseband processor 1k-20 may generate complex symbols by encoding and modulating a transmission bit string. In addition, during data reception, the baseband processor 1k-20 may restore a received bit string by demodulating and decoding the baseband signal provided from the RF processor 1k-10. For example, according to an OFDM scheme, during data transmission, the baseband processor 1k-20 may generate complex symbols by encoding and modulating a transmission bit string, may map the complex symbols to subcarriers, and may then configure OFDM symbols through IFFT operation and CP insertion. In addition, during data reception, the baseband processor 1k-20 may divide the baseband signal provided from the RF processor 1k-10 in units of OFDM symbols, may restore signals mapped to the subcarriers through the FFT operation, and may then restore the received bit string through demodulation and decoding. The baseband processor 1k-20 and the RF processor 1k-10 may transmit and receive signals as described above. Accordingly, the baseband processor 1k-20 and the RF processor 1k-10 may be referred to as a transmitter, a receiver, a transceiver, a communicator, or a wireless communicator.

The communicator 1k-30 may provide an interface for communicating with other nodes in a network.

The storage 1k-40 may store data such as a basic program, an application program, and configuration information for the operation of a main eNB. In particular, the storage 1k-40 may store information on a bearer assigned to a connected UE, a measurement result reported from the connected UE, and the like. In addition, the storage 1k-40 may store information that is a criterion for determining whether to provide or terminate multiple connections to the UE. The storage 1k-40 may provide stored data in response to a request from the controller 1k-50.

The controller 1k-50 may control overall operations of the main eNB. For example, the controller 1k-50 may transmit and receive signals through the baseband processor 1k-20 and the RF processor 1k-10 or through the backhaul communicator 1k-30. In addition, the controller 1k-50 may record and read data in the storage 1k-40. To this end, the controller 1k-50 may include at least one processor.

According to an embodiment, the controller 1k-50 may control the transceiver to identify SDAP configuration information, to generate a message including the identified SDAP configuration information, and to transmit the message including the SDAP configuration information to a UE.

In this case, the SDAP configuration information may include PDU session identifier information mapped to an arbitrary SDAP entity.

The SDAP configuration information may include default DRB information for the arbitrary SDAP entity.

The SDAP configuration information may include an indicator indicating whether an SDAP header exists for the arbitrary SDAP entity.

In addition, the SDAP configuration information may include mapping information for at least one DRB of at least one QoS flow.

Figure 1L:
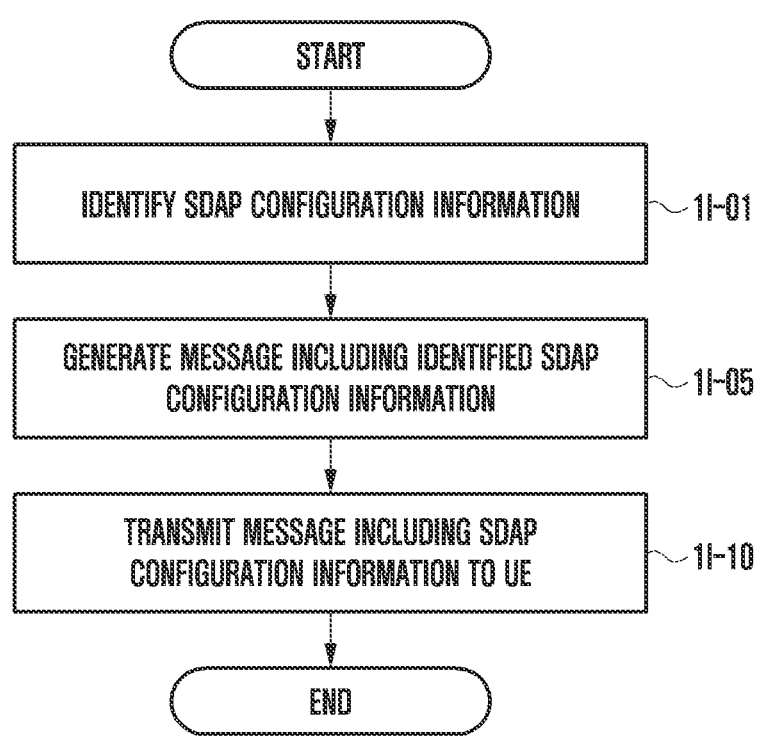
FIG. 1L is a flowchart illustrating a control method of an eNB according to an embodiment.

Meanwhile, FIG. 1L is a flowchart illustrating a control method of an eNB according to an embodiment.

First, in operation 1l-01, an eNB may identify SDAP configuration information. In operation 1l-05, the eNB may generate a message including the identified SDAP configuration information. In operation 1l-10, the eNB may transmit the message including the SDAP configuration information to a UE. The eNB may transmit the message including the SDAP configuration information through upper layer signaling (e.g., an RRC message).

The summary of the proposed content of the disclosure is as follows.

The disclosure is to specify SDAP layer configuration signaling and operation, and the main content is as follows.

One SDAP entity is connected to several DRBs.

Multiple SDAP entities can be configured in one UE

Introduction of RRC signaling to establish mapping relationship between DRB/PDCP and SDAP entity PDCP-config contains information indicating which SDAP entity is connected to If there is no SDAP entity information, connect with default SDAP entity SDAP entity operation:

Classify IP packets delivered by upper layer for each QoS flow and deliver classified IP packets to appropriate PDCP/DRB. At this time, SDAP header is selectively added for each PDCP/DRB.

Process PDCP SDUs delivered from PDCP/DRB and deliver processed PDCP SDUs to upper layer. Determine whether there is SDAP header for each PDCP/DRB and remove header or deliver header as is to upper layer Specific signaling procedure is shown in Table 1 below.

TABLE 1

| UE | <- | gNB | RRC connection setup: If first DRB (DRB #0) is configured, default SDAP entity (SDAP #0) is configured. PDCP-config = { DRB id = 0, SDAP header configuration = present, QoS flow id list #0} |
|---|---|---|---|
| UE | | | PDCP #0 generation, SDAP #0 generation, Since SDAP ID is not designated in PDCP #0, connect with default SDAP entity (SDAP #0) |
| UE | <-> | gNB | Data transfer SDAP #0 Tx: attach SDAP header to IP packet transmitted from upper layer and then transmit IP packet to PDCP #0 SDAP #0 Rx: remove SDAP header from PDCP SDU received from PDCP #0 and then transmit PDCP SDU to upper layer |
| UE | <- | gNB | RRC connection reconfiguration DRB #1 configuration PDCP-config = { DRB id = 1, SDAP header configuration = not present, QoS flow id list #1} Since SDAP ID is not designated, connect with default SDAP entity |
| UE | | | PDCP #1 generation, SDAP #1 generation, Since SDAP ID is not designated in PDCP #1, connect with default SDAP entity (SDAP #0) |
| UE | <- | gNB | Data transfer SDAP #0 Tx: Attach SDAP header to IP packets belonging to QoS flow ID list #0 among IP packets transmitted to upper layer, and then transmit IP packets to PDCP #0 Transmit IP packets belonging to QoS flow ID list #1 among IP packets transmitted to upper layer to PDCP #1 SDAP #0 Rx: Remove SDAP header from PDCP SDU received from PDCP #0, and then transmit PDCP SDU to upper layer Transmit PDCP SDU received from PDCP #1 to upper layer |
| UE | <- | gNB | RRC connection reconfiguration DRB #2 configuration PDCP-config = { DRB id = 2, SDAP id = #1, SDAP header configuration = not present, QoS flow id list #2} |
| UE | | | PDCP #2 generation; Since new SDAP ID is signaled, SDAP #1 generation; connect PDCP #2 and SDAP #1 |

TABLE 1-continued

| UE <-> gNB | Data transfer<br>SDAP #0 Tx:<br>Same as above<br>SDAP #0 Rx:<br>Same as above<br>SDAP #1 Tx:<br>Transmit IP packets belonging to QoS flow ID list #2 among IP packets transmitted from upper layer, to PDCP #2<br>SDAP #1 Rx:<br>Transmit PDCP SDU received from PDCP #2 to upper layer |
|---|---|

Second Embodiment

Figure 2A:
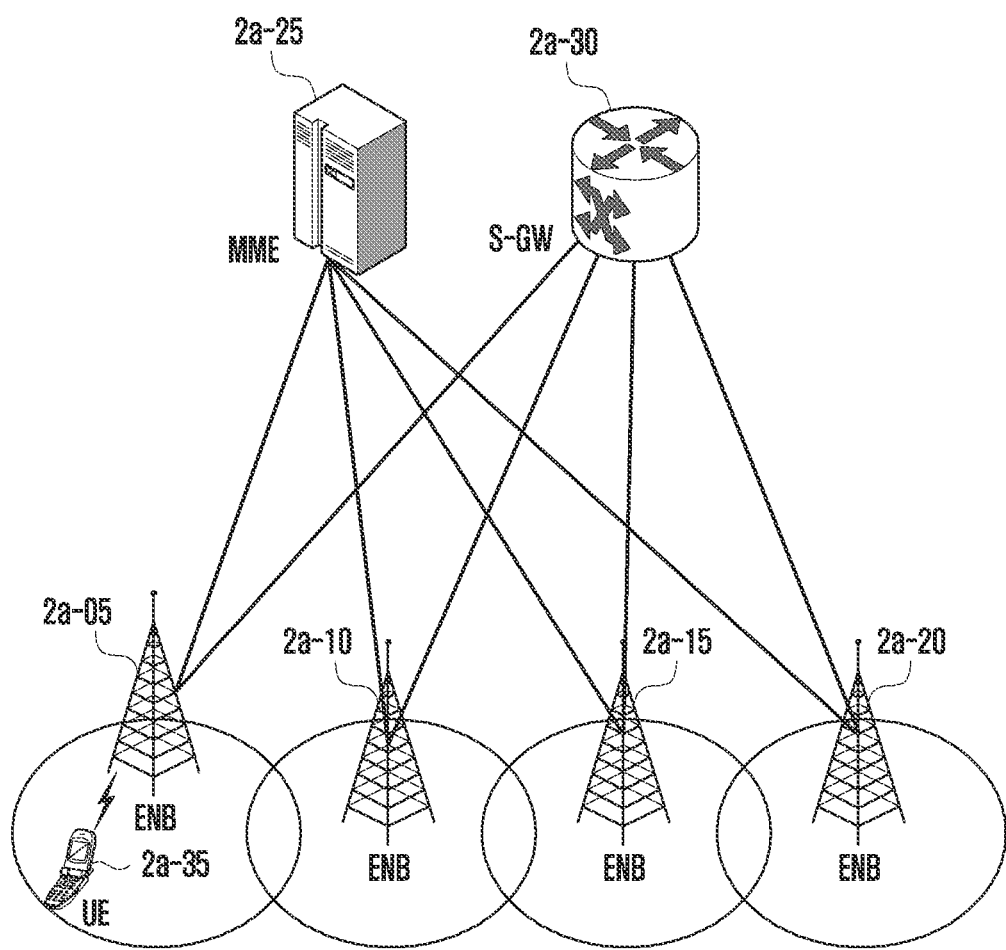
FIG. 2A is a diagram illustrating the structure of an LTE system which is referred to for description of the disclosure.

FIG. 2A is a diagram illustrating the structure of an LTE system which is referred to for description of the disclosure.

Referring to FIG. 2A, a radio access network of an LTE system includes a next generation base station (Evolved Node B, hereinafter referred to as "eNB", "Node B" or "base station") 2a-05, 2a-10, 2a-15, and 2a-20, an MME 2a-25, and an S-GW 2a-30. A user equipment (hereinafter, referred to as "UE" or "terminal") 2a-35 is connected to an external network through the eNBs 2a-05 to 2a-20 and the S-GW 2a-30.

In FIG. 2A, the eNBs 2a-05 to 2a-20 correspond to existing Node Bs of a UMTS system. The eNB is connected to a UE 2a-35 through a wireless channel and plays a more complicated role than an existing Node B. In an LTE system, all user traffic, including real-time services such as voice over IP (VoIP) via an Internet protocol, is serviced through a shared channel, so that there is a need for a device that collects and schedules state information such as buffer state, available transmission power state, and channel state of UEs, and this device is handled by the eNBs 2a-05 to 2a-20. One eNB typically controls multiple cells. For example, in order to realize a transmission rate of 100 Mbps, an LTE system uses OFDM in a bandwidth of 20 MHz as a radio access technology. In addition, an adaptive modulation & coding (hereinafter, referred to as "AMC") scheme that determines a modulation scheme and a channel coding rate according to the channel state of a UE is applied to the system. The S-GW 2a-30 is a device for providing a data bearer, and generates or removes the data bearer under the control of the MME 2a-25. The MME is a device that is in charge of various control functions as well as a mobility management function for a UE, and is connected to a plurality of eNBs.

Figure 2B:
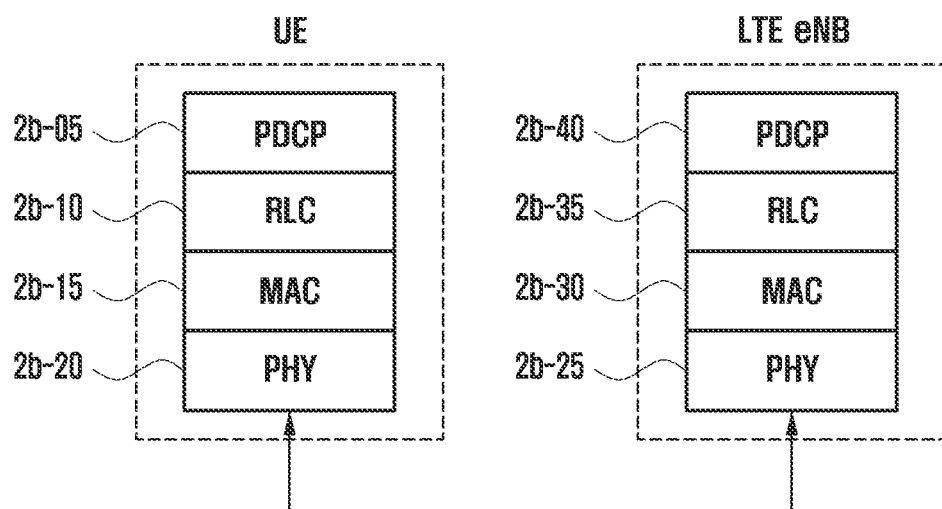
FIG. 2B is a diagram illustrating a radio protocol structure in an LTE system which is referred to for description of the disclosure.

FIG. 2B is a diagram illustrating a radio protocol structure in an LTE system which is referred to for description of the disclosure.

Referring to FIG. 2B, a radio protocol of an LTE system includes PDCPs 2b-05 and 2b-40, RLCs 2b-10 and 2b-35, and MACs 2b-15 and 2b-30 in a UE and an eNB, respectively. The PDCPs 2b-05 and 2b-40 are in charge of operations such as IP header compression/restoration, and the like. The main functions of the PDCP are summarized as follows.
Header compression and decompression: ROHC only
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink
The RLCs 2b-10 and 2b-35 perform an ARQ operation by reconfiguring a PDCP PDU to an appropriate size. The main functions of the RLC are summarized as follows.
Transfer of upper layer PDUs
Error Correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer
Duplicate detection (only for UM and AM data transfer)
Protocol error detection (only for AM data transfer)
RLC SDU discard (only for UM and AM data transfer)
RLC re-establishment
The MACs 2b-15 and 2b-30 are connected to several RLC layer entities configured in one UE, and perform an operation of multiplexing RLC PDUs to MAC PDUs and demultiplexing the RLC PDUs from the MAC PDUs. The main functions of the MAC are summarized as follows.
Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling
MBMS service identification
Transport format selection
Padding
Physical layer 2b-20 and 2b-25 performs an operation of channel-coding and modulating upper layer data to make the resultant data into an OFDM symbol and transmit the OFDM symbol to a wireless channel, or an operation of demodulating and channel-decoding the OFDM symbol received through the wireless channel to transmit the resultant data to the upper layer.

Figure 2C:
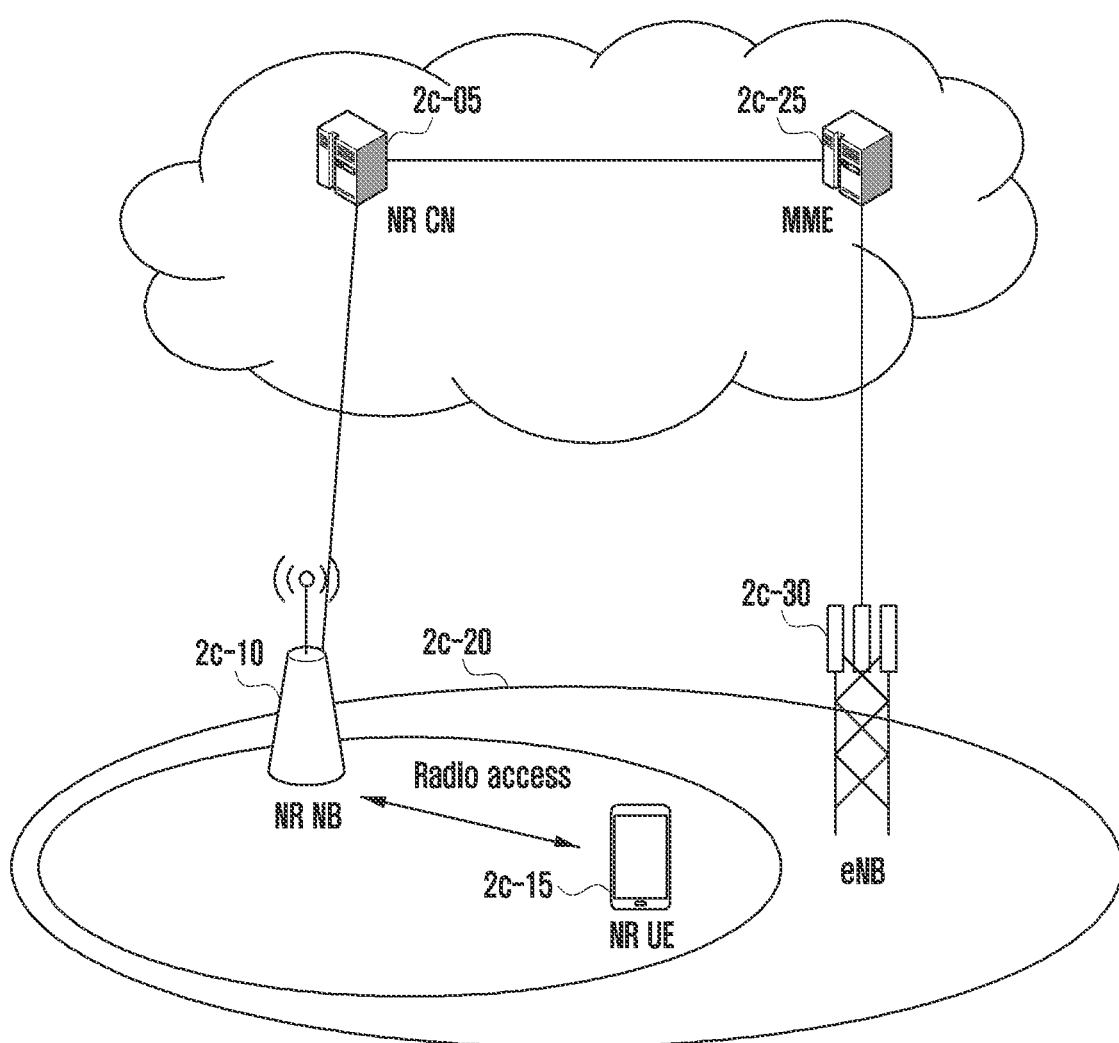
FIG. 2C is a diagram illustrating the structure of a next generation mobile communication system to which the disclosure is applied.

FIG. 2C is a diagram illustrating the structure of a next generation mobile communication system to which the disclosure is applied.

Referring to FIG. 2C, a radio access network of a next generation mobile communication system includes a next generation eNB (new radio Node B, hereinafter, referred to as "NR NB") 2c-10 and an NR CN 2c-05. A UE (new radio user equipment, hereinafter, referred to as "NR UE" or "UE") 2c-15 is connected to an external network through the NR NB 2c-10 and the NR CN 2c-05.

In FIG. 2C, the NR NB 2c-10 corresponds to an eNB of an existing LTE system. The NR NB is connected to the NR UE 2c-15 through a wireless channel and may provide more superior service than an existing Node B. In the next generation mobile communication system, since all user traffic is serviced through a shared channel, there is a need for a device that collects and schedules state information such as buffer states, available transmission power states, and channel states of UEs, and this device is handled by the NR NB 2c-10. One NR NB typically controls multiple cells. In order to implement ultra-fast data transmission compared to a current LTE, a beamforming technology that can have an existing maximum bandwidth or more and uses OFDM as a radio access technology may be further combined with the system. In addition, an AMC scheme that determines a modulation scheme and a channel coding rate according to the channel state of a UE is applied to the system. The NR CN 2c-05 performs mobility support, bearer configuration, QoS configuration, and the like. The NR CN is a device that is in charge of various control functions as well as a mobility management function for a UE and is connected to a plurality of eNBs. In addition, the next generation mobile communication system can be linked to an existing LTE system, and the NR CN is connected to the MME 2c-25 through a network interface. The MME is connected to an eNB 2c-30 which is an existing eNB.

Figure 2D:
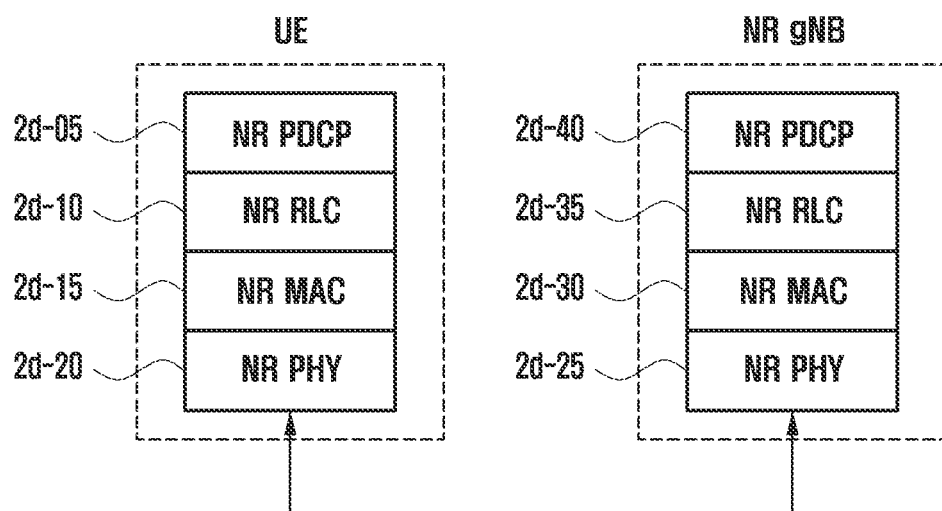
FIG. 2D is a diagram illustrating a radio protocol structure of a next generation mobile communication system to which the disclosure is applied.

FIG. 2D is a diagram illustrating a radio protocol structure of a next generation mobile communication system to which the disclosure is applied.

Referring to FIG. 2D, a radio protocol of a next generation mobile communication system includes NR PDCPs 2d-05 and 2d-40, NR RLCs 2d-10 and 2d-35, and NR MACs 2d-15 and 2d-30 in a UE and an NR eNB, respectively. The main functions of the NR PDCPs 2d-05 and 2d-40 may include some of the following functions.

Header compression and decompression: ROHC only
Transfer of user data
In-sequence delivery of upper layer PDUs
PDCP PDU reordering for reception
Duplicate detection of lower layer SDUs
Retransmission of PDCP SDUs
Ciphering and deciphering
Timer-based SDU discard in uplink The reordering of the NR PDCP refers to a function of reordering PDCP PDUs received from a lower layer based on a PDCP sequence number, and may include a function of delivering data to an upper layer in a reordered sequence, a function of reordering the sequence to record lost PDCP PDUs, a function of reporting the state of the lost PDCP PDUs to a transmission side, and a function of requesting a retransmission of the lost PDCP PDUs.

The main functions of the NR RLCs 2d-10 and 2d-35 may include some of the following functions.

Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment The in-sequence delivery of the NR RLC refers to a function of sequentially delivering RLC SUDs received from a lower layer to an upper layer. The in-sequence delivery of the NR RLC may include a function of reassembling and delivering, when an original RLC SDU is segmented into several RLC SDUs and received, the segmented RLC SDUs, a function of reordering the received RLC PUDs based on an RLC SN or a PDCP SN, a function of reordering the sequence to record lost RLC PDUs, a function of reporting the state of the lost RLC PDUs to a transmission side, a function of requesting a retransmission of the lost PDCP PDUs, a function of sequentially delivering, when there is a lost RLC SDU, only the RLC SDUs before the lost RLC SDU to an upper layer, a function of sequentially delivering all the RLC SDUs received before a predetermined timer starts to an upper layer if the timer has expired even though there is a lost RLC SDU, and a function of sequentially delivering all the RLC SDUs received so far to an upper layer if a predetermined timer has expired even though there is a lost RLC SDU. In addition, the RLC PDUs may be processed in the order of receiving the RLC PDUs (regardless of the order of the sequence number, in the order of arrival) and delivered to the PDCP regardless of the order (out-of sequence delivery). In a case of segments, segments stored in a buffer or to be received later are received to be reconfigured into an intact RLC PDU, and then processed and delivered to the PDCP. The NR RLC layer may not include a concatenation function and may perform the above function in the NR MAC layer or replace the above function with a multiplexing function of the NR MAC layer.

The Out-of-sequence delivery of the NR RLC refers to a function of directly delivering the RLC SDUs received from the lower layer to the upper layer regardless of the sequence, and may include a function of reassembling and delivering, when an original RLC SDU is segmented into several RLC SDUs and received, the segmented RLC SDUs, and a function of storing the RLC SN or PDCP SN of the received RLC PDUs and reordering the sequence to record the lost RLC PDUs.

The NR MACs 2d-15 and 2d-30 may be connected to several NR RLC layer entities configured in one UE, and the main functions of the NR MAC may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layers 2d-20 and 2d-25 may perform an operation of channel-coding and modulating upper layer data to make the resultant data into an OFDM symbol and transmit the OFDM symbol to a wireless channel, or an operation of demodulating and channel-decoding an OFDM symbol received through a wireless channel to transmit the resultant data to an upper layer.

Figure 2E:
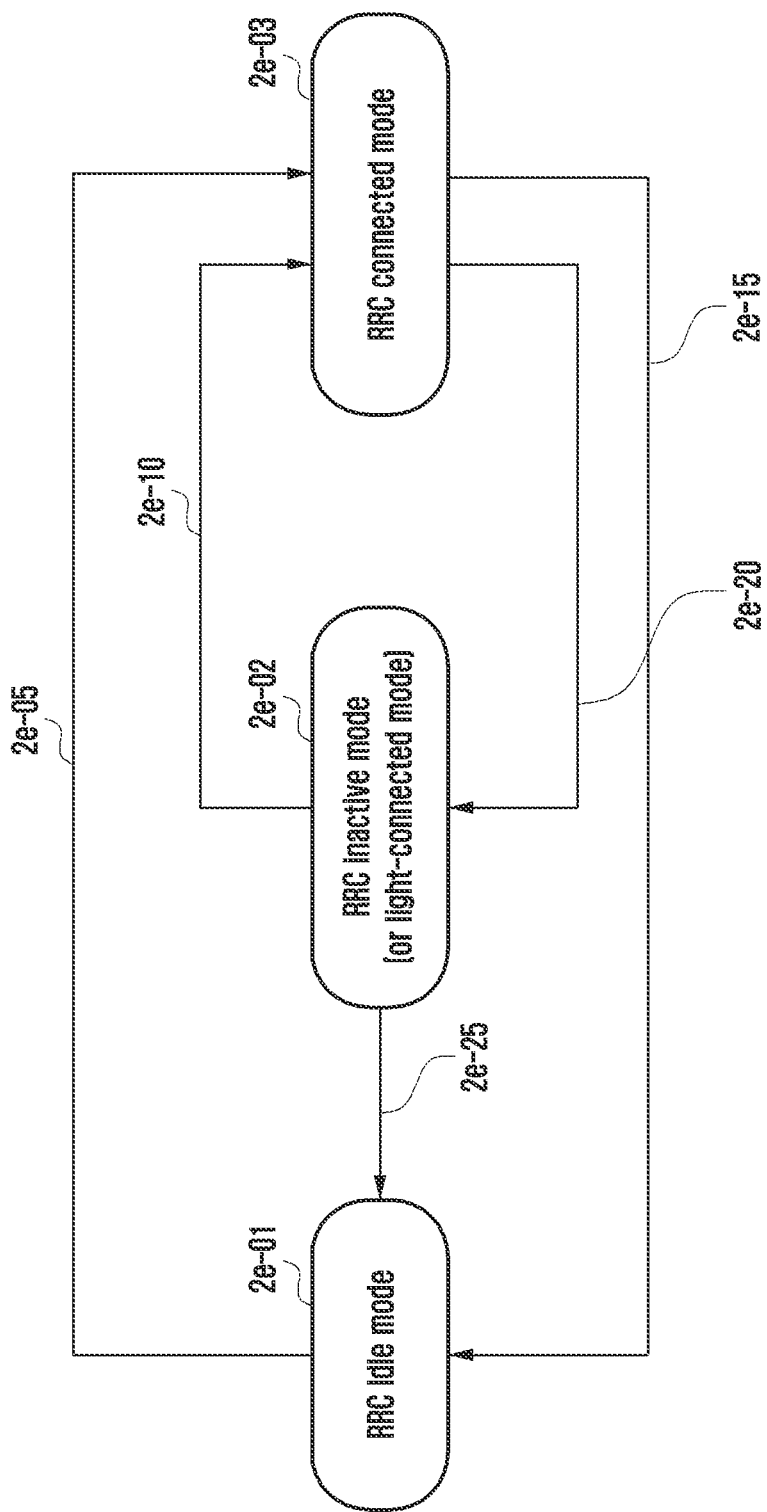
FIG. 2E is a diagram illustrating modes in which a UE may stay in a next generation mobile communication system of the disclosure.

FIG. 2E is a diagram illustrating modes in which a UE may stay in a next generation mobile communication system of the disclosure.

In FIG. 2E, a UE may remain in an RRC connected mode 2e-03, an RRC inactive mode 2e-02, a lightly-connected mode 2e-02, an inactive mode 2e-02, or an RRC idle mode 2e-01, and may be subjected to processes 2e-05, 2e-10, 2e-15, 2e-20, and 2e-25 of switching to each of different modes. For example, at 2e-05, when data to be transmitted in uplink is generated or when downlink data arrives and a paging message is received, a UE in the RRC idle mode 2e-01 may establish a connection with a network in order to update a tracking area (periodically or in case of being out of the tracking area) and may be switched to the RRC connected mode 2e-03 to transmit and receive data. At 2e-15, if no data is generated for a predetermined time after transmitting and receiving data, the UE in the RRC connected mode may be switched to the RRC idle mode by the network. At 2e-20, if no data is generated for a predetermined time, the UE in the RRC connected mode 2e-03 may be switched to the RRC inactive mode 2e-02 by switching the mode by the network or the UE by itself to support battery saving and fast connection. When data to be transmitted in uplink is generated or when downlink data arrives and a paging message is received, the UE in the RRC inactive mode 2e-03 may establish a connection with a network in order to update a tracking area (or a RAN notification area)(periodically or in case of being out of the tracking area) and may be switched to the RRC connected mode 2e-03 to transmit and receive data at 2e-10. At 2e-25, the UE in the RRC inactive mode 2e-02 may switch the mode to the RRC idle mode 2e-01 by the instruction of the network, by a predetermined configuration, or the UE by itself. When there are a large number of UEs in the RRC inactive mode 2e-02 in the network, switching to another mode should be supported because the signaling overhead of the network may increase due to a frequent LAN indication area update procedure. A UE having a predetermined purpose can transmit data even in the RRC inactive mode 2e-02 without transitioning to the RRC connected mode 2e-03, and may repeat the transition according to the instruction of the network between the RRC inactive mode 2e-02 and the RRC idle mode 2e-01 and may proceed the transition to the RRC connected mode 2e-03 only when necessary. In the above procedure, the UE in the RRC inactive mode 2e-02 may have a significantly short transmission delay by transmitting data in the RRC inactive mode 2e-02, and may have significantly little signaling overhead. As to the above-mentioned predetermined purpose, when only a small amount data is to be transmitted, the UE may correspond to a UE that transmits data intermittently or periodically with a significantly long period. In addition, the UE in the RRC idle mode 2e-01 may be directly transitioned to the RRC inactive mode 2e-02 by the network, or may be transitioned to the RRC connected mode 2e-03 and may then transitioned to the RRC inactive mode 2e-02.

In the above, an additional inactive timer may be set and driven in the UE to solve a state mismatch problem between the mode of the UE when the UE performs transition between the modes and the mode of the UE that is recognized by the network. In addition, the additional timer can also be driven at the eNB.

In the disclosure, the RRC inactive mode and the lightly-connected mode can be interpreted as different modes, and it is assumed that a UE performs the same operation. In addition, although the RRC inactive mode and the lightly-connected mode can be interpreted as the same mode, it may be assumed that the UE performs different operations in each mode. In addition, the RRC inactive mode and the lightly-connected mode can be interpreted as different modes and it may be assumed that the UE performs different operations in each mode. As described above, the RRC inactive mode and the lightly-connected mode have the same purpose in terms of saving battery while allowing quick reconnection with little signaling, but may be interpreted as the same mode or different modes according to the implementation of the UE and the network. In addition, as described above, the UE operation in the RRC inactive mode and the lightly-connected mode may have the same or additional functions as those in the RRC idle mode, or may have only some functions during the operation in the RRC idle mode. As described above, in the RRC inactive mode, there is an advantage that the battery of the UE can be reduced and the UE can establish a fast connection with little signaling overhead when connecting to the network. However, the UE in the RRC inactive mode should perform a procedure of updating the RAN notification area more frequently than a procedure in which the UE in the RRC idle mode periodically updates the tracking area. Therefore, if there are a large number of RRC inactive mode UEs in the network, signaling overhead may occur due to a periodic LAN indication area update procedure, whereby the network should be able to manage the UEs in the RRC inactive mode and switch to the RRC idle mode when necessary.

Figure 2F:
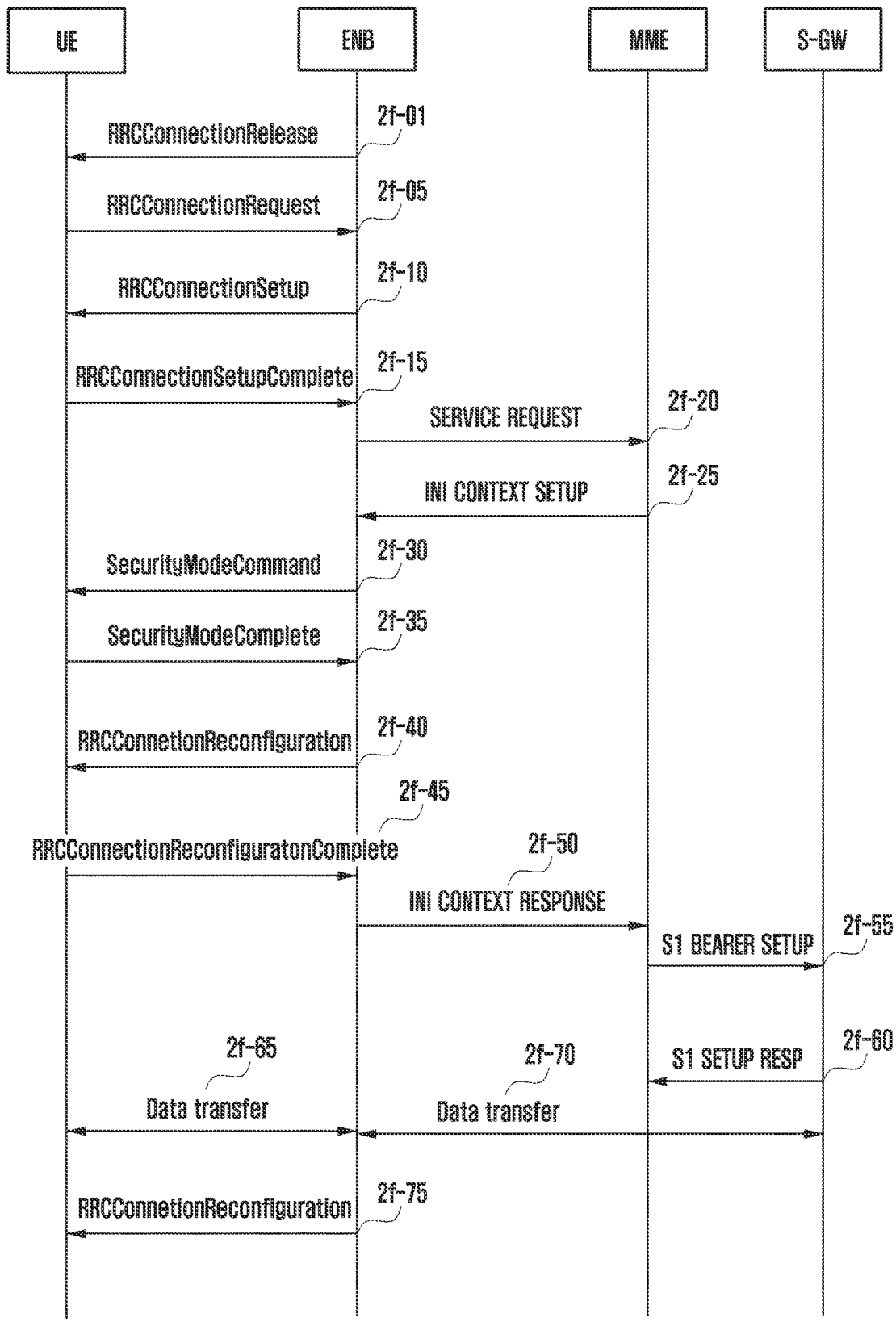
FIG. 2F illustrates a procedure in which a UE switches from an RRC connected mode to an RRC idle mode and a procedure in which a UE switches from an RRC idle mode to an RRC connected mode.

FIG. 2F illustrates a procedure in which a UE switches from an RRC connected mode to an RRC idle mode and a procedure in which a UE switches from an RRC idle mode to an RRC connected mode.

In FIG. 2F, at 2f-01, when a UE that transmits or receives data in the RRC connection mode has no transmission or reception of data due to a predetermined reason or for a predetermined time, an eNB may transmit an RRCConnectionRelease message to the UE to switch the UE to an RRC idle mode. Subsequently, a UE (hereinafter, referred to as "idle mode UE") that is not currently configured for connection may perform an RRC connection establishment process with the eNB when data to be transmitted is generated. In more detail, at 2f-05, the UE may establish backward transmission synchronization with the eNB through a random access procedure and may transmit an RRCConnectionRequest message to the eNB. The message may include an identifier of the UE and a reason for establishing a connection (establishmentCause). At 2f-10, the eNB may transmit an RRCConnectionSetup message so that the UE establishes an RRC connection. The message may include RRC connection configuration information. The RRC connection is also called a signaling radio bearer (SRB), and may be used for transmitting and receiving an RRC message, which is a control message between the UE and the eNB. At 2f-15, the UE that has established the RRC connection may transmit an RRCConnetionSetupComplete message to the eNB. The message may include a control message called SERVICE REQUEST requesting for configuring a bearer for a predetermined service from the MME. The eNB transmits the SERVICE REQUEST message contained in the RRCConnetionSetupComplete message to the MME at 2f-20, and the MME may determine whether to provide a service requested by the UE. If the UE determines to provide the requested service, the MME may transmit an INITIAL CONTEXT SETUP REQUEST message to the eNB at 2f-25. The message may include information such as quality of service (QoS) information to be applied when a DRB is configured and security-related information (for example, a security key and a security algorithm) to be applied to the DRB. At 2f-30 and 2f-35, the eNB may exchange a SecurityModeCommand message and a SecurityModeComplete message with the UE to configure a security. At 2f-40, when the security configuration is completed, the eNB may transmit an RRCConnectionReconfiguration message to the UE. The message may include configuration information of the DRB in which user data is to be processed. At 2f-45, the UE may configure the DRB by applying the configuration information of the DRB and may transmit an RRCConnectionReconfigurationComplete message to the eNB. At 2f-50, after completing the configuration of the UE and DRB, the eNB may transmit an INITIAL CONTEXT SETUP COMPLETE message to the MME. At 2f-055 and 2f-60, the MME that has received the INITIAL CONTEXT SETUP COMPLETE message may exchange an S1 BEARER SETUP message and an S1 BEARER SETUP RESPONSE message to configure an S-GW and an S1 bearer. The S1 bearer is a data transmission connection established between the S-GW and the eNB and corresponds one-to-one with the DRB. At 2f-65 and 2f-70, when the above process is completed, the UE may transmit and receive data to and from the eNB through the S-GW. This general data transmission process consists of three operations: RRC connection configuration, security configuration, and DRB configuration. In addition, at 2f-75, the eNB may transmit an RRCConnectionReconfiguration message to the UE to update, add, or change the configuration for a predetermined reason.

As described above, in order to switch from the RRC idle mode to the RRC connected mode, many signaling procedures are required. Therefore, in the next generation mobile communication system, the RRC inactive mode or the lightly-connected mode can be newly defined, and in the new mode as described above, the UE and the eNB store the context of the UE and, if necessary, maintain the S1 bearer, so that faster access with fewer signaling procedures is possible.

Figure 2G:
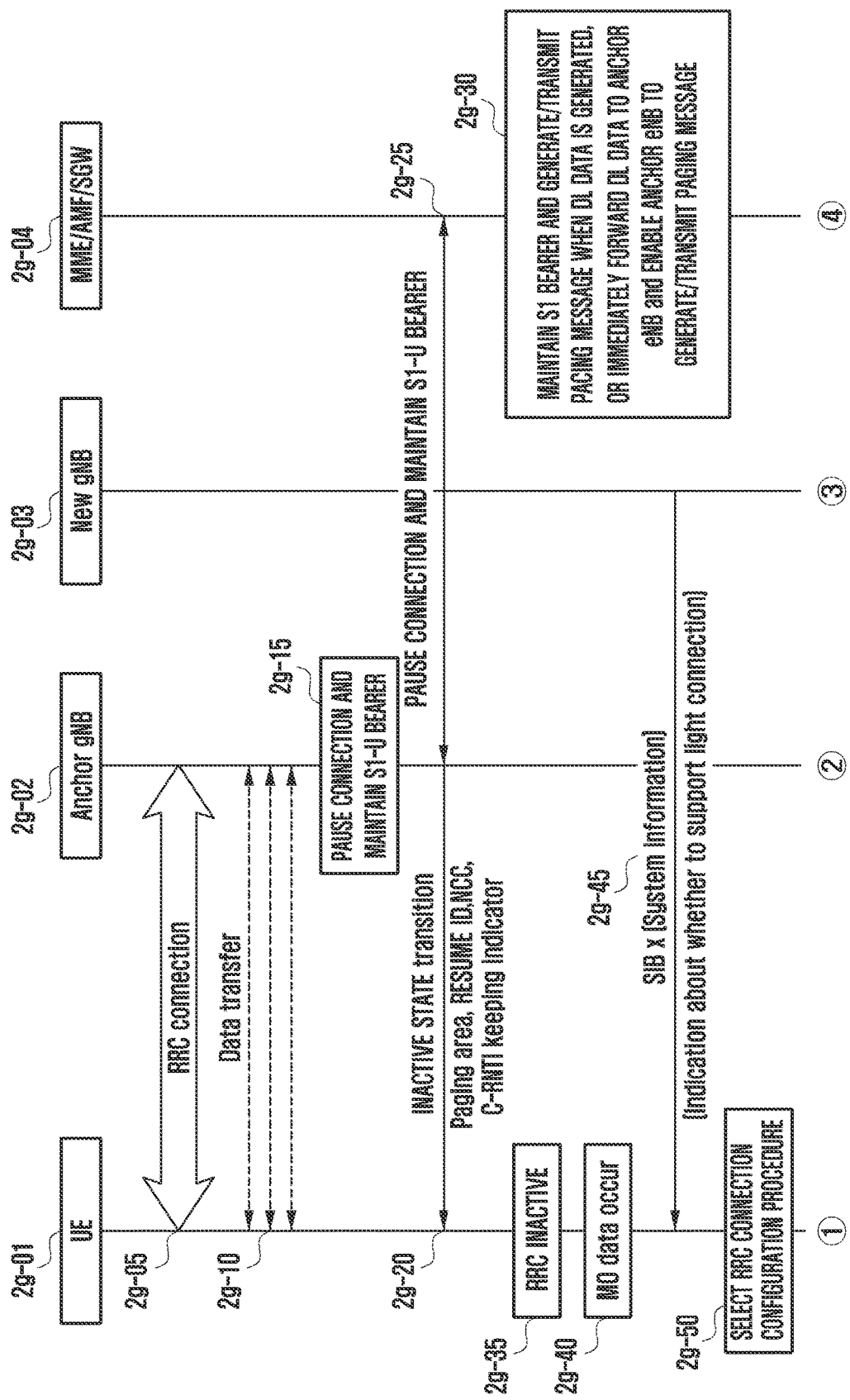
FIGS. 2GA and 2GB are diagrams illustrating a procedure for switching to an RRC connected mode when mobile oriented (MO) data is generated in a UE in an RRC inactive mode according to the disclosure.

FIGS. 2GA and 2GB are diagrams illustrating a procedure for switching to an RRC connected mode when mobile oriented (MO) data is generated in a UE in an RRC inactive mode according to the disclosure.

In FIGS. 2GA and 2GB, in a UE and an eNB, the overall flow of a UE 2g-01, an anchor gNB 2g-02, a new gNB 2g-03, and an MME 2g-04 for performing a procedure of reusing the UE context and the S1 bearer is illustrated.

At 2g-05 and 2g-10, the UE 2g-01 in an RRC connected state may transmit and receive data to and from the anchor gNB 2g-02. When data transmission and reception are stopped, the anchor gNB 2g-02 may drive a predetermined timer. If data transmission and reception is not resumed until the timer expires at 2g-15, the anchor gNB 2g-02 may consider to release the RRC connection of the UE 2g-01. At this time, the anchor gNB 2g-02 may determine whether to switch the UE 2g-01 to the RRC idle mode or the RRC inactive mode according to a predetermined condition. The predetermined condition may be a degree of network traffic, an amount of UE context that a network can maintain, the number of UEs in which a network can support a service, and the like. In order to switch the UE 2g-01 to the RRC inactive mode at 2g-20, an inactive state transition RRC message (an RRCConnectionRelease or RRCConnection-Suspend message, a newly defined RRC message or another existing RRC message can be reused) may be transmitted. At 2g-20, the anchor gNB 2g-02 may release the RRC connection of the UE 2g-01 according to a predetermined rule, may store the UE context, may assign a resume ID while transmitting a control message instructing to release the RRC message to the UE 2g-01, and may configure a paging area (PA) to report mobility while the UE 2g-01 is in an inactive state. By the assignment of the Resume ID, it can be seen that the UE 2g-01 should store the UE context. Alternatively, at 2g-20, the anchor gNB 2g-02 may transmit, to the control message, a separate context maintenance indicator for instructing the UE 2g-01 to operate in the RRC inactive mode and to store the UE context. In addition, in the disclosure, for a simplified RRC connection procedure when MT data from a serving cell is generated, the anchor gNB 2g-02 may assign a value (for example, C-RNTI keeping indicator) instructing to maintain the C-RNTI. In addition, the message may include security information for updating security configuration required when the UE 2g-01 performs an RRC connection resumption procedure later. For example, the UE 2g-01 may be pre-assigned with NCC (NextHopChainingCount) and may calculate and configure a new security key (KeNB* or KgNB*) using the NCC. In addition, the control message may include a period during which the anchor gNB 2g-02 maintains the context or a list of cells to which a procedure using a stored context can be applied when the UE 2g-01 tries to reconfigure the RRC connection within a validity period.

At 2g-25, after releasing the RRC connection of the UE 2g-01, the anchor gNB 2g-02 may maintain the UE context and the S1 bearer of the UE 2g-01 as is. The S1 bearer refers to an S1-control bearer used for transmitting and receiving a control message between the anchor gNB 2g-02 and the MME 2g-04 and an S1-user plane bearer used for transmitting and receiving user data between the anchor gNB 2g-02 and the S-GW 2g-04. By maintaining the S1 bearer, when the UE 2g-01 tries to configure the RRC connection in the same cell or in the same anchor gNB 2g-02, a procedure for S1 bearer configuration may be omitted. The anchor gNB 2g-02 may delete the UE context and release the S1 bearer when the validity period expires. At 2g-35, the UE 2g-01 that has received the inactive mode transition RRC message at 2g-20 switches to the RRC inactive mode.

In the above, the anchor gNB 2g-021 refers to an eNB that maintains and manages the UE context (resume ID) of the RRC inactive mode UE 2g-01 and manages an RAN paging area (or RAN notification area) to manage mobility of the RRC inactive mode UE. The role of the anchor gNB 2g-02 described above may be performed by an access and mobility management function (AMF) entity 2g-04 instead.

At 2g-25, the anchor gNB 2g-02 may transmit, to the MME 2g-04, a control message for requesting for pausing the connection and maintaining an S1-U bearer. The MME 2g-04 that has received the control message may immediately transmit, when downlink data for the UE 2g-01 is generated in the S-GW 2g-04, the downlink data to the anchor gNB 2g-02, and the anchor gNB 2g-02 may generate a paging message to transmit the paging message to a neighboring eNB at 2g-30. For example, the anchor gNB 2g-02 that has received the downlink data stores the data in a buffer and proceeds a paging procedure. The anchor gNB 2g-02 refers to an eNB that maintains the UE context of the UE 2g-01 and the S1-U bearer. Alternatively, when the anchor gNB 2g-02 transmits the paging message and there is no response from the UE 2g-01, for example, when the paging fails, the anchor gNB 2g-02 may request for the paging procedure from the MME 2g-04, the MME 2g-04 may instruct to request for the start of the paging procedure without transmitting the downlink data on the UE 2g-01 generated in the S-GW 2g-04 to the anchor gNB 2g-02, and the S-GW may operate accordingly at 2g-30.

The UE 2g-01 that has received information for instructing to maintain the context and a deactivation transition RRC message including resume ID at 2g-20 may release the RRC connection, may drive a timer corresponding to a validity period, and may record a valid cell list in a memory. Next, the UE 2g-01 may maintain the current UE context in the memory without deleting the same and may switch to an inactive mode at 2g-35. The UE context refers to various types of information related to RRC configuration of the UE and may include SRB configuration information, DRB configuration information, security key information, and the like. When a C-RNTI maintenance indicator is transmitted from the deactivation transition RRC message, a C-RNTI value received from the serving cell is also maintained. Thereafter, a need to establish the RRC connection may be generated according to data traffic (mobile oriented (MO)) generated from the UE at 2g-40. The UE in which the fact that the resume ID is not assigned or the context is maintained in the previous deactivation transition process is not indicated may start the general RRC connection establishment process (FIG. 2F) described with reference to FIG. 2F.

However, the RRC inactive mode/lightly connected mode UE assigned with the Resume ID in the previous RRC disconnection process may attempt to perform an RRC connection resumption process using the stored UE context. The RRC inactive mode/lightly connected mode UE may perform the general RRC connection establishment process (FIG. 2F) according to whether a network supports the RRC inactive mode/lightly connected mode, or may perform the RRC connection resumption process using the stored UE context. For example, if the RRC inactive mode is not supported, the UE may perform the general RRC connection establishment process (FIG. 2F), and if the same is supported, the UE may perform the RRC connection resumption process as follows. In the above, the RRC inactive mode may be always supported in the network (hence, the system information may not separately indicate whether to support the RRC inactive mode). In the disclosure, each eNB or cell may enable an indicator indicating whether each eNB or cell supports the inactive mode to be included in the system information, and may transmit the system information at 2g-45. For example, the indicator may be included in a second block (Systeminformation2) of the system information, or may be included in the blocks (Systeminformation1 to 19) of other system information. Supporting the inactive mode in the above may mean that a corresponding new gNB 2g-03 or a corresponding cell may configure and support the following procedures 2g-50, 2g-55, 2g-60, 2g-65, 2g-70, 2g-75, 2g-80, 2g-85, 2g-90, 2g-95, 2g-100, 2g-105, and 2g-110. At 2g-45, the inactive mode UE 2g-01 may read system information of a cell currently camped on when there is a need to establish the RRC connection. At 2g-45, if the system information does not include the indicator indicating that the new gNB 2g-03 or the cell supports the RRC inactive mode, the UE 2g-01 performs the general RRC connection establishment process (FIG. 2F) described with reference to FIG. 2F. However, at 2g-50, if the system information includes the indicator indicating that the new gNB 2g-03 or the cell supports the RRC inactive mode, the UE 2g-01 performs the RRC connection resumption process using the stored UE context. The RRC connection resumption process using the stored UE context is as follows.

First, at 2g-55, the UE 2g-01 may transmit a preamble from message 1 to perform a random access procedure. At 2g-60, when resource allocation is possible according to the preamble received from message 1, the new gNB 2g-03 allocates an uplink resource equivalent thereto to the UE 2g-01 from message 2. At 2g-65, the UE 2g-01 may transmit a resumption request message including the resume ID received in the procedure 2g-20 based on received uplink resource information. The message may be a modified message of the RRCConnectionRequest message or a newly defined message (e.g., RRCConnectionResumeRequest). When the UE 2g-01 in the RRC inactive mode moves and camps on a cell of another eNB by releasing the connection from the existing anchor gNB 2g-02, the new gNB 2g-03 may receive and confirm the Resume ID of the UE to determine from which eNB the corresponding UE 2g-01 previously receives a service. If the new gNB 2g-03 has successfully received and confirmed the Resume ID, a procedure for retrieving the UE context from the existing anchor gNB 2g-02 may be performed (context retrieve procedures, 2g-70 and 2g-75). If the procedure for retrieving the UE context fails due to a predetermined reason, for example, a reason such that an anchor/source eNB is not found or the UE context does not exist, the new gNB 2g-03 may transmit the RRCConnectionSetup message as shown in FIG. 2F instead of the RRCConnectionResume message and may fall back a bearer configuration procedure/security configuration procedure thereafter to the RRC connection configuration procedure described with reference to FIG. 2F. Next, the gNB 2g-03 may complete the security configuration and may switch the UE to the RRC connection mode, or may switch the UE to the RRC inactive mode again while transmitting the RRCConnectionSuspend message together with a new resume ID and RAN paging area. The UE context may be brought from the existing anchor gNB 2g-02 by the new gNB 2g-03 through an S1 or X2 interface. If the new gNB 2g-03 receives the Resume ID but fails to distinguish the UE successfully due to a predetermined reason, the RRCConnectionSetup message may be transmitted to the UE 2g-01 to return to the general RRC connection establishment procedure described in FIG. 2F. For example, when the RRCConnectionSetup message is transmitted to the UE 2g-01 and the UE 2g-01 receives the message, the RRCConnectionSetup message may be transmitted to the new gNB 2g-03 to establish a connection. Alternatively, if the new gNB 2g-03 receives the Resume ID, but fails to distinguish the UE 2g-01 successfully (for example, fails to retrieve the UE context from the existing anchor gNB), an RRCConnectionRelease message or an RRCConnectionReject message may be transmitted to the UE 2g-01 to reject the connection of the UE 2g-01 and the general RRC connection establishment procedure described in FIG. 2F may be attempted to be performed from the beginning) The new gNB 2g-03 may identify an MAC-I based on the retrieved UE context at 2g-80. The MAC-I may be a message authentication code calculated by the UE for a control message by applying security information of the restored UE context, for example, a security key and a security counter. The new gNB 2g-03 may confirm the integrity of the message using the MAC-I of the message, and the security key and the security counter stored in the UE context. The anchor gNB 2g-02 or the new gNB 2g-03 may determine a configuration to be applied to the RRC connection of the UE 2g-01, and may transmit an RRC connection resumption message (RRCConnectionResume) containing the configuration information to the UE 2g-01 at 2g-85. The RRC connection resumption message may be transmitted by the new gNB 2g-03 identifying the resume ID of the UE 2g-01 and encrypt corresponding data using a new security key (KeNB* or KgNB*). The UE 2g-01 may decrypt corresponding data using the new security key (KeNB* or KgNB*) calculated using an NCC allocated in advance at 2g-20 to normally receive the RRC connection resumption message. After a procedure of transmitting the RRC connection resumption message, the RRC message and data may be encrypted using a new security key and may be transmitted and received by the UE 2g-01 and the new gNB 2g-03. The RRC connection resumption message may be a control message including information (REUSE INDICATOR) indicating "RRC context reuse" in a general RRC connection request message. The RRC connection resumption message may include various types of information related to the RRC connection establishment of the UE, similar to the RRC connection establishment message. When the UE 2g-01 receives a general RRC connection establishment message (RRCConnectionSetup), the RRC connection may be established based on the configuration information indicated in the RRC connection establishment message. However, when receiving the RRC connection resumption message, the UE 2g-01 may configure the RRC connection in consideration of both the stored configuration information and the configuration information indicated in the control message (delta configuration). In other words, the UE 2g-01 may determine the indicated configuration information to be the delta configuration on the stored configuration information to determine configuration information to be applied and to update the configuration information or the UE context. For example, if the RRC connection resumption message includes SRB configuration information, the UE 2g-01 may configure an SRB by applying the indicated SRB configuration information. On the other hand, if the RRC connection resumption message does not include SRB configuration information, the UE 2g-01 may configure the SRB by applying the SRB configuration information stored in the UE context.

At 2g-90, the UE 2g-01 may configure the RRC connection by applying the updated UE context and configuration information and may transmit an RRC connection resumption completion message (RRCConnectionResumeComplete) to the new gNB 2g-03. In addition, the UE 2g-01 may transmit a control message requesting for connection pause release from the MME 2g-04 and may request for reconfiguring the S1 bearer into the new gNB 2g-03 at 2g-95 and 2g-100. Upon receiving the message, the MME 2g-04 may instruct the S-GW 2g-04 to reconfigure the S1 bearer into the new gNB 2g-03 and to normally process data on the UE 2g-01. When the above process is completed, the new gNB 2g-03 may transmit a resource for MO data of the UE to the PDCCH at 2g-105, and the UE 2g-01 may resume data transmission and reception in the cell at 2g-110.

In the above procedure, if the UE 2g-01 in the RRC inactive mode by releasing the connection from the existing anchor gNB 2g-02 is not moved significantly and camps on the cell 2g-02 of the existing anchor gNB again, the anchor gNB 2g-02 does not perform the procedures 2g-70 and 2g-75, but performs only the connection pause release of the S1 bearer instead of the procedures 2g-95 and 2g-100, and the UE context of the UE may be searched with reference to the resume ID indicated in message 3 and the connection may be reconfigured in a similar manner to the above procedures based on the searched UE context.

Figure 2H:
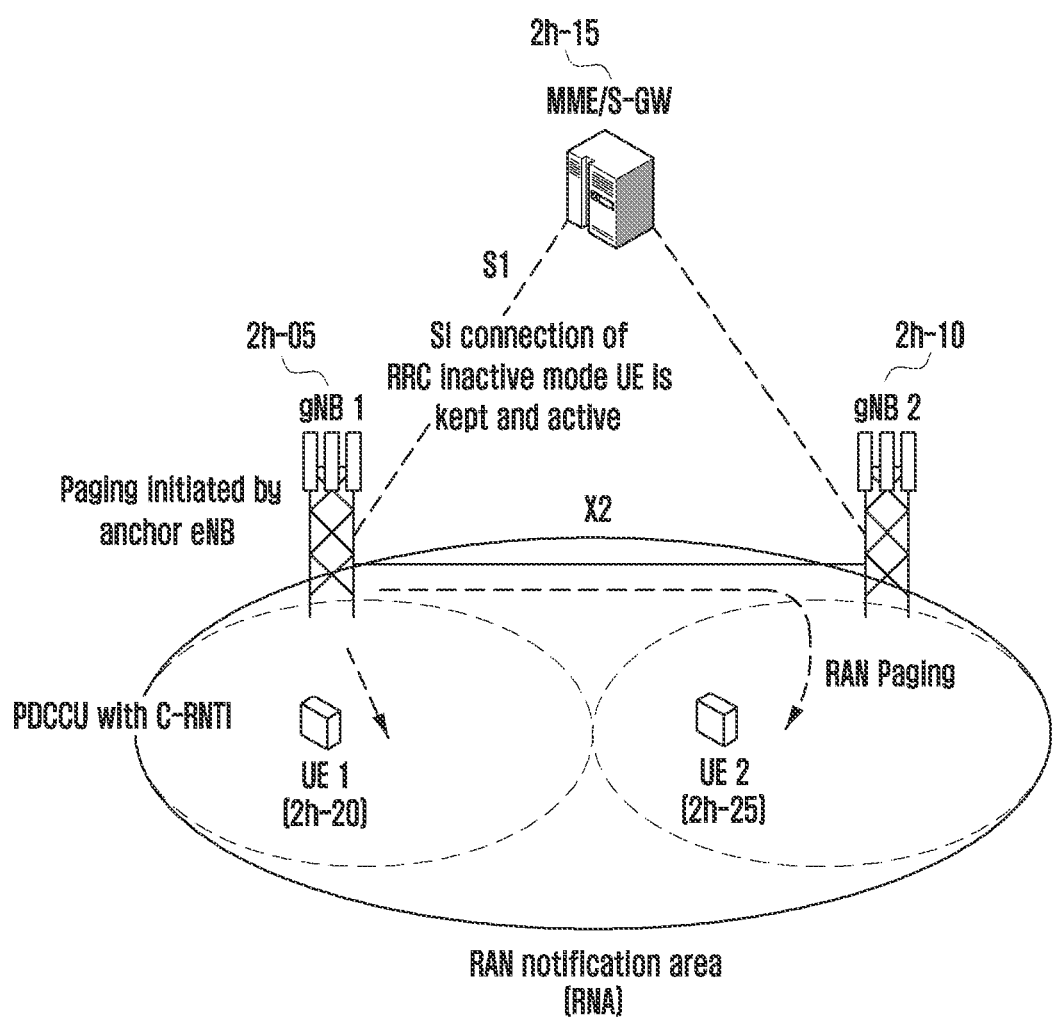
FIG. 2H is a diagram illustrating a notification procedure when mobile terminated (MT) data to be transmitted to a UE in an RRC inactive mode by an eNB is generated in the disclosure.
Figure 21A:
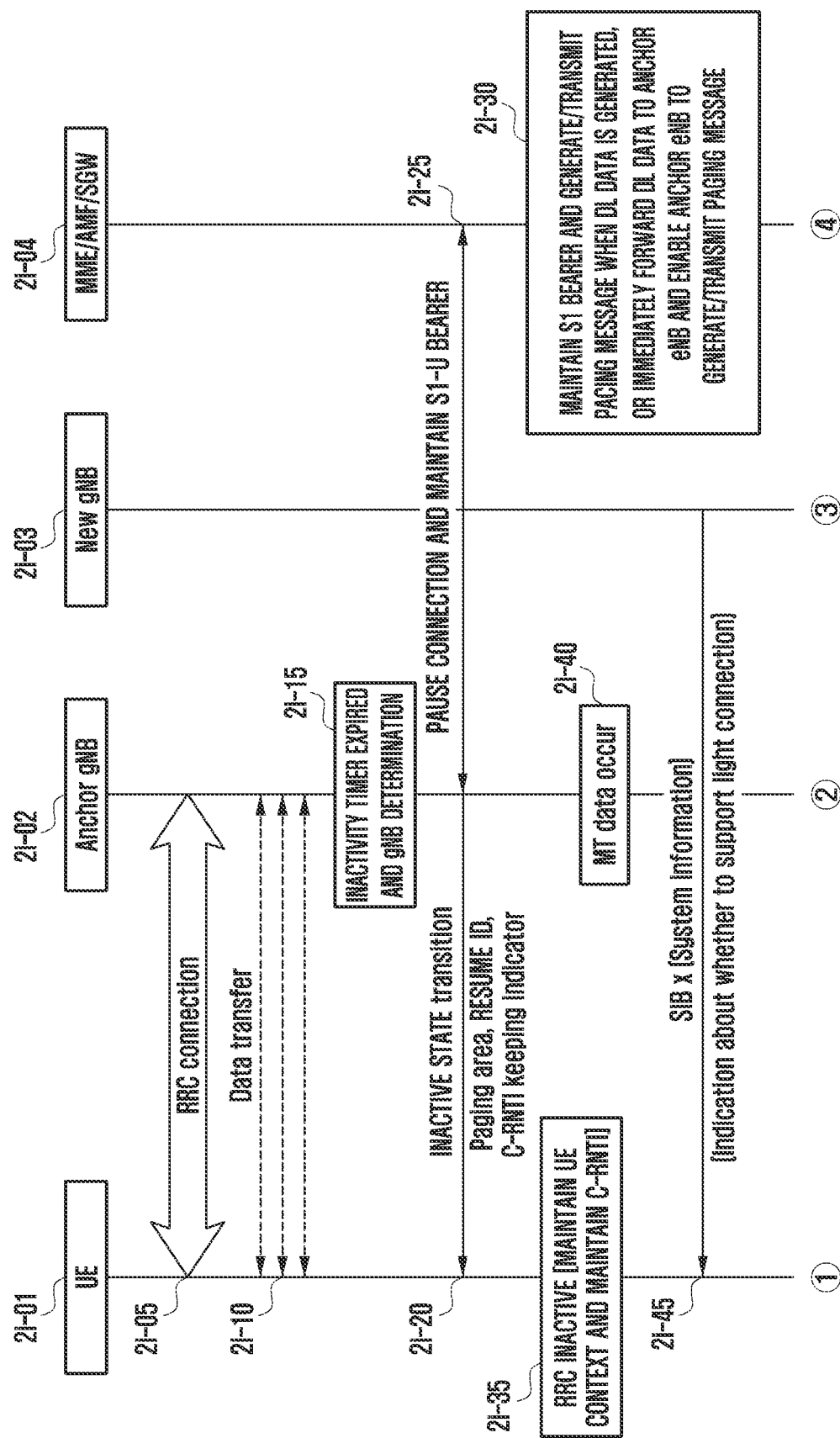

FIG. 2H is a diagram illustrating a notification procedure when mobile terminated (MT) data to be transmitted to a UE in an RRC inactive mode by an eNB is generated in the disclosure.

As can be seen in FIG. 2H, a UE in an RRC inactive mode is in a state of releasing an RRC connection. Therefore, when MT traffic is generated, a gNB should instruct the UE to transition to the RRC connection state and to transmit and receive data for the purpose of data transmission and reception. In the disclosure, since a different procedure is used according to which cell the UE in the inactive mode is located, this will be described. A serving cell 2h-05 may determine whether to switch the UE to an RRC idle mode or an RRC inactive mode according to predetermined conditions. In the above-described predetermined conditions, a degree of network traffic, an amount of UE context that a network can maintain, and the number of UEs in which a network can support a service may be considered. If the UE 2h-20 is transitioned to the inactive mode in the serving cell and is still located in the corresponding cell 2h-05, the UE 2h-20 may operate depending on the presence/absence of a C-RNTI maintenance indicator indicated by the serving cell. For example, if the C-RNTI maintenance indicator is included, the UE 2h-20 may monitor a PDCCH to transmit and receive MT data after maintaining the C-RNTI. On the other hand, when the UE 2h-25 in the inactive mode moves out of the serving cell 2h-05 to another cell in the corresponding state, the C-RNTI configured in the serving cell 2h-05 becomes invalid and cannot be used. In this case, the presence/absence of the MT data can be known by receiving RAN paging received from the gNB.

The disclosure discusses a method of differently configuring an RRC connection procedure and a data transmission/reception procedure when MT data is generated in a UE in the inactive mode described above, according to a cell in which the UE exists. Each of the methods will be described in detail in the following examples.

FIGS. 2IA and 2IB are diagrams illustrating a data transmission/reception procedure when a UE is present as is in a serving cell where the UE is transitioned to an RRC inactive mode as an embodiment 1 of a case in which MT data to be transmitted to a UE in an RRC inactive mode is generated in the disclosure.

A UE 2i-01 in an RRC connection state may perform data transmission/reception with gNBs at 2i-05 and 2i-10. When data transmission/reception is stopped, an anchor gNB 2i-02 may drive a predetermined timer. If data transmission/reception is not resumed until the timer expires at 2i-15, the anchor gNB 2i-02 may consider to release the RRC connection of the UE. At this time, the anchor gNB 2i-02 may determine whether to switch the UE 2i-01 to an RRC idle mode or an RRC inactive mode according to a predetermined condition. The predetermined condition may be a degree of network traffic, an amount of UE context that a network can maintain, the number of UEs in which a network can support a service, and the like. In order to switch the UE to the RRC inactive mode in procedure 2i-20, an inactive state transition RRC message (RRCConnectionRelease or RRCConnectionSuspend message, newly defined RRC message, or another existing RRC message can be reused) may be transmitted. In procedure 2i-20, the anchor gNB 2i-02 may release the RRC connection of the UE 2i-01 according to a predetermined rule, may store UE context, may assign a resume ID, and may configure a paging area to report mobility during the inactive state of the UE 2i-01 while transmitting a control message instructing the UE to release the RRC connection. By the assignment of the resume ID, it can be seen that the UE 2i-01 should store the UE context. Alternatively, at 2i-20, the anchor gNB 2i-02 may transmit, to the control message, a separate context maintenance indicator for instructing the UE 2i-01 to operate in the RRC inactive mode and to store the UE context. In addition, in the disclosure, for a simplified RRC connection procedure when MT data from a serving cell is generated, the anchor gNB 2i-02 may assign a value instructing to maintain the C-RNTI. In addition, the message may include security information for updating security configuration required when the UE 2i-01 performs an RRC connection resumption procedure later. For example, the UE 2i-01 may be pre-assigned with NCC (NextHopChainingCount) and may calculate and configure a new security key (KeNB* or KgNB*) using the NCC. In addition, the control message may include a period during which the anchor gNB 2i-02 maintains the context or a list of cells to which a procedure using a stored context can be applied when the UE 2g-01 tries to reconfigure the RRC connection within a validity period.

At 2i-25, after releasing the RRC connection of the UE 2i-01, the anchor gNB 2i-02 may maintain the UE context and the S1 bearer of the UE 2i-01 as is. The S1 bearer refers to an S1-control bearer used for transmitting and receiving a control message between the anchor gNB 2i-02 and the MME 2i-04 and an S1-user plane bearer used for transmitting and receiving user data between the anchor gNB 2i-02 and the S-GW 2i-04. By maintaining the S1 bearer, when the UE 2i-01 tries to configure the RRC connection in the same cell or in the same anchor gNB 2*i*-02, a procedure for S1 bearer configuration may be omitted. The anchor gNB 2*i*-02 may delete the UE context and release the S1 bearer when the validity period expires. At 2*i*-35, the UE 2*i*-01 that has received the inactive mode transition RRC message at 2*i*-20 switches to the RRC inactive mode.

In the above, the anchor gNB 2*i*-02 refers to an eNB that maintains and manages the UE context (resume ID) of the RRC inactive mode UE 2*g*-01 and manages an RAN paging area (or RAN notification area) to manage mobility of the RRC inactive mode UE. The role of the anchor gNB 2*i*-02 described above may be performed by AMF entity 2*i*-04 instead.

At 2*i*-25, the anchor gNB 2*i*-02 may transmit, to the MME 2*i*-04, a control message for requesting for pausing the connection and maintaining an S1-U bearer. The MME 2*i*-04 that has received the control message may immediately transmit, when downlink data for the UE 2*i*-01 is generated in the S-GW 2*i*-04, the downlink data to the anchor gNB 2*i*-02, and the anchor gNB 2*i*-02 may generate a paging message to transmit the paging message to a neighboring eNB at 2*i*-30.

The UE 2*i*-01 that has received information for instructing to maintain the context and a deactivation transition RRC message including a resume ID at 2*i*-20 may release the RRC connection, may drive a timer corresponding to a validity period, and may record a valid cell list in a memory. Next, the UE 2*i*-01 may maintain the current UE context in the memory without deleting the same and may switch to an inactive mode at 2*i*-35. The UE context refers to various pieces of information related to RRC configuration of the UE 2*i*-01 and may include SRB configuration information, DRB configuration information, security key information, and the like. When a C-RNTI maintenance indicator is transmitted from the deactivation transition RRC message, the UE 2*i*-01 also maintains a C-RNTI value received from the serving cell. Thereafter, a need to establish the RRC connection may be generated according to data traffic (mobile terminated (MT)) required to be transmitted to the UE 2*i*-01 at 2*i*-40. The UE in which the fact that the resume ID is not assigned or the context is maintained in the previous deactivation transition process is not indicated may start the general RRC connection establishment process (FIG. 2F) described with reference to FIG. 2F. On the other hand, the RRC inactive mode UE 2*i*-01 that is assigned with the resume ID and the C-RNTI maintenance indicator in the previous RRC disconnection process may attempt to perform the RRC connection resumption process using the stored UE context. In the above, the RRC inactive mode UE may perform the general RRC connection establishment process (FIG. 2F) according to whether a network supports the RRC inactive mode, or may perform the RRC connection resumption process using the stored UE context. For example, if the network does not support the RRC inactive mode, the UE may perform the general RRC connection establishment process (FIG. 2F), and if the network supports the RRC inactive mode, the UE may perform the RRC connection resumption process as follows. In the above, the RRC inactive mode may be always supported in the network (hence, the system information may not separately indicate whether to support the RRC inactive mode). According to an embodiment, each eNB or cell may enable an indicator indicating whether each eNB or cell supports the inactive mode to be included in the system information, and may transmit the system information at 2*i*-45. The indicator may be included in a second block (Systeminformation2) of the system information, or may be included in the blocks (Systeminformation1 to 19) of other system information. At 2*i*-45, the inactive mode UE 2*i*-01 may read system information of a cell 2*i*-03 currently camped on when there is a need to establish the RRC connection. At 2*i*-45, if the system information does not include the indicator indicating that the new gNB 2*i*-03 or the cell supports the RRC inactive mode, the UE 2*i*-01 performs the general RRC connection establishment process (FIG. 2F) described with reference to FIG. 2F. However, at 2*i*-50, if the system information includes the indicator indicating that the new gNB 2*i*-03 or the cell supports the RRC inactive mode, the UE 2*i*-01 performs the RRC connection resumption process using the stored UE context. The RRC connection resumption process using the stored UE context is as follows.

Specifically, the anchor gNB 2*i*-02 that has received the downlink data stores the data in a buffer and proceeds a paging procedure. The anchor gNB 2*i*-02 refers to an eNB that maintains the UE context of the UE 2*i*-01 and the S1-U bearer. In the embodiment, the above paging procedure is characterized in that the anchor gNB 2*i*-02 and the new gNB 2*i*-03 operate differently. The anchor gNB 2*i*-02 uses the C-RNTI configured when the UE 2*i*-01 is in the RRC connection state to page inactive mode UEs of the cell. For example, when downlink data is generated, a PDCCH order including the C-RNTI is transmitted to the UE 2*i*-01 at 2*i*-55, and the PDCCH order may include resource information used when the UE 2*i*-01 transmits random access message 1. The UE 2*i*-01 may perform a PDCCH monitoring operation according to discontinuous reception (DRX) in the inactive mode. In addition, when the anchor gNB 2*i*-02 receives downlink data for the UE 2*i*-01, the anchor gNB 2*i*-02 may notify the neighboring new gNB 2*i*-03 to transmit RAN paging through an inter-base station interface such as an X2 interface. The neighbor new gNB 2*i*-03 receiving this may transmit RAN paging at 2*i*-60. In this case, the RAN paging message may include preamble transmission resource information for random access message 1. When the corresponding information is included, the UE 2*i*-01 may use a resource configured according to the preamble transmission resource information during random access.

Next, the UE 2*i*-01 may transmit a corresponding preamble from preamble message 1 through the configured resource included in the PDCCH order in order to perform a random access procedure at 2*i*-65. If resource allocation is possible according to the preamble received from message 1, the anchor gNB 2*i*-02 may allocate a corresponding uplink resource to the UE 2*i*-01 from message 2 at 2*i*-70. The UE 2*i*-01 may transmit a resumption request message including the resume ID or the C-RNTI received in procedure 2*i*-20 based on the received uplink resource information at 2*i*-75. The message may be a modified message of the RRCConnectionRequest message or a newly defined message (e.g., RRCConnectionResumeRequest). In addition, the RRC connection resumption message corresponding to message 4 may be a control message (e.g., RRCConnectionResume) including information (REUSE INDICATOR) indicating "RRC context reuse" in a general RRC connection request message. The RRC connection resumption message may store various types of information related to the RRC connection establishment of the UE, similar to the RRC connection establishment message. In addition, the resource to which the connection resumption message is to be transmitted through the C-RNTI can be known. When the UE 2*i*-01 receives a general RRC connection establishment message (RRCConnectionSetup), the RRC connection may be established based on configuration information indicated in the RRC connection establishment message. On the other hand, when the UE 2i-01 receives the RRC connection resumption message, the RRC connection may be established in consideration of both the stored configuration information and the configuration information indicated in the control message (delta configuration). In other words, the UE 2i-01 may determine the indicated configuration information to be the delta configuration on the stored configuration information to determine configuration information to be applied and to update the configuration information or the UE context. For example, if the RRC connection resumption message includes SRB configuration information, the UE 2i-01 may configure an SRB by applying the indicated SRB configuration information. If the RRC connection resumption message does not include SRB configuration information, the UE 2i-01 may configure the SRB by applying the SRB configuration information stored in the UE context.

Next, the UE 2i-01 may transition to the RRC connection state. In this case, since the UE 2i-01 has the C-RNTI, it is not necessary to transmit an RRC connection resumption completion message (RRCConnectionResumeComplete). In addition, the UE 2i-01 may transmit a control message requesting for connection pause release from the MME 2i-04 and may request for reconfiguring the S1 bearer into the new gNB 2i-02 at 2i-90 and 2i-95. Upon receiving the message, the MME 2i-04 may instruct the S-GW 2i-04 to reconfigure the S1 bearer into the new gNB 2i-02 and to normally process data on the UE 2i-01. When the above process is completed, the anchor gNB 2i-02 may transmit a resource for MT data of the UE 2i-01 to the PDCCH at 2i-100, and the UE 2i-01 may resume data transmission and reception in the cell at 2i-105.

FIGS. 2JA and 2JB are diagrams illustrating a data transmission/reception procedure when a UE moves from a serving cell where the UE is transitioned to an RRC inactive mode to another cell as an embodiment 2 of a case in which MT data to be transmitted to a UE in an RRC inactive mode is generated in the disclosure.

A UE 2j-01 in an RRC connection state may perform data transmission/reception with an anchor gNB 2j-02 at 2j-05 and 2j-10. When data transmission/reception is stopped, the anchor gNB 2j-02 may drive a predetermined timer. If data transmission/reception is not resumed until the timer expires at 2j-15, the anchor gNB 2j-02 may consider to release the RRC connection of the UE. At this time, the anchor gNB 2j-02 may determine whether to switch the UE 2j-01 to an RRC idle mode or an RRC inactive mode according to a predetermined condition. The predetermined condition may be a degree of network traffic, an amount of UE context that a network can maintain, the number of UEs in which a network can support a service, and the like. In order to switch the UE 2j-01 to the RRC inactive mode in procedure 2j-20, an inactive state transition RRC message (RRCConnectionRelease or RRCConnectionSuspend message, newly defined RRC message, or another existing RRC message can be reused) may be transmitted. In procedure 2j-20, the anchor gNB 2j-02 may release the RRC connection of the UE 2j-01 according to a predetermined rule, may store UE context, and may transmit a control message instructing the UE 2j-01 to release the RRC connection. At this time, the anchor gNB 2j-02 may assign a resume ID using the control message, and may configure a paging area to report mobility during the inactive state of the UE 2j-01. By the assignment of the resume ID, it can be seen that the UE 2j-01 should store the UE context. Alternatively, at 2j-20, the anchor gNB 2j-02 may transmit, to the control message, a separate context maintenance indicator for instructing the UE 2i-01 to operate in the RRC inactive mode and to store the UE context. In addition, in the disclosure, for a simplified RRC connection procedure when MT data from a serving cell is generated, the anchor gNB 2j-02 may assign a value instructing to maintain the C-RNTI. In addition, the message may include security information for updating security configuration required when the UE 2i-01 performs an RRC connection resumption procedure later. For example, the UE 2j-01 may be pre-assigned with NCC (NextHopChainingCount) and may calculate and configure a new security key (KeNB* or KgNB*) using the NCC. In addition, the control message may include a period during which the anchor gNB 2j-02 maintains the context or a list of cells to which a procedure using a stored context can be applied when the UE 2j-01 tries to reconfigure the RRC connection within a validity period. At 2j-25, after releasing the RRC connection of the UE 2j-01 the anchor gNB 2j-02 may maintain the UE context and the S1 bearer of the UE 2j-01 as is. The S1 bearer refers to an S1-control bearer used for transmitting and receiving a control message between the anchor gNB 2j-02 and the MME 2j-04 and an S1-user plane bearer used for transmitting and receiving user data between the anchor gNB 2j-02 and the S-GW 2j-04. By maintaining the S1 bearer, when the UE 2j-01 tries to configure the RRC connection in the same cell or in the same anchor gNB 2j-02, a procedure for S1 bearer configuration may be omitted. The anchor gNB 2j-02 may delete the UE context and release the S1 bearer when the validity period expires. At 2j-35, the UE 2i-01 that has received the inactive mode transition RRC message at 2j-20 switches to the RRC inactive mode.

In the above, the anchor gNB 2j-02 refers to an eNB that maintains and manages the UE context (resume ID) of the RRC inactive mode UE 2j-01 and manages an RAN paging area (or RAN notification area) to manage mobility of the RRC inactive mode UE. The role of the anchor gNB 2j-02 described above may be performed by an access and mobility management function (AMF) entity 2j-04 instead.

At 2j-25, the anchor gNB 2j-02 may transmit, to the MME 2j-04, a control message for requesting for pausing the connection and maintaining an S1-U bearer. The MME 2j-04 that has received the control message may immediately transmit, when downlink data for the UE 2j-01 is generated in the S-GW 2j-04, the downlink data to the anchor gNB 2j-02, and the anchor gNB 2j-02 may generate a paging message to transmit the paging message to a neighboring eNB at 2j-30.

The UE 2j-01 that has received a deactivation transition RRC message including information indicating context maintenance and the resume ID may release the RRC connection at 2j-20, but may drive a timer corresponding to a valid period and may record a valid cell list in a memory. The UE 2j-01 may maintain the current UE context as is in the memory without deleting the current UE context at 2j-35, and may transition to an inactive mode. In the above, the UE context may refer to various types of information related to RRC configuration of the UE and may include SRB configuration information, DRB configuration information, security key information, and the like. When the anchor gNB 2j-02 transmits a C-RNTI maintenance indicator from the deactivation transition RRC message, the UE 2j-01 may also maintain a C-RNTI value received from the serving cell. Thereafter, a need to establish the RRC connection may be generated according to data traffic (MT) generated from the UE at 2j-40. The UE 2j-01 in which the fact that the resume ID is not assigned or the context is maintained in the previous deactivation transition process is not indicated may start the general RRC connection establishment process (FIG. 2F) described with reference to FIG. 2F. On the other hand, the RRC inactive mode UE 2j-01 assigned with the Resume ID and the C-RNTI maintenance indicator in the previous RRC disconnection process may attempt to perform an RRC connection resumption process using the stored UE context. The RRC inactive mode UE 2j-01 may perform the general RRC connection establishment process (FIG. 2F) according to whether a network supports the RRC inactive mode, or may perform the RRC connection resumption process using the stored UE context. For example, if the network does not support the RRC inactive mode, the UE may perform the general RRC connection establishment process (FIG. 2F), and if the network supports the RRC inactive mode, the UE may perform the RRC connection resumption process as follows. In the above, the RRC inactive mode may be always supported in the network (hence, the system information may not separately indicate whether to support the RRC inactive mode). According to an embodiment, each eNB or cell may enable an indicator indicating whether each eNB or cell supports the inactive mode to be included in the system information, and may transmit the system information at 2j-45. The indicator may be included in a second block (Systeminformation2) of the system information, or may be included in the blocks (Systeminformation1 to 19) of other system information. At 2j-45, the inactive mode UE 2i-01 may read system information of a cell 2j-03 currently camped on when there is a need to establish the RRC connection. At 2j-45, if the system information does not include the indicator indicating that the new gNB 2j-03 or the cell supports the RRC inactive mode, the UE 2j-01 performs the general RRC connection establishment process (FIG. 2F) described with reference to FIG. 2F. However, if the system information includes the indicator indicating that the new gNB or the cell supports the RRC inactive mode, the UE 2j-01 performs the RRC connection resumption process using the stored UE context. In the embodiment, a case where the UE 2j-01 moves to another new gNB 2j-03 other than the anchor gNB 2j-02, exactly, from a cell where RRC inactive transition is performed to a new cell will be described at 2j-50. The RRC connection resumption process using the stored UE context is as follows.

The anchor gNB 2j-02 that has received the downlink data stores the data in a buffer and proceeds a paging procedure. The anchor gNB 2j-02 refers to an eNB that maintains the UE context of the UE 2j-01 and the S1-U bearer. In the embodiment, the above paging procedure is characterized in that the anchor gNB 2j-02 and the new gNB 2j-03 operate differently. At 2j-55, the anchor gNB 2j-02 uses the C-RNTI configured when the UE 2j-01 is in the RRC connection state to page inactive mode UEs of the cell. For example, when downlink data is generated, a PDCCH order including the C-RNTI is transmitted to the UE 2j-01 at 2j-60. The PDCCH order may include resource information used when the UE 2i-01 transmits random access message 1. The UE 2j-01 may perform a PDCCH monitoring operation according to DRX in the inactive mode. In addition, when the anchor gNB 2j-02 receives downlink data for the UE 2j-01, the anchor gNB 2j-02 may notify the neighboring new gNB 2j-03 to transmit RAN paging through an inter-base station interface such as an X2 interface. The neighbor new gNB 2j-03 receiving this may transmit RAN paging at 2i-65. In this case, the RAN paging message may include preamble transmission resource information for random access message 1. When the corresponding information is included, the UE 2j-01 may use the configured resource for later random access.

First, the UE 2j-01 may transmit a corresponding preamble from preamble message 1 in order to perform a random access procedure at 2i-70. As described above, the preamble transmission resource information for random access message 1 may be included in the RAN paging message. If the corresponding information is included, the UE 2j-01 may use the configured resource for later random access. If resource allocation is possible according to the preamble received from message 1, the new gNB 2j-03 may allocate a corresponding uplink resource to the UE 2j-01 from message 2 at 2j-75. The UE 2j-01 may transmit a resumption request message including the resume ID received in procedure 2j-20 based on the received uplink resource information at 2j-80. The message may be a modified message of the RRCConnectionRequest message or a newly defined message (e.g., RRCConnectionResumeRequest). When the UE 2j-01 in the RRC inactive mode moves and camps on a cell of another eNB by releasing the connection from the existing anchor gNB 2j-02, the new gNB 2j-03 may receive and confirm the Resume ID of the UE to determine from which eNB the corresponding UE 2j-01 previously receives a service. If the new gNB 2j-03 has successfully received and confirmed the Resume ID, a procedure for retrieving the UE context from the existing anchor gNB 2j-02 may be performed (Context retrieve procedures, 2j-85 and 2j-90). If the procedure for retrieving the UE context fails due to a predetermined reason, for example, a reason such that an anchor/source eNB is not found or the UE context does not exist, the new gNB 2j-03 may transmit the RRCConnectionSetup message as shown in FIG. 2F instead of the RRCConnectionResume message and may fall back a bearer configuration procedure/security configuration procedure thereafter to the RRC connection configuration procedure described with reference to FIG. 2F. Next, the new gNB 2j-03 may complete the security configuration and may switch the UE 2j-01 to the RRC connection mode, or may switch the UE 2j-01 to the RRC inactive mode again while transmitting the RRCConnectionSuspend message together with a new resume ID and RAN paging area. The UE context may be brought from the existing anchor gNB 2j-02 by the new gNB 2j-03 through an S1 or X2 interface. If the new gNB receives the Resume ID but fails to distinguish the UE successfully due to a predetermined reason, the RRCConnectionSetup message may be transmitted to the UE to return to the general RRC connection establishment procedure described in FIG. 2F. For example, when the new gNB 2j-03 transmits the RRCConnectionSetup message to the UE 2j-01 and the UE 2j-01 receives the message, the RRCConnectionSetup message may be transmitted to the new gNB 2j-03 to establish a connection. Alternatively, if the new gNB 2j-03 receives the Resume ID, but fails to distinguish the UE 2j-01 successfully (for example, fails to retrieve the UE context from the existing anchor gNB), an RRCConnectionRelease message or an RRCConnectionReject message may be transmitted to the UE 2j-01 to reject the connection of the UE 2j-01 and the general RRC connection establishment procedure described in FIG. 2F may be attempted to be performed from the beginning) The new gNB 2j-03 may identify an MAC-I based on the retrieved UE context at 2j-95. The MAC-I may be a message authentication code calculated by the UE for a control message by applying security information of the restored UE context, for example, a security key and a security counter. The new gNB 2j-03 may confirm the integrity of the message using the MAC-I of the message, and the security key and the security counter stored in the UE context. The anchor gNB 2j-02 or the new gNB 2j-03 may determine a configuration to be applied to the RRC connection of the UE 2*j*-01, and may transmit an RRC connection resumption message (RRCConnectionResume) containing the configuration information to the UE 2*j*-01 at 2*j*-100. The RRC connection resumption message may be transmitted by the new gNB 2*j*-03 identifying the UE ID of the UE 2*j*-01 and encrypt corresponding data using a new security key (KeNB* or KgNB*). The UE 2*j*-01 may decrypt corresponding data using the new security key (KeNB* or KgNB*) calculated using an NCC allocated in advance at 2*j*-20 to normally receive the RRC connection resumption message. After a procedure of transmitting the RRC connection resumption message, the RRC message and data may be encrypted using a new security key and may be transmitted and received by the UE 2*j*-01 and the new gNB 2*j*-03. The RRC connection resumption message may be a control message including information (REUSE INDICATOR) indicating "RRC context reuse" in a general RRC connection request message. The RRC connection resumption message may include various types of information related to the RRC connection establishment of the UE, similar to the RRC connection establishment message. When the UE 2*j*-01 receives a general RRC connection establishment message (RRCConnectionSetup), the RRC connection may be established based on the configuration information indicated in the RRC connection establishment message. However, when receiving the RRC connection resumption message, the UE 2*j*-01 may configure the RRC connection in consideration of both the stored configuration information and the configuration information indicated in the control message (delta configuration). In other words, the UE 2*j*-01 may determine the indicated configuration information to be the delta configuration on the stored configuration information to determine configuration information to be applied and to update the configuration information or the UE context. For example, if the RRC connection resumption message includes SRB configuration information, the UE 2*j*-01 may configure an SRB by applying the indicated SRB configuration information. If the RRC connection resumption message does not include SRB configuration information, the UE 2*j*-01 may configure the SRB by applying the SRB configuration information stored in the UE context.

At 2*j*-105, the UE 2*j*-01 may configure the RRC connection by applying the updated UE context and configuration information and may transmit an RRC connection resumption completion message (RRCConnectionResumeComplete) to the new gNB 2*j*-03. The UE 2*j*-01 may transmit a control message requesting for connection pause release from the MME and may request for reconfiguring the S1 bearer into the new gNB 2*j*-03 at 2*j*-110 and 2*j*-115. Upon receiving the message, the MME 2*j*-04 may instruct the S-GW 2*j*-04 to reconfigure the S1 bearer into the new gNB 2*j*-03 and to normally process data on the UE 2*j*-01. When the above process is completed, the new gNB 2*j*-03 may transmit a resource for MO data of the UE to the PDCCH at 2*j*-120, and the UE 2*j*-01 may resume data transmission and reception in the cell at 2*j*-125.

Figure 2K:
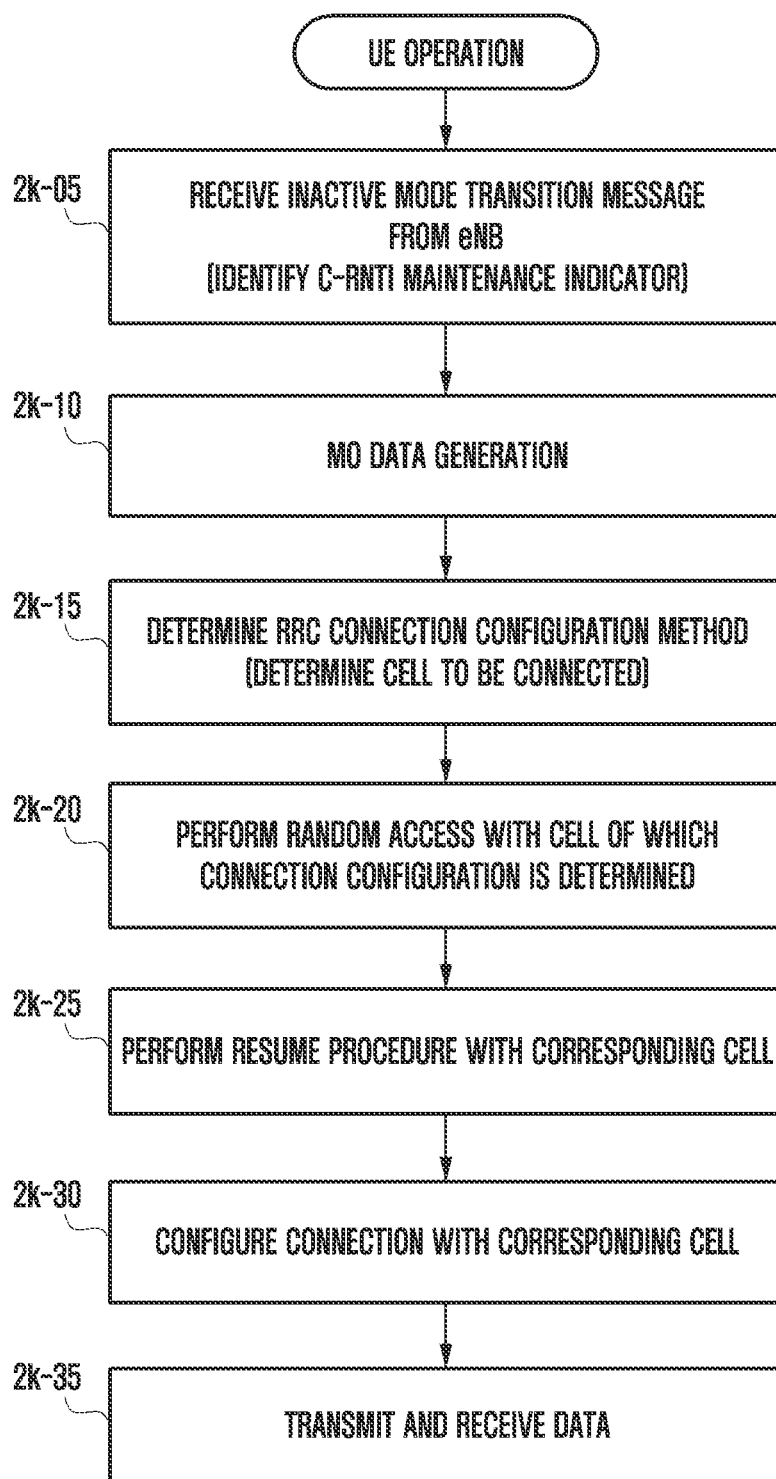
FIG. 2K is a diagram illustrating a UE operation when MO data is generated in a UE in an inactive mode in the disclosure.

FIG. 2K is a diagram illustrating a UE operation when MO data is generated in a UE in an inactive mode in the disclosure.

At 2*k*-05, a UE may transition to an RRC inactive mode by receiving an inactive mode transition message from an eNB. The message may include a control message instructing the UE to release an RRC connection of the UE according to a predetermined rule, to store UE context, and then to release the RRC connect. In addition, a resume ID may be assigned using the message and a paging area (PA) to report mobility may be configured while the UE is in an inactive state. By the assignment of the resume ID, it can be seen that the UE should store the UE context. Alternatively, the eNB may transmit, to the control message, a separate context maintenance indicator for instructing the UE to operate in the RRC inactive mode and to store the UE context. In addition, in the disclosure, for a simplified RRC connection procedure when MO data from a serving cell is generated, a value instructing to maintain the C-RNTI may be allocated. The message may include security information for updating security configuration required when the UE performs an RRC connection resumption procedure later. For example, the UE may be pre-assigned with NCC (NextHopChainingCount) and may calculate and configure a new security key (KeNB* or KgNB*) using the NCC.

Next, at 2*k*-10, when MO data, which is generated from the UE, is generated, it is necessary to perform an RRC connection and data transmission/reception between the UE and the Enb at 2*k*-15. At 2*k*-15, the UE may determine whether to perform a resume operation or a new RRC connection setup operation according to a resume ID received when inactive mode transition is instructed by the eNB and UE context maintenance. In addition, whether the RRC connection procedure is performed on which cell may be determined. The above determination may be affected by whether the RRC inactive mode received from a cell is supported, and the above operation may be supported by all cells.

At 2*k*-20, the UE may perform random access with a cell where the connection is established and may perform a resume procedure. If a resume condition is not satisfied, the UE may perform an RRC connection setup procedure in the corresponding procedure. The UE may then transition to an RRC connected state at 2*k*-30 and may transmit and receive data to and from the eNB at 2*k*-35.

Figure 2L:
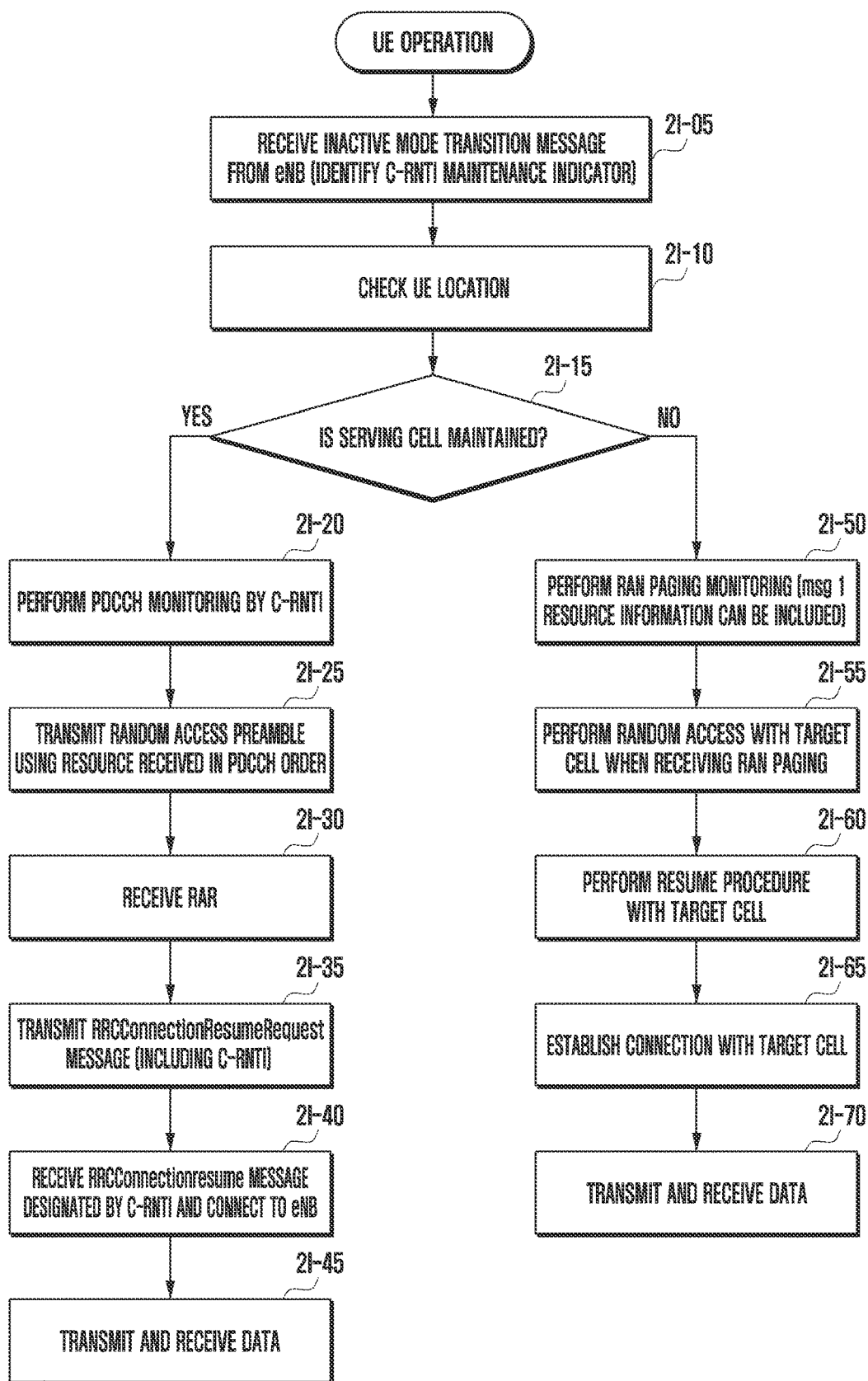
FIG. 2L is a diagram illustrating a UE operation when MT data is generated in a UE in an inactive mode in the disclosure.

FIG. 2L is a diagram illustrating a UE operation when MT data is generated in a UE in an inactive mode in the disclosure.

At 2*l*-05, a UE may transition to an RRC inactive mode by receiving an inactive mode transition message from an eNB. The message may include a control message instructing the UE to release an RRC connection of the UE according to a predetermined rule, to store UE context, and then to release the RRC connect. In addition, the control message may be used especially to assign a resume ID and for the UE to configure a PA to report mobility while the UE is in an inactive state. By the assignment of the resume ID, it can be seen that the UE should store the UE context. Alternatively, the eNB may transmit, to the control message, a separate context maintenance indicator for instructing the UE to operate in the RRC inactive mode and to store the UE context. In addition, in the disclosure, for a simplified RRC connection procedure when MT data from a serving cell is generated, a value instructing to maintain the C-RNTI may be allocated. The message may include security information for updating security configuration required when the UE performs an RRC connection resumption procedure later. For example, the UE may be pre-assigned with NCC (NextHopChainingCount) and may calculate and configure a new security key (KeNB* or KgNB*) using the NCC.

Thereafter, MT data to be transmitted to the UE is generated so that it is necessary to perform an RRC connection and data transmission/reception with an eNB. The UE may determine whether to perform a resume operation or a new RRC connection setup operation according to a resume ID received when inactive mode transition is instructed by the eNB and UE context maintenance. If the resume operation is performed, the UE may operate differently according to its location, exactly in which cell the UE is included at 2*l*-10 and 2*l*-15.

If the UE is present as is in a serving cell in which inactive mode transition is instructed, it is possible to monitor a PDCCH using a C-RNTI value configured when the RRC connection state. If a PDCCH order using the C-RNTI is received, the UE may attempt to perform random access (msg 1) using resources included in the above signal at 2*l*-25, and may receive a RAR at 2*l*-30. Thereafter, the UE may perform a resume procedure 2*l*-35 using the C-RNTI and may transition to a connected state with the eNB at 2*l*-40. Thereafter, the UE and the eNB may transmit and receive data at 2*l*-45.

If the UE moves to a different cell from the serving cell in which inactive mode transition is instructed, it is possible to discard the C-RNTI value configured when the RRC connection state and to monitor RAN paging at 2*l*-50. If the RAN paging is received, the UE performs a resumption procedure through the random access at 2*k*-55. If resource information for the random access is included in the RAN paging, the UE may perform preamble transmission through the resource. Next, the UE may perform the resumption procedure 2*l*-60 with a target cell and may transition to a connected state with the eNB at 2*l*-65. The UE and eNB may transmit and receive data at 2*l*-70.

Figure 2M:
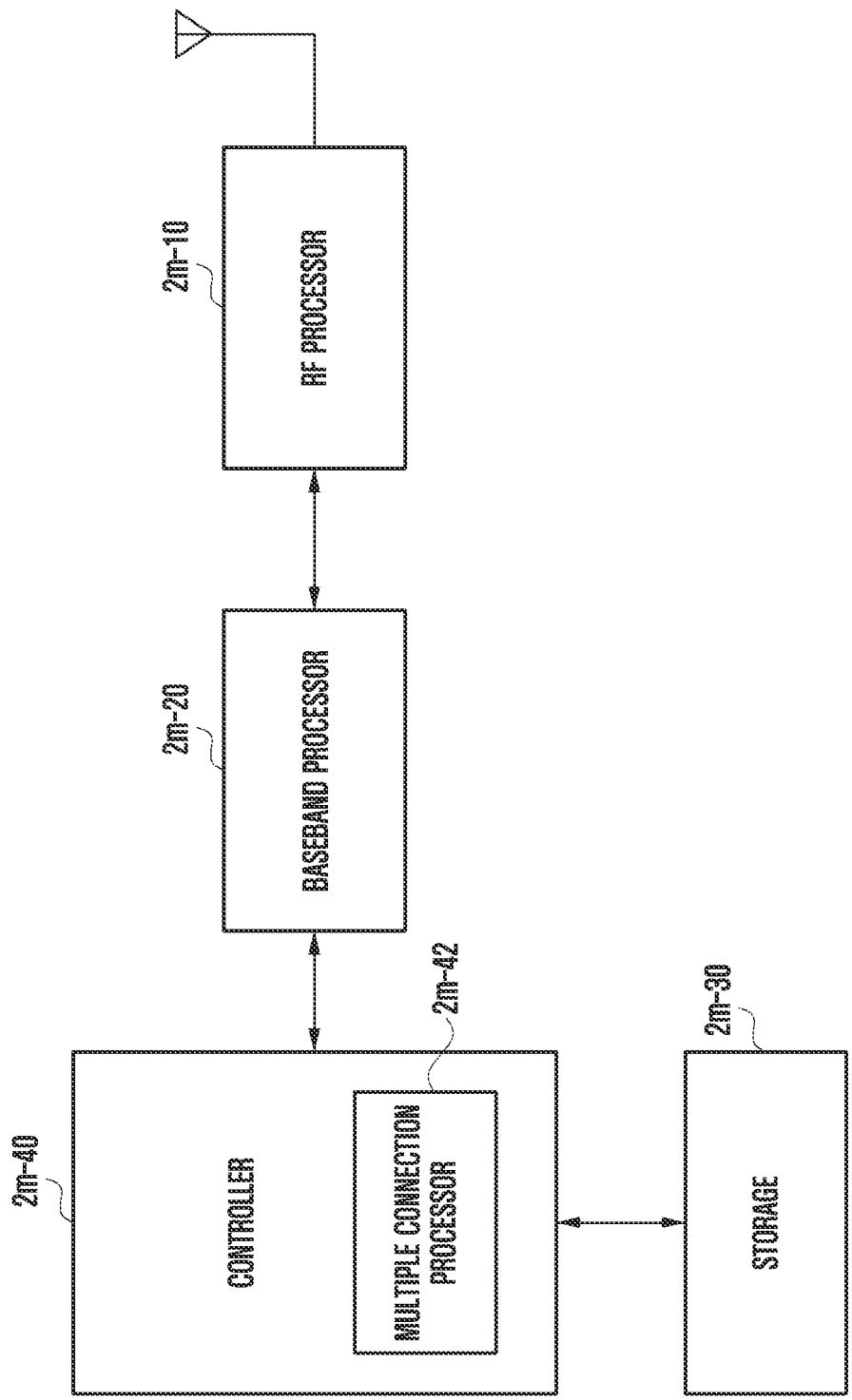
FIG. 2M is a block diagram illustrating the internal structure of a UE to which the disclosure is applied.

FIG. 2M is a block diagram illustrating the internal structure of a UE to which the disclosure is applied.

Referring to FIG. 2M, the UE may include a radio frequency (RF) processor 2*m*-10, a baseband processor 2*m*-20, a storage 2*m*-30, and a controller 2*m*-40.

The RF processor 2*m*-10 may perform a function for transmitting and receiving a signal through a wireless channel such as band conversion, amplification, and the like of a signal. Specifically, the RF processor 2*m*-10 may up-convert a baseband signal provided from the baseband processor 2*m*-20 into an RF band signal to transmit the RF band signal through an antenna, and may down-convert the RF band signal received through the antenna into a baseband signal. For example, the RF processor 2*m*-10 may include a transmission filter, a reception filter, an amplifier, a mixer, an oscillator, a DAC, an ADC, and the like. In FIG. 2M, only one antenna is shown, but the UE may include a plurality of antennas. In addition, the RF processor 2*m*-10 may include a plurality of RF chains. In addition, the RF processor 2*m*-10 may perform beamforming. For the beamforming, the RF processor 2*m*-10 may adjust the phase and magnitude of each of signals transmitted and received through a plurality of antennas or antenna elements. In addition, the RF processor may perform MIMO and may receive multiple layers when performing the MIMO operation.

The baseband processor 2*m*-20 may perform a conversion function between a baseband signal and a bit string according to a physical layer standard of the system. For example, during data transmission, the baseband processor 2*m*-20 generates complex symbols by encoding and modulating a transmission bit string. In addition, during data reception, the baseband processor 2*m*-20 may restore the received bit string by demodulating and decoding a baseband signal provided from the RF processor 2*m*-10. For example, according to an OFDM scheme, during data transmission, the baseband processor 2*m*-20 may generate complex symbols by encoding and modulating a transmission bit string, may map the complex symbols to subcarriers, and may then configure OFDM symbols through an IFFT operation and CP insertion. In addition, during data reception, the baseband processor 2*m*-20 may divide the baseband signal provided from the RF processor 2*m*-10 into units of OFDM symbols, may restore the signals mapped to the subcarriers through a FFT operation, and may then restore the received bit string through demodulation and decoding.

The baseband processor 2*m*-20 and the RF processor 2*m*-10 may transmit and receive signals as described above. Accordingly, the baseband processor 2*m*-20 and the RF processor 2*m*-10 may be referred to as a transmitter, a receiver, a transceiver, or a communicator. Further, at least one of the baseband processor 2*m*-20 and the RF processor 2*m*-10 may include a plurality of communication modules to support a plurality of different radio access technologies. In addition, at least one of the baseband processor 2*m*-20 and the RF processor 2*m*-10 may include different communication modules to process signals of different frequency bands. For example, the different radio access technologies may include a wireless LAN (e.g., IEEE 802.11), a cellular network (e.g., LTE), and the like. In addition, the different frequency bands may include a super high frequency (SHF) (e.g., 2.NRHz, NRhz) band and a millimeter wave (e.g., 60 GHz) band.

The storage 2*m*-30 may store data such as a basic program, an application program, and configuration information for the operation of the UE. Particularly, the storage 2*m*-30 may store information related to a second access node that performs wireless communication using a second wireless access technology. The storage 2*m*-30 may provide stored data in response to a request from the controller 2*m*-40.

The controller 2*m*-40 may control overall operations of the UE. For example, the controller 2*m*-40 may transmit and receive signals through the baseband processor 2*m*-20 and the RF processor 2*m*-10. In addition, the controller 2*m*-40 may record and read data in the storage 2*m*-40. To this end, the controller 2*m*-40 may include at least one processor. For example, the controller 2*m*-30 may include a communication processor (CP) for performing control for communication and an application processor (AP) for controlling an upper layer such as an application program.

Figure 2N:
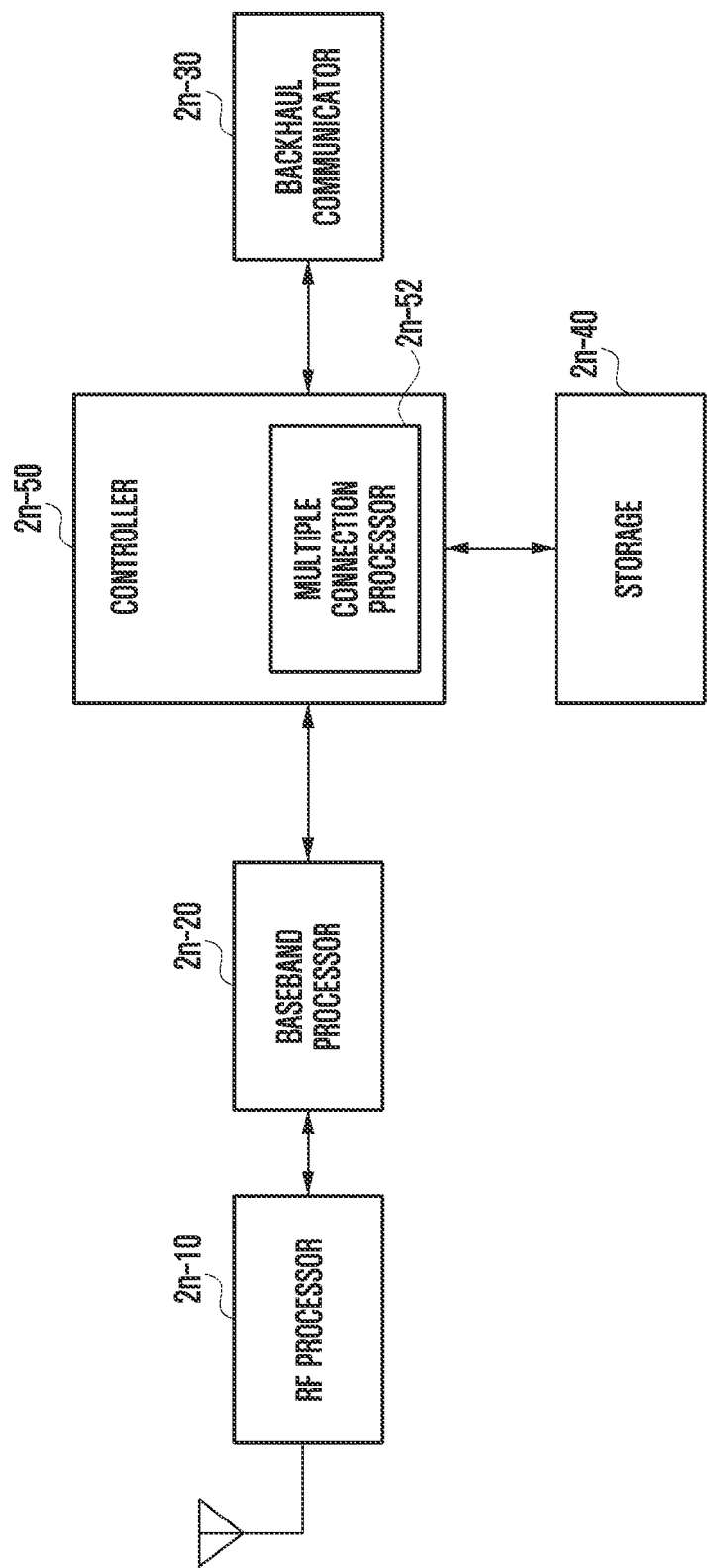
FIG. 2N is a block diagram illustrating a configuration of an eNB according to the disclosure.

FIG. 2N is a block diagram illustrating a configuration of an eNB according to the disclosure.

As illustrated in FIG. 2N, the eNB may include a RF processor 2*n*-10, a baseband processor 2*n*-20, a backhaul communicator 2*n*-30, a storage 2*n*-40, and a controller 2*n*-50.

The RF processor 2*m*-10 may perform a function for transmitting and receiving a signal through a wireless channel such as band conversion, amplification, and the like of a signal. Specifically, the RF processor 2*n*-10 may up-convert a baseband signal provided from the baseband processor 2*n*-20 into an RF band signal to transmit the RF band signal through an antenna, and may down-convert the RF band signal received through the antenna into a baseband signal. For example, the RF processor 2*n*-10 may include a transmission filter, a reception filter, an amplifier, a mixer, an oscillator, a DAC, an ADC, and the like. In FIG. 2N, only one antenna is shown, but the UE may include a plurality of antennas. In addition, the RF processor 2*n*-10 may include a plurality of RF chains. In addition, the RF processor 2*n*-10 may perform beamforming. For the beamforming, the RF processor 2*n*-10 may adjust the phase and magnitude of each of signals transmitted and received through a plurality of antennas or antenna elements. The RF processor may perform MIMO and may receive multiple layers when performing the MIMO operation.

The baseband processor 2n-20 may perform a conversion function between a baseband signal and a bit string according to a physical layer standard of a first radio access technology. For example, during data transmission, the baseband processor 2n-20 generates complex symbols by encoding and modulating a transmission bit string. In addition, during data reception, the baseband processor 2n-20 may restore the received bit string by demodulating and decoding a baseband signal provided from the RF processor 2n-10. For example, according to an OFDM scheme, during data transmission, the baseband processor 2n-20 may generate complex symbols by encoding and modulating a transmission bit string, may map the complex symbols to subcarriers, and may then configure OFDM symbols through an IFFT operation and CP insertion. In addition, during data reception, the baseband processor 2n-20 may divide the baseband signal provided from the RF processor 2n-10 into units of OFDM symbols, may restore the signals mapped to the subcarriers through a FFT operation, and may then restore the received bit string through demodulation and decoding. The baseband processor 2n-20 and the RF processor 2n-10 may transmit and receive signals as described above. Accordingly, the baseband processor 2n-20 and the RF processor 2n-10 may be referred to as a transmitter, a receiver, a transceiver, a communicator, or a wireless communicator.

The backhaul communicator 2n-30 may provide an interface for communicating with other nodes in a network. That is, the backhaul communicator 2n-30 may convert a bit string transmitted from a main eNB to another node, for example, an auxiliary eNB, a core network, etc., into a physical signal, and may convert the physical signal received from the other node into a bit string.

The storage 2n-40 may store data such as a basic program, an application program, and configuration information for the operation of the main eNB. In particular, the storage 2n-40 may store information on a bearer allocated to a connected UE, a measurement result reported from the connected UE, and the like. In addition, the storage 2n-40 may store information that is a criterion for determining whether to provide or terminate multiple connections to the UE. The storage 2n-40 may provide stored data in response to a request from the controller 2n-50.

The controller 2n-50 may control overall operations of the main eNB. For example, the controller 2n-50 may transmit and receive a signal through the baseband processor 2n-20 and the RF processor 2n-10 or through the backhaul communicator 2n-30. The controller 2n-50 records and reads data in the storage 2n-40. To this end, the controller 2n-50 may include at least one processor.

Third Embodiment

Hereinafter, the operating principle of the disclosure will be described in detail with reference to the accompanying drawings. In describing the disclosure below, a detailed description of related known configurations or functions incorporated herein will be omitted when it is determined that the detailed description thereof may unnecessarily obscure the subject matter of the disclosure. The terms which will be described below are terms defined in consideration of the functions in the disclosure, and may be different according to users, intentions of the users, or customs. Therefore, the definitions of the terms should be made based on the contents throughout the specification. Terms for identifying connection nodes, terms referring to network entities, terms referring to messages, terms referring to interfaces between network entities, terms referring to a variety of types of identification information, and the like, which are used in the following description are illustrated for convenience of description. Therefore, the disclosure may not be limited by the terminologies provided below, and other terms that indicate subjects having equivalent technical meanings may be used.

For convenience of description below, the disclosure uses terms and names defined in 3GPP LTE and LTE-A standards or terms and names modified based on these. However, the disclosure is not limited to the above terms and names, and may be equally applied to a system conforming to another standard.

Figure 3A:
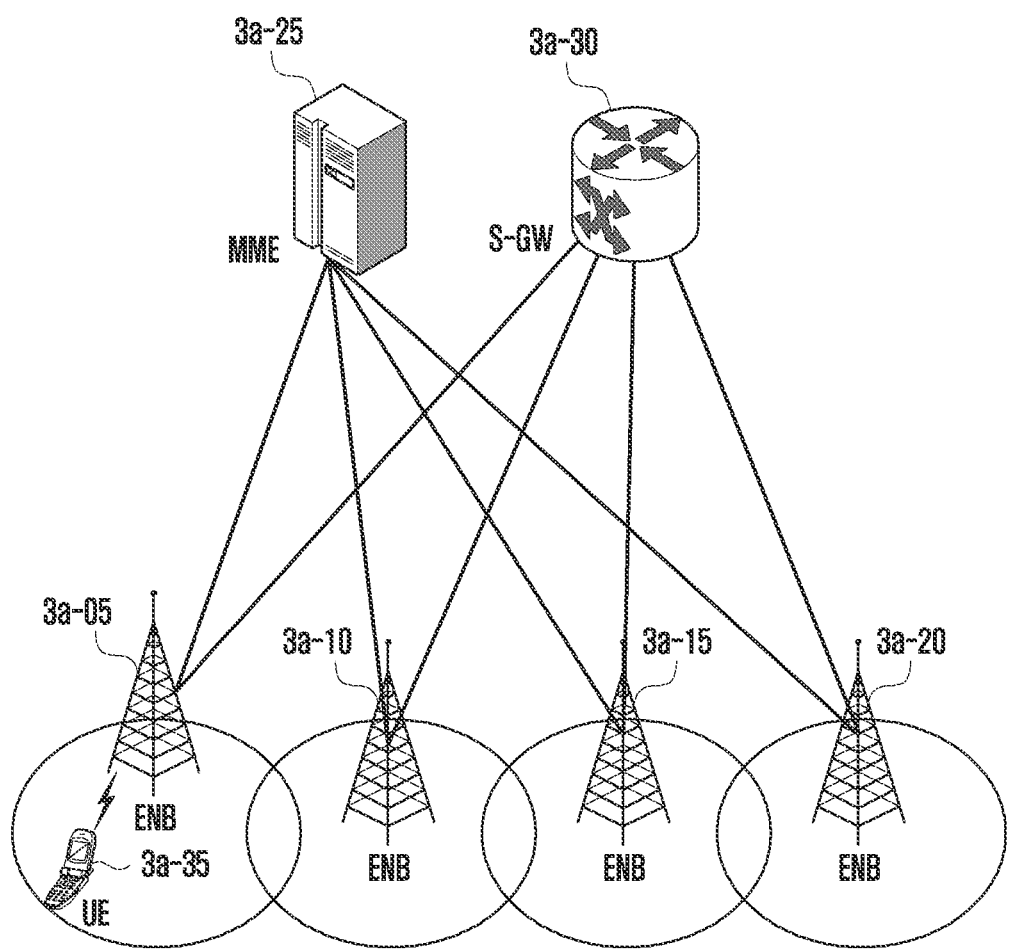
FIG. 3A is a diagram illustrating the structure of an LTE system which is referred to for description of the disclosure.

FIG. 3A is a diagram illustrating the structure of an LTE system which is referred to for description of the disclosure.

Referring to FIG. 3A, a radio access network of an LTE system may include a next generation eNBs 3a-05, 3a-10, 3a-15, and 3a-20, an MME 3a-25, and an S-GW 3a-30. A UE 3a-35 is connected to an external network through the eNBs 3a-05 to 3a-20 and the S-GW 3a-30.

FIG. 3A, the eNBs 3a-05 to 3a-20 correspond to an existing node B of a UMTS system. The eNB is connected to the UE 3a-35 through a wireless channel and may play a more complicated role than the existing Node B. In the LTE system, since all user traffic is serviced through a shared channel, including a real-time service such as VoIP through an internet protocol, there is a need for a device that collects and schedules state information such as buffer states, available transmission power states, and channel states of UEs, and this device is handled by the eNBs 3a-05 to 3a-20. One eNB typically controls multiple cells. In order to implement a transmission rate of 100 Mbps, the LTE system uses OFDM as a radio access technology in a bandwidth of, for example, 20 MHz. In addition, an AMC scheme that determines a modulation scheme and a channel coding rate according to the channel state of a UE is applied to the system. The S-GW 3a-30 is a device for providing a data bearer, and generates or removes a data bearer under the control of the MME 3a-25. The MME is a device that is in charge of various control functions as well as mobility management function for the UE and is connected to a plurality of eNBs.

Figure 3B:
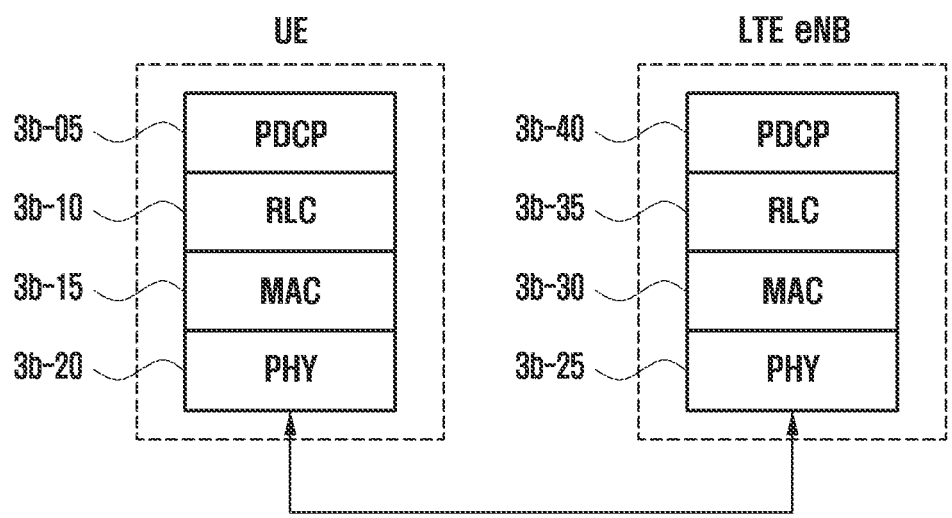
FIG. 3B is a diagram illustrating a radio protocol structure in an LTE system which is referred to for description of the disclosure.

FIG. 3B is a diagram illustrating a radio protocol structure in an LTE system which is referred to for description of the disclosure.

Referring to FIG. 3B, a radio protocol of an LTE system may include PDCPs 3b-05 and 3b-40, RLCs 3b-10 and 3b-35, and MMCs 3b-15 and 3b-30 in a UE and an eNB, respectively. The PDCPs 3b-05 and 3b-40 is in charge of operations such as IP header compression/restoration, and the like. The main functions of the PDCP are summarized as follows.

Header compression and decompression: ROCH only

Transfer of user data

In-sequence delivery of upper layer PDUs at PDCP re-establishment procedure for RLC AM For split bearers in DC (only support for RLC AM): PDCP PDU routing for transmission and PDCP PDU reordering for reception Duplicate detection of lower layer SDUs at PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink The RLCs 3b-10 and 3b-35 may reconfigure PDCP PDUs to appropriate sizes to perform an ARQ operation. The main functions of the RLC are summarized as follows.

Transfer of upper layer PDUs

Error Correction through ARQ (only for AM data transfer)

Concatenation, segmentation and reassembly of RLC SDUs (only for UM and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MACs 3b-15 and 3b-30 are connected to several RLC layer entities configured in one UE, and perform an operation of multiplexing RLC PDUs into MAC PDUs and demultiplexing the RLC PDUs from the MAC PDUs. The main functions of the MAC are summarized as follows.

Mapping between logical channels and transport channels

Multiplexing/demultiplexing of MAC SDUs belonging to one or different logical channels into/from transport blocks (TB) delivered to/from the physical layer on transport channels Scheduling information reporting Error correction through HARQ Priority handling between logical channels of one UE Priority handling between UEs by means of dynamic scheduling MBMS service identification Transport format selection Padding The physical layers 3b-20 and 3b-25 perform an operation of channel-coding and modulating upper layer data to make the resultant data into an OFDM symbol and transmit the OFDM symbol to a wireless channel, or an operation of demodulating and channel-decoding the OFDM symbol received through the wireless channel to transmit the resultant data to the upper layer.

Figure 3C:
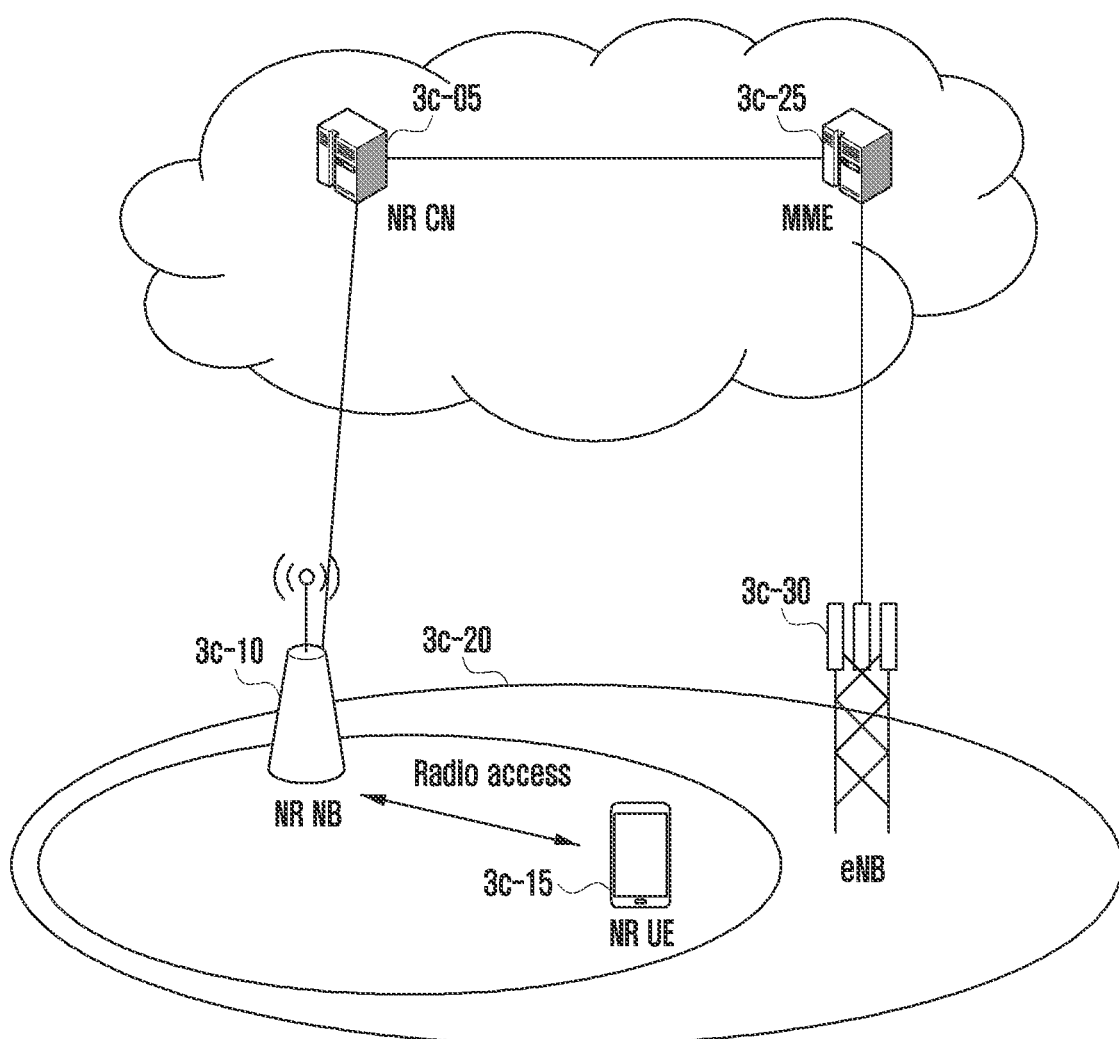
FIG. 3C is a diagram illustrating the structure of a next generation mobile communication system to which the disclosure is applied.

FIG. 3C is a diagram illustrating the structure of a next generation mobile communication system to which the disclosure is applied.

Referring to FIG. 3C, a radio access network of a next generation mobile communication system may include a next generation eNB (new radio Node B (NR NB)) 3c-10 and a new radio core network (NR CN or next generation core network (NG CN)) 3c-05. A UE (new radio user equipment (NR UE) or terminal) 3c-15 is connected to an external network through the NR NB 3c-10 and the NR CN 3c-05.

In FIG. 3C, the NR NB 3c-10 corresponds to an eNB of an existing LTE system. The NR NB is connected to the NR UE 3c-15 through a wireless channel and may provide more superior service than an existing Node B. In the next generation mobile communication system, since all user traffic is serviced through a shared channel, there is a need for a device that collects and schedules state information such as buffer states, available transmission power states, and channel states of UEs, and this device is handled by the NR NB 3c-10. One NR NB typically controls multiple cells.

In order to implement ultra-fast data transmission compared to a current LTE, a beamforming technology that can have an existing maximum bandwidth or more and uses OFDM as a radio access technology may be further combined with the system. In addition, an AMC scheme that determines a modulation scheme and a channel coding rate according to the channel state of a UE is applied to the system. The NR CN 3c-05 performs mobility support, bearer configuration, QoS configuration, and the like. The NR CN 3c-05 is a device that is in charge of various control functions as well as a mobility management function for a UE and is connected to a plurality of eNBs. In addition, the next generation mobile communication system can be linked to an existing LTE system, and the NR CN is connected to the MME 3c-25 through a network interface. The MME is connected to an eNB 3c-30 which is an existing eNB.

Figure 3D:
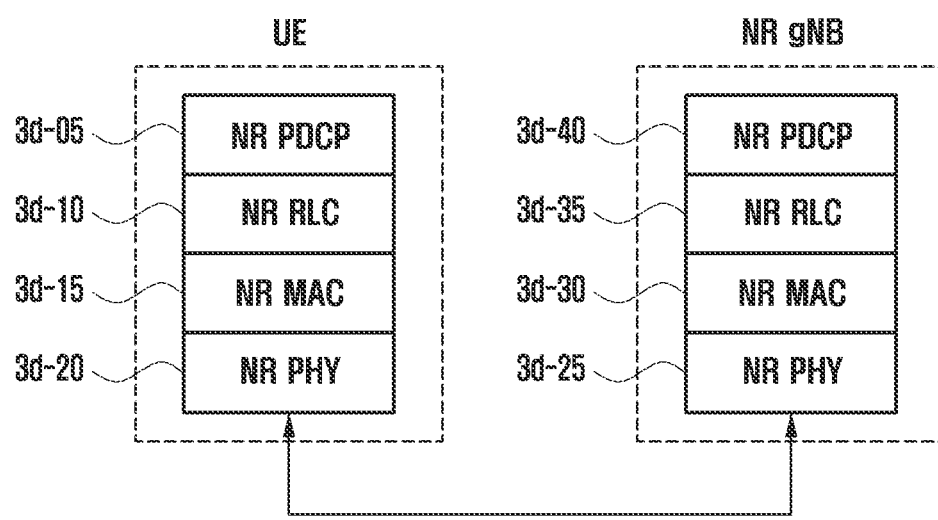
FIG. 3D is a diagram illustrating a radio protocol structure of a next generation mobile communication system to which the disclosure is applied.

FIG. 3D is a diagram illustrating a radio protocol structure of a next generation mobile communication system to which the disclosure is applied.

Referring to FIG. 3D, a radio protocol of a next generation mobile communication system includes NR PDCPs 3d-05 and 3d-40, NR RLCs 3d-10 and 3d-35, and NR MACs 3d-15 and 3d-30 in a UE and an eNB, respectively. The main functions of the NR PDCPs 3d-05 and 3d-40 may include some of the following functions.

Header compression and decompression: ROHC only

Transfer of user data

In-sequence delivery of upper layer PDUs

PDCP PDU reordering for reception

Duplicate detection of lower layer SDUs

Retransmission of PDCP SDUs

Ciphering and deciphering

Timer-based SDU discard in uplink

The reordering of the NR PDCP refers to a function of reordering PDCP PDUs received from a lower layer based on a PDCP sequence number, and may include a function of delivering data to an upper layer in a reordered sequence, a function of reordering the sequence to record lost PDCP PDUs, a function of reporting the state of the lost PDCP PDUs to a transmission side, and a function of requesting a retransmission of the lost PDCP PDUs.

The main functions of the NR RLCs 3d-10 and 3d-35 may include some of the following functions.

Transfer of upper layer PDUs

In-sequence delivery of upper layer PDUs

Out-of-sequence delivery of upper layer PDUs

Error Correction through ARQ

Concatenation, segmentation and reassembly of RLC SDUs

Re-segmentation of RLC data PDUs

Reordering of RLC data PDUs—Duplicate detection

Protocol error detection

RLC SDU discard

RLC re-establishment

The in-sequence delivery of the NR RLC refers to a function of sequentially delivering RLC SUDs received from a lower layer to an upper layer. The in-sequence delivery of the NR RLC may include a function of reassembling and delivering, when an original RLC SDU is segmented into several RLC SDUs and received, the segmented RLC SDUs, a function of reassembling the received RLC PUDs based on an RLC sequence number (SN) or a PDCP SN, a function of reordering the sequence to record lost RLC PDUs, a function of reporting the state of the lost RLC PDUs to a transmission side, a function of requesting a retransmission of the lost PDCP RLCs, a function of sequentially delivering, when there is a lost RLC SDU, only the RLC SDUs before the lost RLC SDU to an upper layer, a function of sequentially delivering all the RLC SDUs received before a predetermined timer starts to an upper layer if the timer has expired even though there is a lost RLC SDU, and a function of sequentially delivering all the RLC SDUs received so far to an upper layer if a predetermined timer has expired even though there is a lost RLC SDU. In addition, the RLC PDUs may be processed in the order of receiving the RLC PDUs (regardless of the order of the sequence number, in the order of arrival) and delivered to the PDCP regardless of the order (out-of sequence delivery). In a case of segments, segments stored in a buffer or to be received later are received to be reconfigured into an intact RLC PDU, and then processed and delivered to the PDCP. The NR RLC layer may not include a concatenation function and may perform the above function in the NR MAC layer or replace the above function with a multiplexing function of the NR MAC layer.

In the above, the Out-of-sequence delivery of the NR RLC refers to a function of directly delivering the RLC SDUs received from the lower layer to the upper layer regardless of the sequence, and may include a function of reassembling and delivering, when an original RLC SDU is segmented into several RLC SDUs and received, the segmented RLC SDUs, and a function of storing the RLC SN or PDCP SN of the received RLC PDUs and reordering the sequence to record the lost RLC PDUs.

The NR MACs 3d-15 and 3d-30 may be connected to several NR RLC layer entities configured in one UE, and the main functions of the NR MAC may include some of the following functions.

- Mapping between logical channels and transport channels
- Multiplexing/demultiplexing of MAC SDUs
- Scheduling information reporting
- Error correction through HARQ
- Priority handling between logical channels of one UE
- Priority handling between UEs by means of dynamic scheduling
- MBMS service identification
- Transport format selection
- Padding NR PHY layers 3d-20 and 3d-25 may perform an operation of channel-coding and modulating upper layer data to make the resultant data into an OFDM symbol and transmit the OFDM symbol to a wireless channel, or an operation of demodulating and channel-decoding an OFDM symbol received through a wireless channel to transmit the resultant data to an upper layer.

Figure 3E:
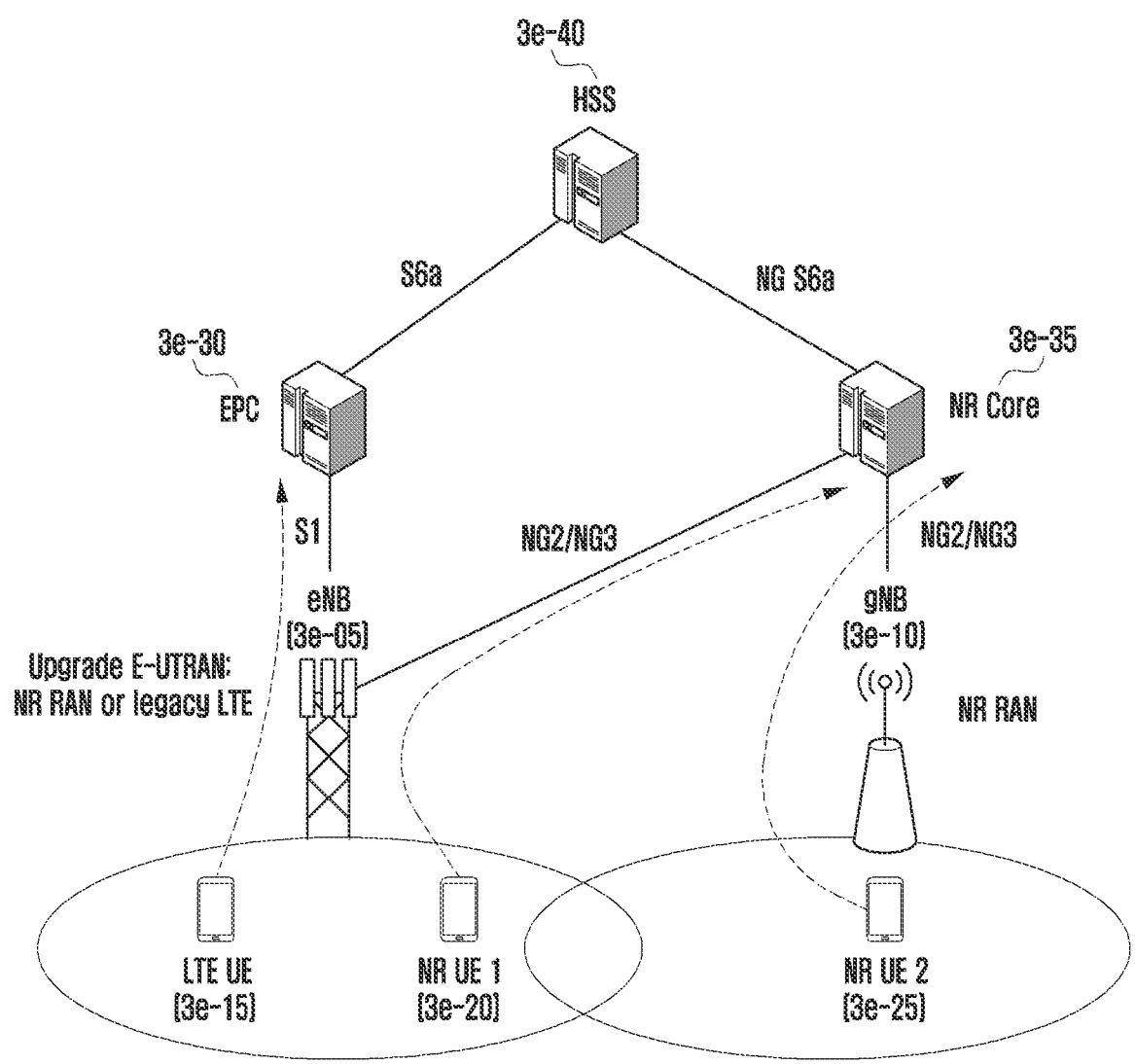
FIG. 3E is a diagram illustrating a method in which a UE is connected to an EPC and an NG CN in a next generation mobile communication system of the disclosure.

FIG. 3E is a diagram illustrating a method in which a UE is connected to an EPC and an NG CN in a next generation mobile communication system of the disclosure.

As illustrated in FIG. 3E, in a next generation mobile communication system, an NG core network 3e-35 may be connected to an LTE radio access network (evolved packet core (EPC)) 3e-05 and an NR radio access network (NR RAN: new RAT radio access network) 3e-10. UEs 3e-20 and 3e-25 that can be connected to the NR CN should be able to be simultaneously connected to the NR core network 3e-35 and the LTE core network 3e-30. For example, the UE should be able to use non access stratum (NAS) connection for both the EPC and the NR CN. The UE capable of connecting to at least the NR CN may always select an NR CN NAS when connected to a network. However, the NR CN may not support a specific function (e.g., MBMS) that is supported by the EPC of LTE. In addition, even if the same UE is registered in the EPC and NR CN, respectively, different services may be supported. Therefore, even if the UE is registered in the NR CN, there is a need to be reconfigured to the EPC, if necessary. In addition, the LTE UE 3e-15 that can only be connected to the EPC can be connected to the EPC to receive a service.

In order to be able to connect to both the NR CN and the EPC as described above, a gNB should be used, or an eNB, which is an existing LTE eNB, should be upgraded for NR CN access.

In the disclosure, a process in which a UE registered in a 5G CN is reconfigured into an EPC, if necessary, in a state configured in FIG. 3E, for example, a core network reselection process is specified. Detailed operations will be made later.

Figure 3F:
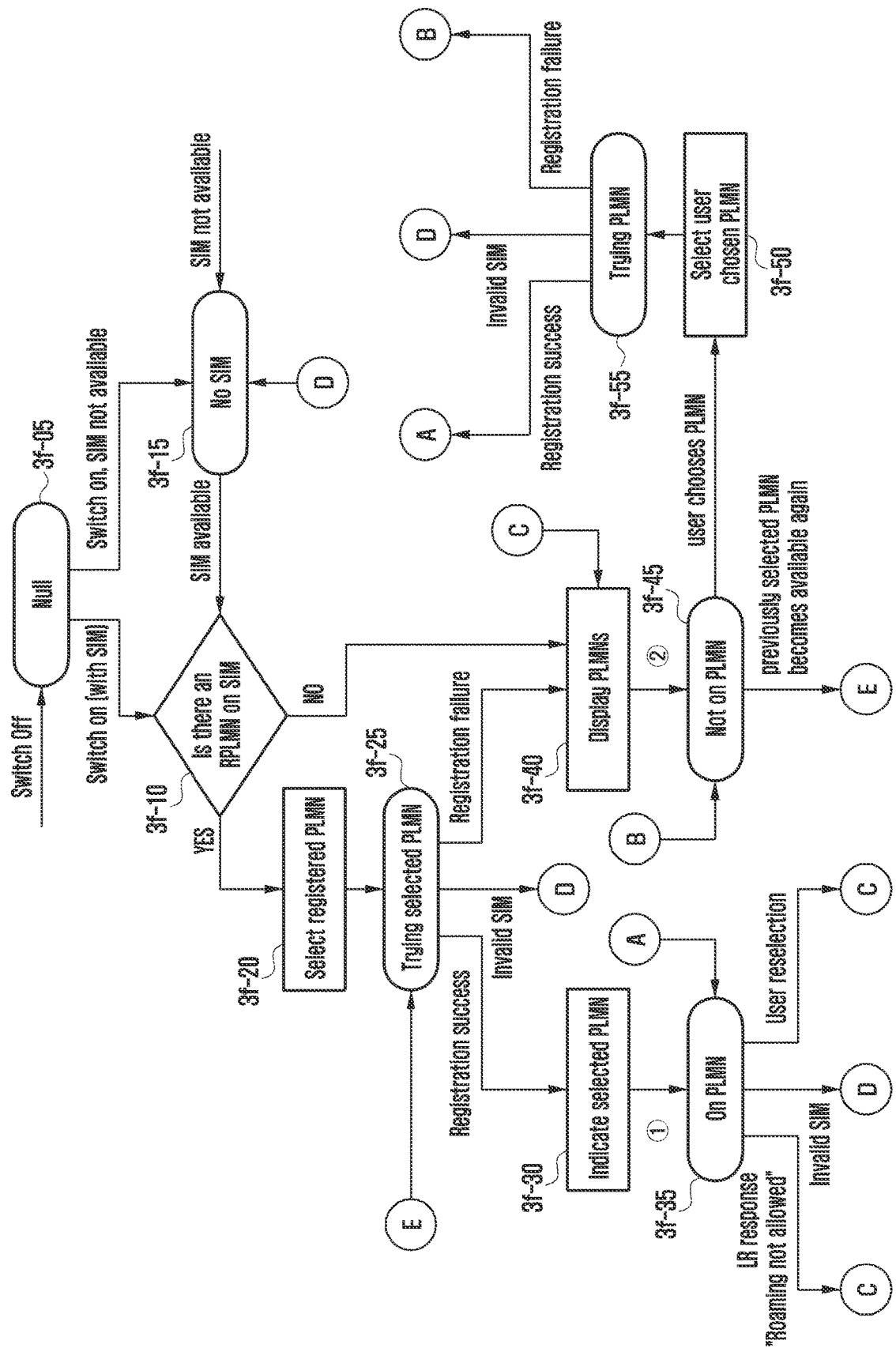
FIG. 3F is a diagram illustrating a method in which a UE selects a PLMN in an LTE which is referred to in the disclosure.

FIG. 3F is a diagram illustrating a method in which a UE selects a PLMN in an LTE which is referred to in the disclosure.

A method of retrieving and determining a PLMN in an LTE is performed automatically in an access stratum (AS), or may be triggered through an NAS to be performed manually. In general, a UE operates in a home PLMN (HPLMN) or an equivalent home PLMN (EHPLMN), but a VPLMN may be selected. Fundamentally, an AS layer reports all kinds of information about the PLMN to the NAS, including a list of connectable PLMNs, and the AS layer performs an additional PLMN selection operation based on priority information. For example, for PLMN selection, the UE scans E-UTRA bands through all RF channels that are suitable for the capability, retrieves a valid PLMN, reads system information in a cell with the strongest signal, and performs a PLMN selection process according to a PLMN list provided from the corresponding cell.

FIG. 3F illustrates a basic PLMN selection process in a passive mode. When the power of a UE is turned on at 3f-05, the UE may determine whether there is a registered PLMN around the UE at 3f-10. If the powered-on UE does not have a subscriber identity module (SIM) or is not valid, the state of the UE is maintained at 3f-15 until the SIM is valid. If the UE finds an RPLMN and selects a PLMN at 3f-20, the UE may attempt to connect to the PLMN at 3f-25. When registration and connection is successfully completed, the UE may indicate the connected PLMN at 3f-30 and perform a service in the corresponding PLMN at 3f-35. However, if the registration and connection process fails at 3f-40, the UE cannot be connected to the corresponding PLMN at 3f-45, and may attempt to connect to the PLMN selected at 3f-50 by priority at 3f-55.

The priority-based PLMN selection process follows the following priority.

1. If there is EHPLMN list, select higher priority EHPLMN, and if there is no EHPLMN list, select HPLMN.
2. Select PLMN combination controlled from UE stored in SIM.
3. Select controlled PLMN combination from carriers stored in SIM.
4. PLMN combination having high reception signal performance (determined in random order)
5. PLMN combination sorted in descending order of received signals FIG. 3G is a diagram illustrating a method in which a UE transmits information for selecting a CN to an NAS and determines CN reconfiguration in a CN as an embodiment 1 according to the disclosure.

Figure 3G:
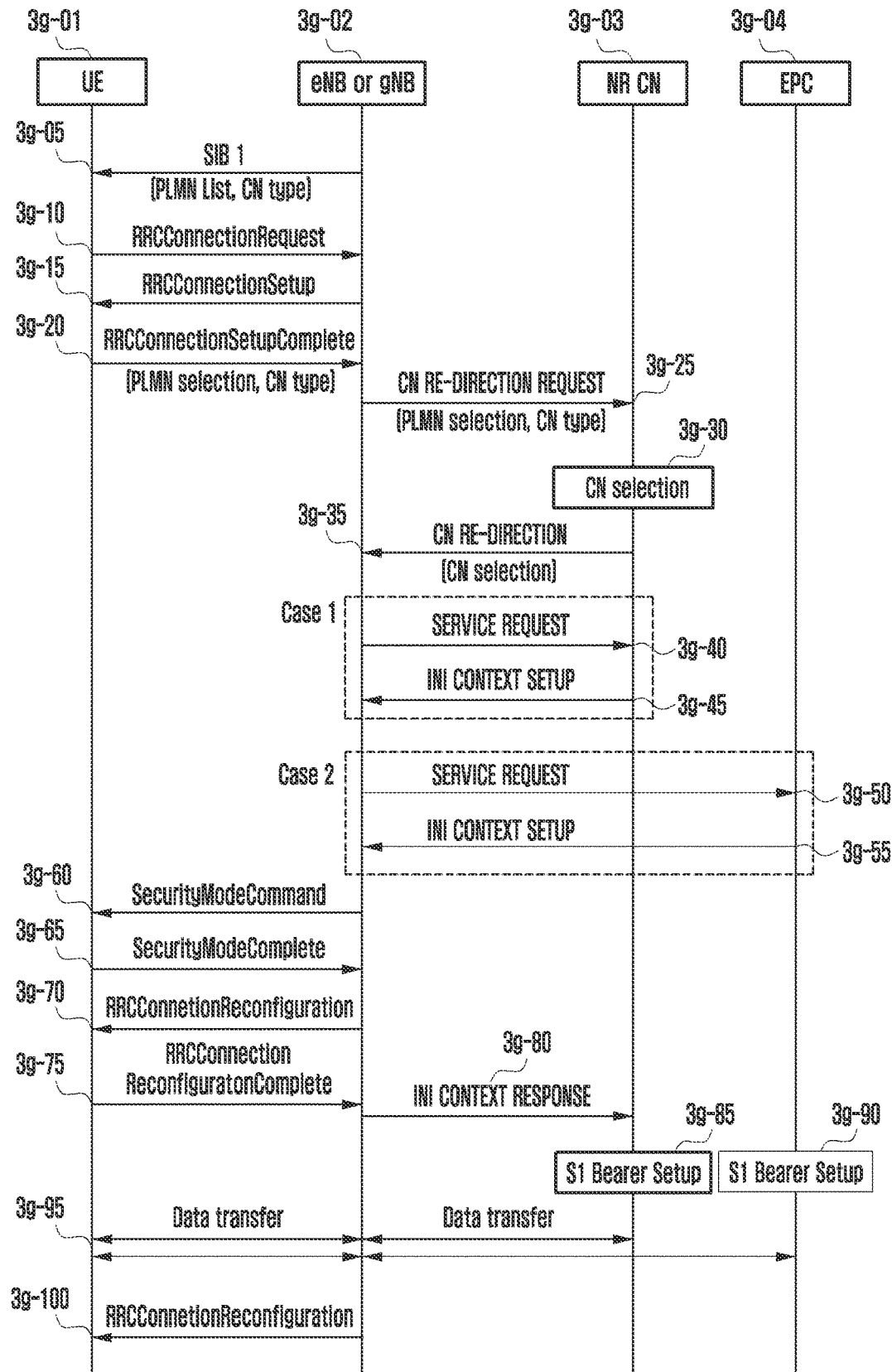
FIG. 3G is a diagram illustrating a method in which a UE transmits information for selecting a CN to an NAS and determines CN reconfiguration in a CN as an embodiment 1 according to the disclosure.

In FIG. 3G, a UE 3g-01 is a UE having a connection capability to an NR, and may receive an initial cell search (SIB1) at 3g-05 and confirm whether a corresponding cell is an HPLMN. A cell 3g-02 may be an NR eNB (gNB) or an upgraded LTE eNB having a function of connecting to an NG CN. In addition, system information that is, SIB1 may include a PLMN list and a CN type applicable to each PLMN. In an existing LTE, only the PLMN List was provided in the SIB 1. However, in the NR, even if a UE is registered in an NR CN, the UE may be required to be reconfigured to the EPC, if necessary, and therefore a CN type for each PLMN may be provided for a CN reconfiguration function. Upon receiving the system information, the UE 3g-01 may select the PLMN and may camp on the selected PLMN. Next, the UE 3g-01 may receive the remaining system information. A method of determining the PLMN may be determined based on the priority described with reference to FIG. 3F.

The UE 3g-01 (hereinafter, idle mode UE) that is not currently connected may perform an RRC connection establishment process with the eNB 3h-02 when data to be transmitted is generated. The idle mode UE 3g-01 may establish backward transmission synchronization with the eNB through a random access procedure and may transmit an RRCConnectionRequest message to the eNB at 3g-10. The message may include a reason (establishmentCause) for establishing a connection with the identifier of the idle mode UE 3g-01. The eNB 3g-02 may transmit an RRCConnectionSetup message so that the UE establishes an RRC connection at 3g-15. The message contains RRC connection configuration information. The RRC connection is also called a signaling radio bearer (SRB), and may be used to transmit and receive an RRC message, which is a control message between the idle mode UE 3g-01 and the eNB 3g-02. The idle mode UE 3g-01 which has established the RRC connection may transmit an RRCConnetionSetupComplete message to the eNB at 3g-20. The message may include a control message called SERVICE REQUEST that the idle mode UE 3g-01 requests for establishing a bearer for a predetermined service from the MME. In the disclosure, an indicator indicating the selected PLMN in the SERVICE REQUEST control message and CN type information in the corresponding PLMN may be stored together. The eNB 3g-02 may transmit, to a currently connected MME (in this example, it is assumed to be connected to the NR CN. If it is connected to the EPC, all subsequent processes can proceed by exchanging the NR CN with the EPC), a SERVICE REQUEST message 3g-40 included in an RRC-ConnetionSetupComplete message or a CN RE-DIRECTION REQUEST control message 3g-25 including a PLMN indicator and CN type information. The CN RE-DIRECTION REQUEST control message 3g-25 may store the same contents as the SERVICE REQUEST message 3g-40 and may be transmitted. The CN 3g-03 that has received the control message may select an appropriate CN according to a predetermined method at 3g-30. The selection may be determined according to a predetermined priority, or may be determined depending on the type of the UE and establishmentCause, for example, on the type of a service. The initially configured CN 3g-03 may determine whether to maintain the current CN connection or receive a change to another CN according to the determined method, and may store the result in a CN RE-DIRECTION control message and deliver the result to the eNB 3g-02 at 3g-35. The CN RE-DIRECTION control message 3g-35 may include only information on the determined CN, or may be included in an INITIAL CONTEXT SETUP message 3g-45 to be transmitted, or may include information that has to be included in the INITIAL CONTEXT SETUP message 3g-45 to be transmitted. If the CN needs to be changed, the eNB 3g-02 may transmit, to the CN (in this example, EPC 3g-04) that needs to be changed, a control message 3g-50 called SERVICE REQUEST requesting a bearer configuration for a predetermined service of the UE from the MME. Next, the MME may determine whether to provide the service requested by the UE. If it is determined to provide the service requested by the UE based on the determination result, the changed MME 3G-04 may transmit a message 3g-55 called INITIAL CONTEXT SETUP REQUEST to the eNB. The message may include information such as QoS information to be applied when configuring a DRB and security related information (for example, a security key and a security algorithm) to be applied to the DRB.

The eNB 3g-02 may exchange a SecurityModeCommand message 3g-60 and a SecurityModeComplete message 3g-65 with the UE 3g-01. When the security configuration is completed, the eNB 3g-02 may transmit an RRCConnectionReconfiguration message to the UE 3g-01 at 3g-70. The message includes configuration information of the DRB to which user data is to be processed, and the UE 3g-01 may apply the information to configure the DRB and may transmit an RRCConnectionReconfigurationComplete message to the eNB 3g-02 at 3g-75. The eNB 3g-02 having completed the DRB configuration with the UE 3g-01 may transmit an INITIAL CONTEXT SETUP COMPLETE message to the MME 3g-03 at 3g-80. The MME 3g-03 or 3g-04 exchanges an S1 BEARER SETUP message and an S1 BEARER SETUP RESPONSE message to establish an S-GW and an S1 bearer. The S1 bearer is a data transmission connection established between the S-GW and the eNB and corresponds one-to-one with the DRB at 3g-85 or 3g-90. When the above process is completed, the UE 3g-01 transmits and receives data to and from the eNB 3g-02 through the S-GW at 3g-95. This general data transmission process briefly consists of three operations: RRC connection configuration, security configuration, and DRB configuration. In addition, the eNB may transmit an RRCConnectionReconfiguration message to the UE for a predetermined reason to newly perform configuration, to add a configuration, or change the configuration at 3g-100.

Figure 3H:
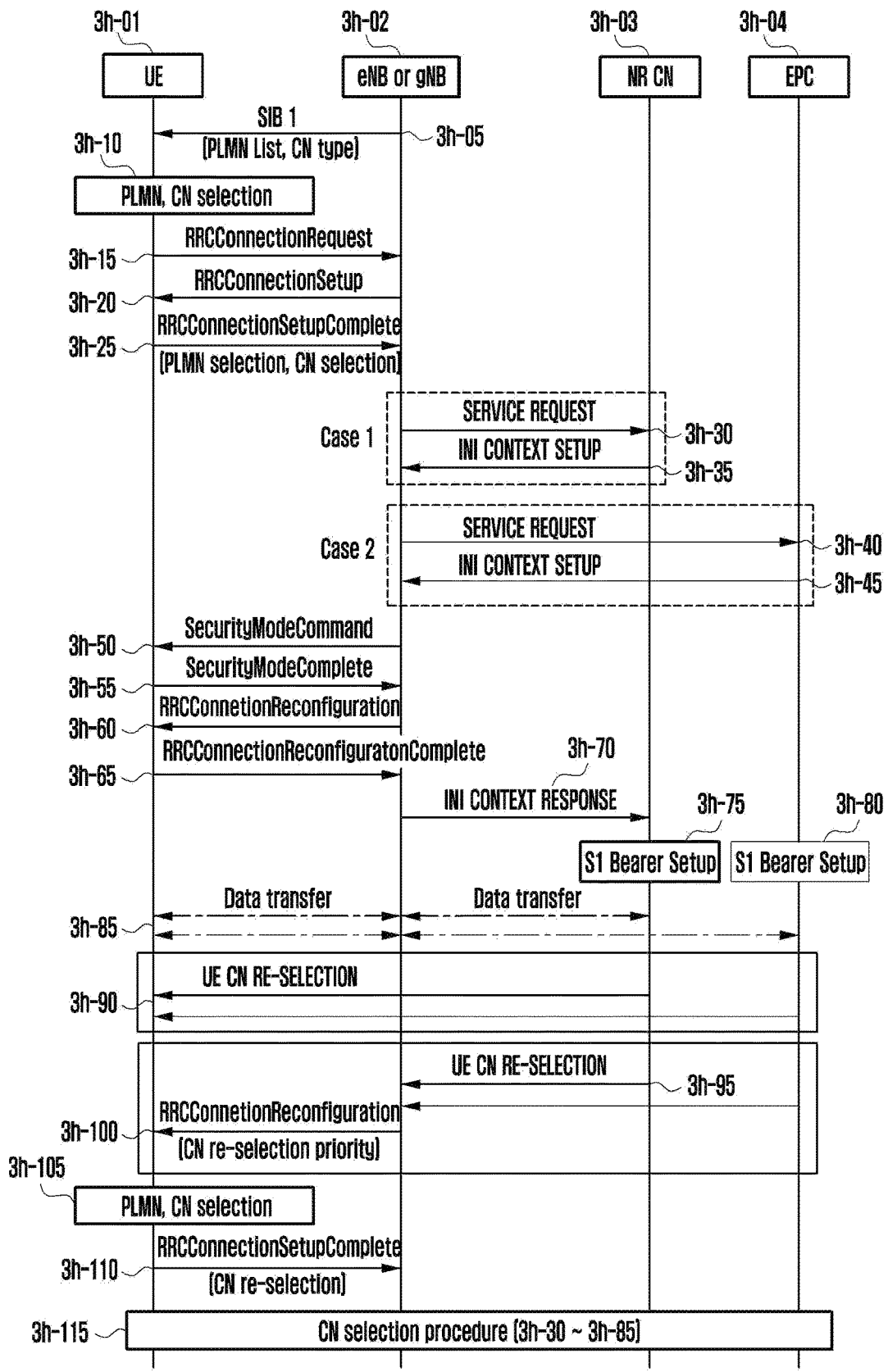
FIG. 3H is a diagram illustrating a method in which a UE reconfigures a CN by selecting a preferred CN and instructing a result as an embodiment 2 according to the disclosure.

FIG. 3H is a diagram illustrating a method in which a UE reconfigures a CN by selecting a preferred CN and instructing a result as an embodiment 2 according to the disclosure.

In FIG. 3H, a UE 3h-01 is a UE having a connection capability to an NR, and may receive an initial cell search (SIB1) at 3h-05 and confirm whether a corresponding cell is an HPLMN. The cell 3h-02 may be an NR eNB (gNB) or an upgraded LTE eNB having a function of connecting to an NG CN. In addition, the system information (SIB1) may include a PLMN list and a CN type applicable to each PLMN. In an existing LTE, only the PLMN List was provided in the SIB 1. However, in the NR, even if a UE is registered in an NR CN, the UE may be required to be reconfigured to the EPC, if necessary, and therefore a CN type for each PLMN may be provided for a CN reconfiguration function. At 3h-20, upon receiving the system information, the UE 3h-01 may select the PLMN, may camp on the selected PLMN, and may receive the remaining system information. A method of determining the PLMN may be determined based on the priority described with reference to FIG. 3F. Thereafter, the UE 3h-01 may determine a CN value in the corresponding PLMN according to CN priority recorded in the SIM or CN priority information for each PLMN. Alternatively, the above priority information may be received as a NAS message, and a value of the priority information may be managed by the UE as a black list. For example, the UE 3h-01 may determine and store the priority of the PLMN and the CN by previous connection and NAS message reception. In addition, in the above procedure, the UE 3h-01 may simultaneously perform the selection for the PLMN and the CN. The above selection conditions may be implemented in various ways.

The UE 3h-01 (hereinafter, idle mode UE) that is not currently connected may perform an RRC connection establishment process with the eNB when data to be transmitted is generated. The idle mode UE 3h-01 may establish backward transmission synchronization with the eNB through a random access procedure and may transmit an RRCConnectionRequest message to the eNB 3h-02 at 3h-15. The message may include a reason (establishmentCause) for establishing a connection with the identifier of the idle mode UE 3h-01. The eNB 3h-02 may transmit an RRCConnectionSetup message so that the UE 3h-01 establishes an RRC connection at 3h-20. The message contains RRC connection configuration information. The RRC connection is also called an SRB, and may be used to transmit and receive an RRC message, which is a control message between the idle mode UE 3h-01 and the eNB 3h-02.

The idle mode UE 3h-01 which has established the RRC connection may transmit an RRCConnetionSetupComplete message to the eNB at 3g-25. The message may include a control message called SERVICE REQUEST that the idle mode UE 3h-01 requests for establishing a bearer for a predetermined service from the MME. In the disclosure, an indicator indicating the selected PLMN and CN in the SERVICE REQUEST control message may be stored. The eNB 3h-02 may transmit, to a currently connected MME (in this example, it is assumed to be connected to the NR CN. If it is connected to the EPC, all subsequent processes can proceed by exchanging the NR CN with the EPC), a SERVICE REQUEST message 3h-40 included in an RRC-ConnetionSetupComplete message or a CN RE-DIRECTION REQUEST control message 3h-25 including a PLMN indicator and CN type information. The SERVICE REQUEST control message 3h-30 or 3h-40 may be selected according to a preferred CN determined from the UE 3h-01 and may be transmitted to the corresponding CN. The SERVICE REQUEST control messages 3h-30 and 3h-40 may include a content requesting bearer configuration for a predetermined service of the UE 3h-01 from the MME. The MME 3h-03 or 3h-04 may determine whether to provide the service requested by the UE 3h-01. If it is determined to provide the service requested by the UE based on the determination result, the MME 3h-03 or 3h-04 may transmit an INITIAL CONTEXT SETUP REQUEST message 3h-35 or 3h-45 to the eNB 3h-02. The message may include information such as QoS information to be applied when configuring a DRB and security related information (for example, a security key and a security algorithm) to be applied to the DRB.

The eNB 3h-02 may exchange a SecurityModeCommand message 3h-50 and a SecurityModeComplete message 3h-55 with the UE 3h-01 in order to configure security. When the security configuration is completed, the eNB 3h-02 may transmit an RRCConnectionReconfiguration message to the UE 3h-01 at 3h-60. The message includes configuration information of the DRB to which user data is to be processed, and the UE 3h-01 may apply the information to configure the DRB and may transmit an RRCConnectionReconfigurationComplete message to the eNB 3h-02 at 3h-65. The eNB 3h-02 having completed the DRB configuration with the UE 3h-01 may transmit an INITIAL CONTEXT SETUP COMPLETE message to the MME 3h-03 or 3h-04 at 3h-70. The MME 3h-03 or 3h-04 having received the message may exchange an S1 BEARER SETUP message and an S1 BEARER SETUP RESPONSE message to establish an S-GW and an S1 bearer. The S1 bearer is a data transmission connection established between the S-GW and the eNB and corresponds one-to-one with the DRB at 3h-75 or 3h-80. When the above process is completed, the UE 3h-01 transmits and receives data to and from the eNB 3h-02 through the S-GW at 3g-85. This general data transmission process briefly consists of three operations: RRC connection configuration, security configuration, and DRB configuration. In addition, for a specific reason, the current CN may request a change of the CN from the UE. The specific reason may be a condition that it is not possible to support a specific service requested by the UE in the currently connected CN, or need to change the CN to support a better service. For the above reason, the MME 3h-03 or 3h-04 may transmit a UE CN RE-SELECTION control message 3h-90 to the UE. Alternatively, the MME 3h-03 or 3h-04 may deliver the UE CN RE-SELECTION control message 3h-90 to the eNB 3h-02 at 3h-95, and then the eNB 3h-02 may transmit a CN re-selection priority as the RRCConnectionReconfiguration message at 3h-100. Upon receiving the NAS control message or the RRC control message, the UE 3h-01 may perform a procedure of reselecting the CN based on the CN reselection priority at 3h-105. For example, a new RRC message or an RRCConnectionReconfigurationComplete message, which is a response message to a previously received RRCConnectionReconfiguration message, may be transmitted to the eNB 3h-02 including CN re-selection information instead of the RRC messages 3h-15 to 3h-25 at 3h-110. Thereafter, a procedure for CN reselection may be performed, which includes the entire procedure for connection establishment and data transmission and reception for the CN to be changed and may be mapped with 3h-30 to 3h-85 at 3h-115.

Figure 3I:
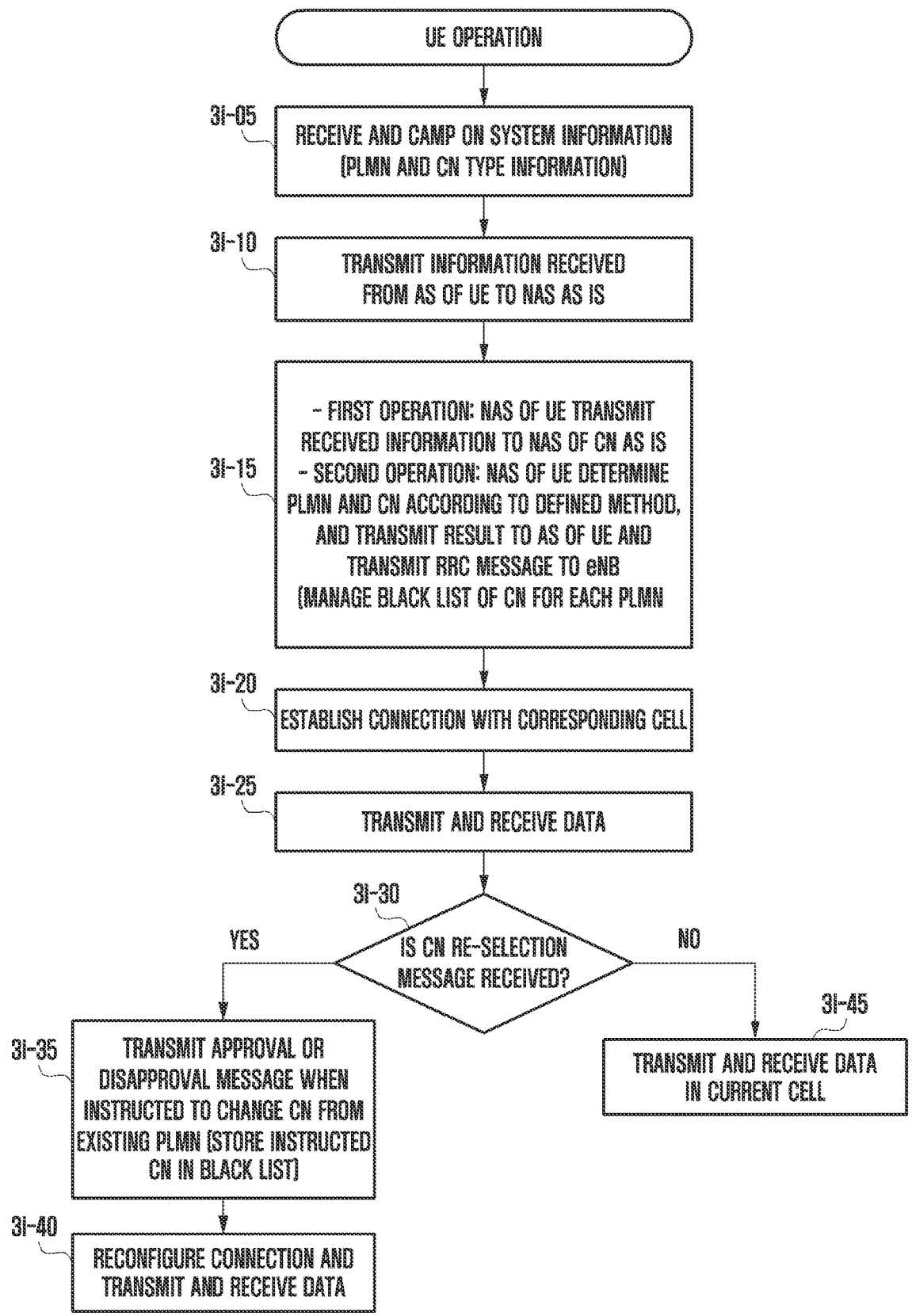
FIG. 3I is a diagram illustrating a method in which a UE selects a CN in the disclosure.

FIG. 3I is a diagram illustrating a method in which a UE selects a CN in the disclosure.

A UE in an RRC IDLE state may receive system information, for example, SIB1 to receive PLMN and CN information for determining a cell to camp on. In addition, the UE may camp on a cell supporting a suitable PLMN at 3i-05. The SIB1 may include not only PLMN information but also CN type information indicating whether NR CN and EPC are supported for each PLMN. The AS of the UE transfers the information received as system information to the NAS of the UE as is at 3i-10.

Thereafter, the NAS of the UE may perform a procedure for selecting a CN. A first operation and a second operation may be performed according to a preset operation method. In the first operation, the NAS of the UE may transfer the received PLMN and CN information to the NAS of the CN as is. The CN may be a basic CN initially configured with the eNB, and may be changed to another CN value according to reconfiguration. In this case, the reselection of the CN is left to the initially configured CN, and the UE may perform data transmission and reception through the RRC connection 3i-20 without being concerned about subsequent operations at 3i-25. In the case of the second operation, the NAS of the UE may determine the PLMN and CN according to a predefined method, and deliver the result to the AS of the UE, and then transmit the determination to the eNB through the RRC message at 3i-15. The method of determining the PLMN and CN may be a priority based determination and may be determined according to a black list stored by the UE. The black list may be obtained through NAS message received from CN and mapping information of PLMN and CN received in SIB 1. Thereafter, the UE may perform data transmission/reception through the RRC connection 3*i*-20 with the base station at 3*i*-25. In addition, all of the above CN selection procedures may be performed simultaneously with the procedure for selecting the PLMN at 3*i*-05.

In addition, the UE may receive a CN RE-SELECTION control message requesting CN reconfiguration of the UE or rejecting the access to the current CN from the currently connected CN. Alternatively, the UE may receive an RRC message (RRCConnectionReconfiguration) including the information from the eNB at 3*i*-30. When the UE receives the message, the UE transmits an RRC message including the result of the determination, which determines whether to accept or disapprove the CN from the existing PLMN, to the eNB. Alternatively, the UE may deliver the message as a NAS message to the connected CN. Thereafter, the eNB may perform resetting of the CN in consideration of the response of the UE. The eNB may perform an RRC resetting process with the UE and may continue to transmit and receive data at 3*i*-40. If the UE does not receive any message in procedure 3*i*-30, the UE can continue to transmit and receive data in the current serving cell at 3*i*-45.

Figure 3J:
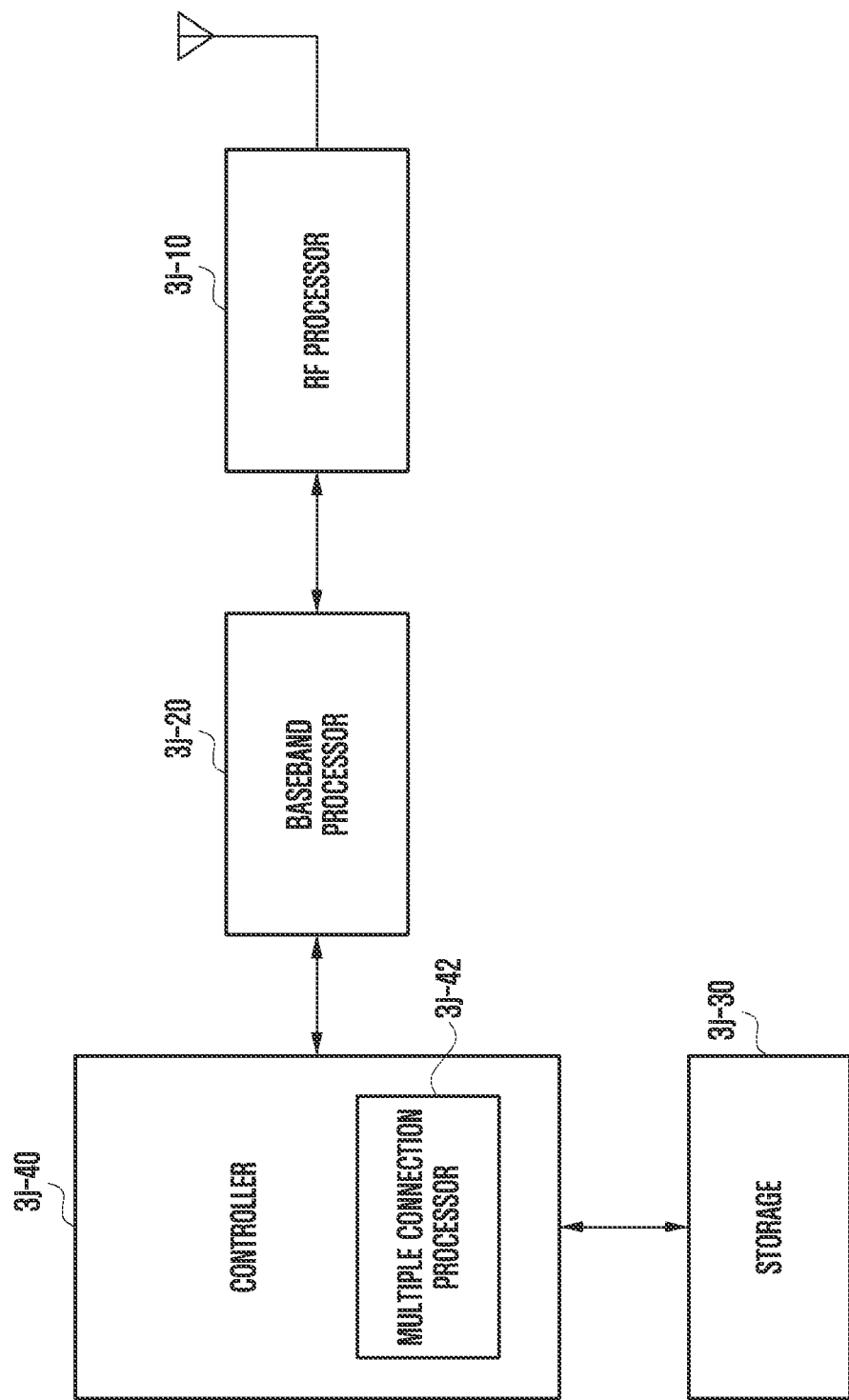
FIG. 3J is a block diagram illustrating the internal structure of a UE to which the disclosure is applied.

FIG. 3J is a block diagram illustrating the internal structure of a UE to which the disclosure is applied.

Referring to FIG. 3J, the UE may include a RF processor 3*j*-10, a baseband processor 3*j*-20, a storage 3*j*-30, and a controller 3*j*-40.

The RF processor 3*j*-10 may perform a function for transmitting and receiving a signal through a wireless channel such as band conversion, amplification, and the like of a signal. Specifically, the RF processor 3*j*-10 may up-convert a baseband signal provided from the baseband processor 3*j*-20 into an RF band signal and may transmit the RF band signal through an antenna, and may down-convert the RF band signal received through the antenna into a baseband signal. For example, the RF processor 3*j*-10 may include a transmission filter, a reception filter, an amplifier, a mixer, an oscillator, a DAC, an ADC, and the like. In FIG. 3J, only one antenna is shown, but the UE may include a plurality of antennas. In addition, the RF processor 3*j*-10 may include a plurality of RF chains. In addition, the RF processor 3*j*-10 may perform beamforming. For the beamforming, the RF processor 3*j*-10 may adjust the phase and magnitude of each of signals transmitted and received through a plurality of antennas or antenna elements. The RF processor may perform MIMO and may receive multiple layers when performing the MIMO operation.

The baseband processor 3*j*-20 may perform a conversion function between a baseband signal and a bit string according to a physical layer standard of the system. For example, during data transmission, the baseband processor 3*j*-20 generates complex symbols by encoding and modulating a transmission bit string. In addition, during data reception, the baseband processor 3*j*-20 may restore the received bit string by demodulating and decoding a baseband signal provided from the RF processor 3*j*-10. For example, according to an OFDM scheme, during data transmission, the baseband processor 3*j*-20 may generate complex symbols by encoding and modulating a transmission bit string, may map the complex symbols to subcarriers, and may then configure OFDM symbols through an IFFT operation and CP insertion. In addition, during data reception, the baseband processor 3*j*-20 may divide the baseband signal provided from the RF processor 3*j*-10 into units of OFDM symbols, may restore the signals mapped to the subcarriers through a FFT operation, and may then restore the received bit string through demodulation and decoding.

The baseband processor 3*j*-20 and the RF processor 3*j*-10 may transmit and receive signals as described above. Accordingly, the baseband processor 3*j*-20 and the RF processor 3*j*-10 may be referred to as a transmitter, a receiver, a transceiver, or a communicator. Further, at least one of the baseband processor 3*j*-20 and the RF processor 3*j*-10 may include a plurality of communication modules to support a plurality of different radio access technologies. In addition, at least one of the baseband processor 3*j*-20 and the RF processor 3*j*-10 may include different communication modules to process signals of different frequency bands. For example, the different radio access technologies may include a wireless RAN (e.g., IEEE 802.11), a cellular network (e.g., LTE), and the like. In addition, the different frequency bands may include a super high frequency (SHF) (e.g., 2.NRHz, NRhz) band and a millimeter wave (e.g., 60 GHz) band.

The storage 3*j*-30 may store data such as a basic program, an application program, and configuration information for the operation of the UE. Particularly, the storage 3*j*-30 may store information related to a second access node that performs wireless communication using a second wireless access technology. The storage 3*j*-30 may provide stored data in response to a request from the controller 3*j*-40.

The controller 3*j*-40 may control overall operations of the UE. For example, the controller 3*j*-40 may transmit and receive signals through the baseband processor 3*j*-20 and the RF processor 3*j*-10. In addition, the controller 3*j*-40 may record and read data in the storage 3*j*-30. To this end, the controller 3*j*-40 may include at least one processor. For example, the controller 3*j*-40 may include a communication processor (CP) for performing control for communication and an application processor (AP) for controlling an upper layer such as an application program.

Figure 3K:
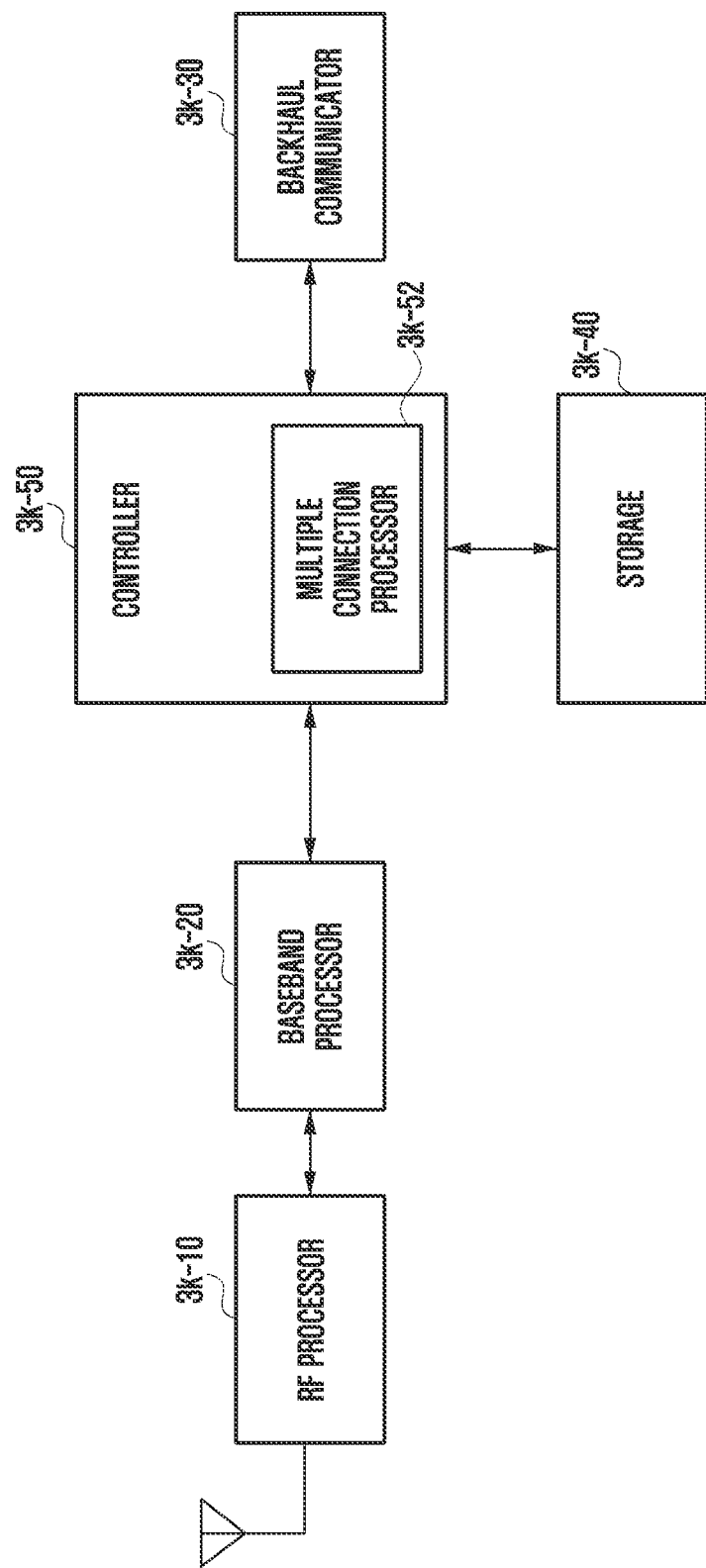
FIG. 3K is a block diagram illustrating a configuration of an eNB according to the disclosure.

FIG. 3K is a block diagram illustrating a configuration of an eNB according to the disclosure.

As illustrated in FIG. 3K, the eNB may include a RF processor 3*k*-10, a baseband processor 3*k*-20, a backhaul communicator 3*k*-30, a storage 3*k*-40, and a controller 3*k*-50.

The RF processor 3*k*-10 may perform a function for transmitting and receiving a signal through a wireless channel such as band conversion, amplification, and the like of a signal. Specifically, the RF processor 3*k*-10 may up-convert a baseband signal provided from the baseband processor 3*k*-20 into an RF band signal to transmit the RF band signal through an antenna, and may down-convert the RF band signal received through the antenna into a baseband signal. For example, the RF processor 3*k*-10 may include a transmission filter, a reception filter, an amplifier, a mixer, an oscillator, a DAC, an ADC, and the like. In FIG. 3*k*, only one antenna is shown, but the UE may include a plurality of antennas. In addition, the RF processor 3*k*-10 may include a plurality of RF chains. In addition, the RF processor 3*k*-10 may perform beamforming. For the beamforming, the RF processor 3*k*-10 may adjust the phase and magnitude of each of signals transmitted and received through a plurality of antennas or antenna elements. The RF processor may perform a downlink MIMO operation by transmitting at least one layer.

The baseband processor 3*k*-20 may perform a conversion function between a baseband signal and a bit string according to a physical layer standard of the system. For example, during data transmission, the baseband processor 3*k*-20 generates complex symbols by encoding and modulating a transmission bit string. In addition, during data reception, the baseband processor 3*k*-20 may restore the received bit string by demodulating and decoding a baseband signal provided from the RF processor 3k-10. For example, according to an OFDM scheme, during data transmission, the baseband processor 3k-20 may generate complex symbols by encoding and modulating a transmission bit string, may map the complex symbols to subcarriers, and may then configure OFDM symbols through an IFFT operation and CP insertion. In addition, during data reception, the baseband processor 3k-20 may divide the baseband signal provided from the RF processor 3k-10 into units of OFDM symbols, may restore the signals mapped to the subcarriers through a FFT operation, and may then restore the received bit string through demodulation and decoding. The baseband processor 3k-20 and the RF processor 3k-10 may transmit and receive signals as described above. Accordingly, the baseband processor 3k-20 and the RF processor 3k-10 may be referred to as a transmitter, a receiver, a transceiver, or a communicator.

The backhaul communicator 3k-30 may provide an interface for communicating with other nodes in a network. That is, the backhaul communicator 3k-30 may convert a bit string transmitted from a main eNB to another node, for example, an auxiliary eNB, a core network, etc., into a physical signal, and may convert the physical signal received from the other node into a bit string.

The storage 3k-40 may store data such as a basic program, an application program, and configuration information for the operation of the main eNB. In particular, the storage 3k-40 may store information on a bearer allocated to a connected UE, a measurement result reported from the connected UE, and the like. In addition, the storage 3k-40 may store information that is a criterion for determining whether to provide or terminate multiple connections to the UE. The storage 3k-40 may provide stored data in response to a request from the controller 3k-50.

The controller 3k-50 may control overall operations of the main eNB. For example, the controller 3k-50 may transmit and receive a signal through the baseband processor 3k-20 and the RF processor 3k-10 or through the backhaul communicator 3k-30. The controller 3k-50 records and reads data in the storage 3k-40. To this end, the controller 3k-50 may include at least one processor.

What is claimed is:

1. A method of a terminal in a wireless communication system, the method comprising:
  receiving, from a base station, a radio resource control (RRC) message configuring a data radio bearer (DRB), the RRC message configuring the DRB including service data association protocol (SDAP) configuration information for the DRB, a DRB identity for the DRB, and packet data convergence protocol (PDCP) configuration information for the DRB; and
  configuring an SDAP entity associated with at least one PDCP entity based on the received RRC message configuring the DRB,
  wherein the SDAP configuration information for the DRB included in the RRC message configuring the DRB includes an indicator indicating whether an SDAP header is present or absent for the DRB.

2. The method of claim 1, wherein the SDAP configuration information for the DRB includes an indicator indicating whether or not the DRB associated with the SDAP entity is a default DRB.

3. The method of claim 1, wherein the SDAP configuration information for the DRB includes default DRB information on the SDAP entity.

4. The method of claim 1, wherein the SDAP configuration information for the DRB included in the RRC message configuring the DRB includes protocol data unit (PDU) session identifier information for the SDAP entity associated with the DRB.

5. The method of claim 1, wherein the SDAP configuration information for the DRB includes mapping information on at least one DRB of at least one quality of service (QOS) flow.

6. A terminal in a wireless communication system, the terminal comprising:
  a transceiver configured to transmit and receive a signal; and
  a controller configured to:
    receive, from a base station via the transceiver, a radio resource control (RRC) message configuring a data radio bearer (DRB), the RRC message configuring the DRB including service data association protocol (SDAP) configuration information for the DRB and a DRB identity for the DRB, and packet data convergence protocol (PDCP) configuration information for the DRB, and
    configure an SDAP entity associated with at least one PDCP entity based on the received RRC message configuring the DRB,
  wherein the SDAP configuration information for the DRB included in the RRC message configuring the DRB includes an indicator indicating whether an SDAP header is present or absent for the DRB.

7. The terminal of claim 6, wherein the SDAP configuration information for the DRB includes an indicator indicating whether or not the DRB associated with the SDAP entity is a default DRB.

8. The terminal of claim 6, wherein the SDAP configuration information for the DRB includes default DRB information on the SDAP entity.

9. The terminal of claim 6, wherein the SDAP configuration information for the DRB included in the RRC message configuring the DRB includes protocol data unit (PDU) session identifier information for the SDAP entity associated with the DRB.

10. The terminal of claim 6, wherein the SDAP configuration information for the DRB includes mapping information on at least one DRB of at least one quality of service (QOS) flow.

11. A method of a base station in a wireless communication system, the method comprising:
  generating a radio resource control (RRC) message configuring a data radio bearer (DRB), the RRC message configuring the DRB including service data association protocol (SDAP) configuration information for the DRB, a DRB identity for the DRB, and packet data convergence protocol (PDCP) configuration information for the DRB; and
  transmitting, to a terminal, the RRC message configuring the DRB,
  wherein the SDAP configuration information for the DRB included in the RRC message configuring the DRB includes an indicator indicating whether an SDAP header is present or absent for the DRB.

12. The method of claim 11, wherein the SDAP configuration information for the DRB includes an indicator indicating whether or not the DRB associated with the SDAP entity is a default DRB.

13. The method of claim 11, wherein the SDAP configuration information for the DRB includes default DRB information on the SDAP entity.

14. The method of claim 11, wherein the SDAP configuration information for the DRB included in the RRC message configuring the DRB includes protocol data unit (PDU) session identifier information for the SDAP entity associated with the DRB.

15. The method of claim 11, wherein the SDAP configuration information for the DRB includes mapping information on at least one DRB of at least one quality of service (QOS) flow.

16. A base station in a wireless communication system, the base station comprising:
- a transceiver configured to transmit and receive a signal; and
- a controller configured to:
  - generate a radio resource control (RRC) message configuring a data radio bearer (DRB), the RRC message configuring the DRB including service data association protocol (SDAP) configuration information for the DRB, a DRB identity for the DRB, and packet data convergence protocol (PDCP) configuration information for the DRB, and
  - transmit, to a terminal via the transceiver, the RRC message configuring the DRB, wherein the SDAP configuration information for the DRB included in the RRC message configuring the DRB includes an indicator indicating whether an SDAP header is present or absent for the DRB.

17. The base station of claim 16, wherein the SDAP configuration information for the DRB includes an indicator indicating whether or not the DRB associated with the SDAP entity is a default DRB.

18. The base station of claim 16, wherein the SDAP configuration information for the DRB includes default DRB information on the SDAP entity.

19. The base station of claim 16, wherein the SDAP configuration information for the DRB included in the RRC message configuring the DRB includes protocol data unit (PDU) session identifier information for the SDAP entity associated with the DRB.

20. The base station of claim 16, wherein the SDAP configuration for the DRB information includes mapping information on at least one DRB of at least one quality of service (QOS) flow.

* * * * *